United States Patent
Kegoya et al.

(10) Patent No.: US 7,970,941 B2
(45) Date of Patent: Jun. 28, 2011

(54) CONTROL SERVER, CONTROL TERMINAL, CONTROL SYSTEM, AND RECORDING MEDIUM STORING CONTROL COMMUNICATION PROGRAM

(75) Inventors: Kentaro Kegoya, Yao (JP); Minoru Yoshida, Higashiosaka (JP); Shunu Tanigawa, Higashiosaka (JP); Satoshi Kato, Kaizuka (JP); Nobuhiro Yagi, Izumiotsu (JP); Masao Saito, Matsubara (JP); Masaaki Yamada, Osaka (JP)

(73) Assignee: Digital Electronics Corporation, Osaka (JP)

(*) Notice: Subject to any disclaimer, the term of this patent is extended or adjusted under 35 U.S.C. 154(b) by 1511 days.

(21) Appl. No.: 11/370,952

(22) Filed: Mar. 9, 2006

(65) Prior Publication Data
US 2006/0179120 A1 Aug. 10, 2006

Related U.S. Application Data

(62) Division of application No. 10/221,779, filed as application No. PCT/JP01/02079 on Mar. 15, 2001, now Pat. No. 7,467,231.

(30) Foreign Application Priority Data

Mar. 17, 2000 (JP) .................................. 2000-77002
Mar. 30, 2000 (JP) .................................. 2000-95085
Mar. 31, 2000 (JP) .................................. 2000-99664
Sep. 12, 2000 (JP) .................................. 2000-277243
Sep. 12, 2000 (JP) .................................. 2000-277254

(51) Int. Cl.
G06F 15/16 (2006.01)

(52) U.S. Cl. ........ 709/246; 709/203; 709/223; 709/230; 709/244; 709/243

(58) Field of Classification Search .................. 709/203, 709/223, 230, 243, 244, 246, 217, 218, 219
See application file for complete search history.

(56) References Cited

U.S. PATENT DOCUMENTS 6,199,104 B1 * 3/2001 Delph .......................... 709/208
(Continued)

FOREIGN PATENT DOCUMENTS
DE 298 23 119 U1 2/1999
(Continued)

OTHER PUBLICATIONS

European Search Report mailed Jan. 26, 2007, by the EPO for the European Patent Application Nos. 06024203.9 and 06024220.3.
(Continued)

Primary Examiner — Barbara N Burgess
(74) Attorney, Agent, or Firm — Nixon & Vanderhye PC

(57) ABSTRACT

Screen data is generated by a screen generating processor (74) of a control host computer (7) and transmitted to a programmable display apparatus (5). In accordance with the screen data, the programmable display apparatus (5) inquires a PLC (3) or the like about a state of a device (21), so as to update the display or transmit a control instruction depending on an input result. On the other hand, a control host computer (7) has a public server section (77) to transmit to a client apparatus (9) via the Internet an applet, which is generated by a compiler (76) compiling the screen data. The client apparatus (9) executes the applet to transmit to the public server section (77) an or the control instruction inquiry similar to those the programmable display apparatus (5) makes. In this way, the display is updated in accordance with a response. This realizes a control system, which allows a display content of the programmable display apparatus (5) to be remotely checked from a remote area remote from the programmable display apparatus (5), without newly generating a display screen.

12 Claims, 40 Drawing Sheets

U.S. PATENT DOCUMENTS

| | | | |
|---|---|---|---|
| 6,263,487 B1 | 7/2001 | Stripf et al. | |
| 6,300,947 B1 * | 10/2001 | Kanevsky | 715/866 |
| 6,477,529 B1 | 11/2002 | Mousseau | |
| 6,496,862 B1 | 12/2002 | Akatsu | |
| 6,538,673 B1 * | 3/2003 | Maslov | 715/853 |
| 6,593,944 B1 * | 7/2003 | Nicolas et al. | 715/744 |
| 6,690,394 B1 * | 2/2004 | Harui | 715/762 |
| 6,751,650 B1 | 6/2004 | Finch et al. | 709/203 |
| 7,000,023 B2 * | 2/2006 | Chiba | 709/232 |
| 7,230,582 B1 * | 6/2007 | Dove et al. | 345/2.1 |

FOREIGN PATENT DOCUMENTS

| | | |
|---|---|---|
| DE | 198 18 041 A1 | 1/2000 |
| EP | 0967 766 A2 | 12/1999 |
| JP | 07-225831 A | 8/1995 |
| JP | 08-286734 A | 11/1996 |
| JP | 09-16215 A | 1/1997 |
| JP | 09-069001 | 3/1997 |
| JP | 09-108998 | 4/1997 |
| JP | 10-41861 | 2/1998 |
| JP | 10-224386 A1 | 8/1998 |
| JP | 10-254513 | 9/1998 |
| JP | 10-333896 A | 12/1998 |
| JP | 11-024711 | 1/1999 |
| JP | 11-024716 | 1/1999 |
| JP | 11-085224 | 3/1999 |
| JP | 11-109933 | 4/1999 |
| JP | 11-110007 | 4/1999 |
| JP | 11-122679 A1 | 4/1999 |
| JP | 11-184507 | 7/1999 |
| JP | 11-249713 | 9/1999 |
| JP | 11-266287 | 9/1999 |
| JP | 11-345149 | 12/1999 |
| JP | 2000-004252 | 1/2000 |
| JP | 2000-047775 | 2/2000 |
| JP | 2000-69578 | 3/2000 |
| JP | 2000-194416 | 7/2000 |
| KR | 1999-0077248 | 10/1999 |
| KR | 1999-0080192 | 11/1999 |
| WO | WO 99/13388 A | 3/1999 |
| WO | WO99/13418 | 3/1999 |
| WO | WO99/56186 | 4/1999 |
| WO | WO 99/48247 | 9/1999 |

OTHER PUBLICATIONS

Office Action mailed Aug. 22, 2006, by the Japanese Patent Office for the Japanese Patent Application No. 2000-077002.

Office Action (and English translation) from Korean Industrial Property Office, dated Aug. 12, 2005, relating to Korean Patent Application No. 10-2002-7012219 corresponding to subject U.S. Appl. No. 10/221,779.

Office Action dated Sep. 14, 2010, for corresponding U.S. Appl. No. 11/371,026.

Office Action issued on Oct. 8, 2010 by the U.S. Patent & Trademark Office during the prosecution of U.S. Appl. No. 11/371,020.

Communication and Translation of Notice of Reasons for Refusal mailed Jun. 1, 2004; re Japanese Patent Application No. 2000-095085.

Communication and Translation of Notice of Reasons for Refusal mailed Jun. 1, 2004; re Japanese Patent Application No. 2000-099664.

Communication and Translation of Notice of Reasons for Refusal mailed Jun. 1, 2004; re Japanese Patent Application No. 2000-277254.

Translation of Office Action, dated Aug. 31, 2004, relating to 2000-077002.

Translation of Office Action, dated Aug. 31, 2004, relating to 2000-277243.

Hideo Nishimura, Practice of Monitoring Plant Data by Internet-compatible Add-on-Software, Keiso, published on Sep. 1, 1999, Kogyogijutusha, vol. 42, No. 9, pp. 54-59.

An English translation of pp. 55-56 of "3. Overview of iWebServer" of above-identified publication.

* cited by examiner

FIG.7

```
<HTML>
<HEAD>
<TITLE> </TITLE>
</HEAD>

<BODY>
<P>   </P>
<!--INSERT HTML AT THIS POSITION -->
<applet
code=Gpj.class
name=Gpj
hspace=50
width=320
height=240 VIEWASTEXT>
            :
            :
            :

<param name=Tag15 value="T00A200000000, GNO=2, WDEV1=40406900, X=-161,
Y=12, X2=-81, Y2=40, FIXNUM=01000000, w10WDEV1=40406900">
<param name=Tag16 value="N000440800F00, GNO=2, WDEV1=40406900, X=-141,
Y=55, COL0=16, BCOL0=7, COL1=7, BCOL1=1">
            :
            :
            :

<applet>
</BODY>
```

FIG. 13

LIST OF NETWORK PARTICIPATING STATIONS

| STATION NAME | IP ADDRESS | CONNECTED PLC |
|---|---|---|
| A2 | 192.168.0.1 | ●●●SERIES MANUFACTURED BY○○○··· |
| B2 | 192.168.0.2 | ■■■SERIES MANUFACTURED BY□□□··· |
| C2 | 192.168.0.3 | ▲▲▲SERIES MANUFACTURED BY△△△··· |

| SYMBOL NAME | DEVICE NAME |
|---|---|
| VALV1 | DM100 |
| VALV2 | DM101 |
| VALV3 | DM102 |
| TANK1 | DM103 |
| TANK1 | DM104 |
| ... | ... |

FIG.17

```
<?xml version="1.0" encoding="Shift JIS"?>
<Gpweb>
        <description> MAIN SCREEN</description>
        <Screen>B1
```

```
                <Tag>LTag                                          ┐
                        <TagName>L 0000</TagName>        ←E11      │
                        <TagNameX>-232</TagNameX>                  │
                        <TagNameY>-232</TagNameY>                  │
                        <ModeXOR>1</ModeXOR>                       │ E1
                        <X>-232</X>                      ←E12      │
                        <Y>120</Y>                       ←E13      │
                        <LibraryNo>101</LibraryNo>       ←E14      │
                        <SuperviserBit>1</SuperviserBit>           │
                        <WakeCondition>1</WakeCondition>           │
                        <BitSymbolName>010100</BitSymbolName> ←E15 │
                </Tag>                                             ┘
                <Tag>TTag                                          ┐
                        <TagName>T 0000</TagName>        ←E21      │
                        <TagNameX>-180</TagNameX>                  │
                        <TagNameY>148</TagNameY>                   │
                        <WriteMode>1</WriteMode>                   │
                        <OutputAUX>0</OutputAUX>                   │
                        <Buzzer>0</Buzzer>                         │ E2
                        <SymbolName>010100</SymbolName>  ←E22      │
                        <X>-188</X>                      ←E23      │
                        <Y>140</Y>                       ←E24      │
                        <X2>-148</X2>                    ←E25      │
                        <Y2>180</Y2>                     ←E26      │
                </Tag>                                             ┘
```

```
        </Screen>
</Gpweb>
```

FIG.18

```
<!DOCTYPE HTML PUBLIC "-/W3C//DTD HTML 4.0 Frameset//EN">
<HTML>
<HEAD>
<META NAME="GENERATOR" Content="GP-Web Compiler 1.0 for IE">
<TITLE> ○○FACTORY LINE 1 - UNIT 1 </TITLE>
</HEAD>

<BODY>
```
⎤ P1

```
<P>
LOCAL CONTROL SYSTEM: ○○FACTORY <BR>
PROGRAMMABLE DISPLAY APPARATUS: LINE 1 - UNIT 1 <BR>
</P>
```
⎤ P2

```
        <APPLET code=GPWeb.class Archive=/GPWEB/xml4j 1 1 16.jar,
/GPWEB/GPWebApplet.zip height=480 width=640>
                    ⋮
        <PARAM NAME="DEFNODE" VALUE="GP1">
        <PARAM NAME="BASESCR" VALUE="1">
        <PARAM NAME="SYNC" VALUE="ASYNCHRONOUS">
                    ⋮
        </APPLET>
```
⎤ P11

```
        <APPLET code=ChangeScreenButton.class
                Archive=/GPWEB/xml4j 1 1 16.jar,
/GPWEB/GPWebApplet.zip height=80 width=130>
        <PARAM NAME="WEBAPPLETNAME" VALUE="GPWeb">
        </APPLET>
```
⎤ P12

```
</BODY>
</HTML>
```
⎤ P1

FIG.20

```
<!DOCTYPE HTML PUBLIC "-/W3C//DTD HTML 4.0 Frameset//EN">
<HTML>
<HEAD>
<META NAME="GENERATOR" Content="GP-Web Compiler 1.0 for IE">
<TITLE> FACTORY LINE 1 - UNIT 1 </TITLE>
</HEAD>

<BODY>
<P>
LOCAL CONTROL SYSTEM: ○○FACTORY <BR>
PROGRAMMABLE DISPLAY APPARATUS : LINE 1 - UNIT 1 <BR>
</P>

<applet
code=Gpj.class
name=Gpj
hspace=50
width=640
height=480 VIEWASTEXT>

<param name=Tag15 value="L 0000,GNO=1, WDEV1=010100, X=-232, Y=120,
lib=101, ··· ">
<param name=Tag16 value="T 0000,GNO=1, WDEV1=010100, X=-188, Y=140,
X2=-148, Y2=180,   ··· ">

</applet>
</BODY>
</HTML>
```

| FOLDER NAME-NODE A | | | | | | |
|---|---|---|---|---|---|---|
| DATE | SCREEN | PRESET TEMPERATURE | LEVEL | PRESET PRESSURE | LEVEL | ALARM |
| 2000.3.31.15:00 | TEMPERATURE MANAGEMENT | 50.0 | 50.3 | | | 0 |
| 15:01 | | | 50.2 | | | 0 |
| 15:02 | | | 50.2 | | | 0 |
| ⋮ | | | ⋮ | | | ⋮ |
| 15:15 | | | 55.4 | | | 1 |
| ⋮ | | | | | | |
| 15:30 | PRESSURE MANAGEMENT | | | 90.0 | 90.5 | 0 |
| 15:31 | | | | | 90.7 | 0 |
| 15:32 | | | | | 90.4 | 0 |
| ⋮ | | | | | ⋮ | ⋮ |
| 15:50 | | | | | 98.6 | 1 |

FIG.41(b)

| FOLDER NAME-NODE A | | | | | | |
|---|---|---|---|---|---|---|
| DATE | LADDER | ON | NUMBER OF PRODUCTS | ON/OFF | COUNT VALUE | LIGHT-UP/ LIGHT-OUT |
| 2000.3.31.16:00 | LOT MANAGEMENT | 0 | 3000 | 0 | | 0 |
| 16:01 | | 1 | | 0 | | 1 |
| 16:02 | | 0 | | 1 | 50 | 1 |
| ⋮ | | ⋮ | | ⋮ | ⋮ | ⋮ |
| 16:31 | | 0 | | 1 | 1500 | 1 |
| ⋮ | | | | ⋮ | ⋮ | ⋮ |
| 17:01 | | 0 | | 1 | 3000 | 0 |

FIG. 42

| FOLDER NAME-NODE A | | | | | | | | | | | |
|---|---|---|---|---|---|---|---|---|---|---|---|
| DATE | SCREEN | PRESET TEMPERATURE | LEVEL | PRESET PRESSURE | LEVEL | ALARM | ON | NUMBER OF PRODUCTS | ON/OFF | COUNT VALUE | LIGHT-UP/ LIGHT-OUT |
| 2000.3.31.15:00 | TEMPERATURE MANAGEMENT | 50.0 | 50.3 | | | 0 | | | | | |
| 15:01 | | | 50.2 | | | 0 | | | | | |
| 15:02 | | | 50.2 | | | 0 | | | | | |
| . | | | . | | | . | | | | | |
| . | | | . | | | . | | | | | |
| 15:15 | | | 55.4 | | | 1 | | | | | |
| . | | | | | | | | | | | |
| 15:30 | PRESSURE MANAGEMENT | | | 90.0 | 90.5 | 0 | | | | | |
| 15:31 | | | | | 90.7 | 0 | | | | | |
| 15:32 | | | | | 90.4 | 0 | | | | | |
| . | | | | | . | . | | | | | |
| . | | | | | . | . | | | | | |
| 15:50 | | | | | 98.6 | 1 | | | | | |
| 16:00 | LOT MANAGEMENT | | | | | | 0 | | 0 | | 0 |
| 16:01 | | | | | | | 1 | | 0 | | 1 |
| 16:02 | | | | | | | 0 | 3000 | 1 | 50 | . |
| . | | | | | | | . | | . | . | . |
| . | | | | | | | . | | . | . | . |
| 16:31 | | | | | | | 0 | | 1 | 1500 | 1 |
| . | | | | | | | . | | . | . | . |
| . | | | | | | | . | | . | . | . |
| 17:01 | | | | | | | 0 | | 1 | 3000 | 0 |

FIG.43(a)

```
DELIVERY CONDITIONS
    ☐ SWITCH-ON              ☐ ON PERIOD
    ☐ TIME SPECIFICATION     ☐ OFF PERIOD
    ☑ CYCLE SPECIFICATION    ☐ RISING TRIGGER
    ☐ REWRITING TRIGER       ☐ FALLING TRIGGER

SYMBOL NAME        DM100  WORD

CHECK CYCLE        100        ms

☑ PERIOD LIMITATION
        8 時  00 分  ~  17 時  00 分

☐ RETURN TO OFF/ON AFTER DELIVERY
```

FIG.43(b)

```
DELIVERING STATION

SYMBOL NAME           NUMBERS

DM100  WORD           10

RECEIVING STATION

SYMBOL NAME

NODE  A
```

CONTROL SERVER, CONTROL TERMINAL, CONTROL SYSTEM, AND RECORDING MEDIUM STORING CONTROL COMMUNICATION PROGRAM

CROSS-REFERENCES TO RELATED APPLICATIONS

This is a divisional application of U.S. patent application Ser. No. 10/221,779 filed Dec. 4, 2002, now U.S. Pat. No. 7,467,231, which is the U.S. national phase of PCT International Application No. PCT/JP01/02079 filed 15 Mar. 2001 which designated the U.S. PCT/JP01/02079 claims priority to Japanese Patent Application No. 2000-277254 filed 12 Sep. 2000, Japanese Patent Application No. 2000-277243 filed 12 Sep. 2000, Japanese Patent Application No. 2000-99664 filed 31 Mar. 2000, Japanese Patent Application No. 2000-95085 filed 30 Mar. 2000, and Japanese Patent Application No. 2000-77002 filed 17 Mar. 2000, the entirety of which applications are incorporated by reference.

TECHNICAL FIELD

The present invention relates (a) to a control server and a control terminal for use in a control system having a programmable display apparatus, and for checking/controlling (checking and/or controlling) display contents of the programmable display apparatus from a remote location without generating a new display-use screen, (b) to the control system having those, and (c) to a control communication program for use in the control system.

BACKGROUND ART

Conventionally, industrial control apparatuses called as programmable logic controllers (hereinafter, just referred to as PLCs) have been widely used as control apparatuses for controlling various target systems, such as a belt conveyor-type automatic assembling machine, in order to realize various control, for example, sequence control. Furthermore, a use of the plural PLCs in combination has been applied in recent years, as the target system has become more complicated.

Moreover, a display apparatus placed in a vicinity of the PLC is used for displaying data from each PLC or for giving control instructions to the PLCs. A programmable display apparatus, which is an HMI (Human Machine Interface) apparatus, is widely used as the display apparatus in recent years, instead of control panels for giving the control instructions to the PLCs, and display lamps for indicating working states of the PLCs. Apart from this, a control system is, in some cases, arranged such that the control system can be displayed or operated also by a control host computer located in a remote location remote from those display apparatus.

Specifically, for example, as shown in FIG. 44, PLCs 503 has a central role of controlling in a conventional control system 501. Each PLC 503 is connected to a control-object apparatus (an apparatus to be controlled) 521a and a sensor 521b of a target system 502, and a programmable display apparatus 505 for displaying and for giving control instructions. Further, the PLC 503 is connected to other PLCs 503 and a control host computer 507 via a serial cable 504. Sending and receiving of control data between the PLC 503 and the control host computer 507, and between the respective PLCs 503 are carried out by using a communication function of the PLCs 503.

In this arrangement, a display processor 571 of the control host computer 507 communicates with the PLC 503 to receive data that represents a state of the target system 502, then displays a screen in accordance with the state, and sends the control data to the PLC 503 in accordance with input by a user. The target system 502 is controlled in accordance with the control data. Similarly, the programmable display apparatus 505 displays/controls the state of the target system 502, while communicating with the PLC 503.

The above arrangement, however, requires that the screen for the display processor 571 of the control host computer 507 be generated, besides a screen for the programmable display apparatus 505. This arises not only a problem that the generation of the screen is necessary but also a problem that the control host computer 507 cannot check the screen displayed on the programmable display apparatus 505.

Specifically, the programmable display apparatus 505 carries out displaying/controlling in accordance with screen data. The screen data is composed by combining information, where a unit of information is information that represents corresponding relationship between positional information for specifying an area on a base screen, and an address of a device that corresponds to a display or input onto the area. The screen data is generated by an image processor 572 of the control host computer 507, and then is delivered to each programmable display apparatus 505.

Moreover, the control system 501, which is basically a closed system, does not allow seeing the state of the control system, such as the screen of the programmable display apparatus, from a remote location. Arts of seeing states of control apparatuses and the like via the Internet from a remote location are disclosed, for example, in U.S. Pat. No. 5,805,442 (Grant date: Sep. 8, 1998), International Patent Publication No. WO 99/13388 (published on Mar. 18, 1999), and International Patent Publication No. WO 99/13418 (published on Mar. 18, 1999). However, the above problem cannot be solved even by the arts of the Patents.

On the other hand, since the control host computer 507 has different usage and a different installation location from those of the programmable display apparatus 505, the control host computer 507 and the programmable display apparatus 505 are different from each other in terms of (a) hardware arrangements, such as CPUs and memory maps and (b) software arrangements, such as operating systems. Therefore, the display processor 571 cannot control display/control in accordance with the screen data of the programmable display apparatus 505. Thus, the display processor 571 generates a display-use screen of its own. Moreover, it is necessary to go to the installation location of the programmable display apparatus 505 in order to check display contents of the programmable display apparatus 505.

A control program specifies the action of the PLC 503. For this reason, for example, before starting the PLC 503 to operate, or at a time the PLC 503 is corrected for inconvenience, a new control program is generated (corrected) by control program generating software and the like, which is installed in the control host computer 507. The control program is delivered to the PLC 503 via the serial cable 504.

In the control system 501, for updating the control program, a programmer of the control program needs to go near to the control host computer 507 and the PLC 503 so as to operate the control host computer 507 connected to the PLC 503. This arises a problem that updating of program is troublesome.

Furthermore, because the PLCs 503 have been developed from the sequencer, in most cases, different manufacturers use different communication protocols for data communication. Sometimes, different types of PLCs of the same manufacturer use different communication protocols for data communication. Further, because each type of the PLCs 503 uses a different CPU and address map, it is necessary to generate a control program for each type of the PLCs 503. Therefore, the generation (correction) of the control program requires, for each type of PLCs, control program generating software that corresponds to the type of PLCs.

On the other hand, each control program generating software is, as shown in FIG. 44, so arranged that the control program be outputted directly to the PLC 503 via the serial cable 504. Therefore, most of the types of the control program generating software have no function to update the control program from a remote location. However, it is very troublesome to generate new control program generating software that has the function to update the control program of the PLCs 503 from a remote location. Specifically, the control program generating software is sold as a separate application package, in most cases. Therefore, a request of the control program generating software generally goes to a selling agency of the application package.

Moreover, a relatively complicated process is carried out in the control program software because the control program is generated, for example, from a ladder diagram. As a result, it is troublesome to generate new control program generating software, besides the application package. In addition, it is necessary to correct or newly generate the control program generating software for each type of the PLCs, since different types of PLCs use different control programs. Therefore, both of correcting and newly generating of the control program generating software are unrealistic.

DISCLOSURE OF INVENTION

The present invention has an object to realize a control system in which it is possible to check display contents of a programmable display apparatus from a remote location remote from the programmable display apparatus without generating a new display-use screen. Moreover, the present invention has another object to realize a control terminal with which it is possible to update a control program of a control unit from the remote location, by still using a conventional control program generating means.

(1) A control server apparatus of the present invention, in order to attain the objects, is provided with a display apparatus-end communication section, connected to a programmable display apparatus, for receiving data indicating a screen of the programmable display apparatus; a converting section for converting the thus received data into a format that is displayable for a terminal apparatus; and a terminal-end communication section for communicating with the terminal apparatus via a network so as to transmit the data thus converted into the format by the converting section.

In the above arrangement, the converting section converts the data into the format that is displayable for a terminal apparatus, when the display apparatus-end communication section receives the data from the programmable display apparatus. Then, the terminal-end communication section transmits, to the terminal apparatus via a network, such as the Internet, the data thus converted in terms of format. Here, the display apparatus-end communication section of the control server apparatus is directly connected with the programmable display apparatus, without having therebetween a control apparatus for controlling a device. Thus, an amount of communication of the control apparatus will not be increased even though the data indicting the screen of the programmable display apparatus is transmitted, on contrary to a case where the programmable display apparatus and the control server apparatus are connected via the control apparatus. This does not burden the control apparatus.

The control server apparatus is preferably so arranged as to be used in a control system including programmable display apparatuses (i) for acquiring contents of addresses of devices in accordance with screen data composed of a combination of (a) the addresses of the devices corresponding to displays displayed on regions on a screen, and (b) processing instruction words for indicating corresponding relationship between the addresses of the devices and the regions on the screen, and (ii) for displaying the states of the devices on the regions on the screen in accordance with the contents, and as to be provided with a terminal-end communication section capable of communicating with a terminal apparatus; and a converting section for converting the screen data so as to generate a program for inquiring about the contents of the addresses to the terminal-end communication section, and for displaying the states of the devices according to how the terminal-end communication section responds, on one of screen regions of the terminal apparatus that corresponds to a screen region indicated by the screen data, the terminal-end communication section transmitting the program thus generated by the converting section, and acquiring the content of the address that the program is to inquire about, and transmitting to the terminal apparatus the content of the address.

In the above arrangement, the terminal-end communication section of the control server apparatus transmits the program that is generated from the screen data by the converting section. On the other hand, a translating section of the terminal apparatus inquires, in accordance with the program, inquires the terminal-end communication section about the contents of the addresses. When the terminal-end communication section acquires the contents of the addresses and transmits the content to the terminal apparatus, the translating section displays the states of the devices according to how the terminal-end communication section responds, on the one of screen regions of the terminal apparatus that corresponds to the screen region indicated by the screen data.

As a result, the terminal apparatus can display the screen of the content identical to that of the display screen of the programmable display apparatus, without any trouble, as long as the programmable display apparatus can communicate with the terminal-end communication section, for example, even if the programmable display apparatus is accessing the terminal-end communication section from a remote area via the Internet. Moreover, the program for performing the actions mentioned above is delivered from the control server apparatus, thereby eliminating a need of installing in advance a program for display, and reducing a labor and cost of the installing.

Furthermore, because the converting section generates the program form the screen data, it is not necessary to generate a screen for the terminal apparatus, thereby significantly reducing a labor for generating the screen. Moreover, when the screen data for a remote area is not generated besides that for the programmable display apparatus, the screen of the remote area and that of the programmable display apparatus are always identical to each other. Thus, labor of administration is significantly reduced, compared with a case where the screen data for the remote area and that for the programmable display apparatus are separately generated and administered to be identical always.

The control server apparatus is so arranged that each programmable display apparatus includes (a) a designated protocol communication section for communicating with a control apparatus for controlling a device in a designated protocol that is designated to the control apparatus, (b) a common protocol communication section for communicating, regardless of which type the control apparatus is of, in a common protocol that is preset, and (c) a relay section for relaying communication in the designated protocol and communication in the common protocol by converting the protocols from one to the other, and the terminal-end communication section, when the addresses of the devices indicate which of the devices is to be controlled by the control apparatus, (i) transmits an inquiry that inquires the contents of the addresses, in the common protocol to that programmable display apparatus that is connected to the control apparatus, and (ii) acquires the contents of the addresses according to how the programmable display apparatus responds in the common protocol.

In the above arrangement, the programmable display apparatus relays the communication between the designated protocol and the common protocol. As a result, regardless of which designated protocol the terminal apparatus uses, the terminal-end communication section can acquire the content of the address of the device simply by communicating, in the common protocol, with the programmable display apparatus to which the control apparatus is connected. Thus, it is possible to reduce a labor for generating the terminal-end communication section, compared with a case where the communication is carried out in designated protocols respectively designated to control apparatuses.

Another control server apparatus of the present invention is preferable so arranged as to be used in a control system including programmable display apparatuses, in accordance with screen data composed of a combination of (a) addresses of devices corresponding to displays on regions on a screen, (b) addresses of devices corresponding to inputs entered onto the regions on the screen, and (c) processing instruction words for indicating corresponding relationship between the addresses and the regions of the screen, for changing, in response to the inputs, that contents of the addresses of the devices that correspond to the regions onto which the inputs are entered, and as to be provided with a terminal-end communication section capable of communicating with a terminal apparatus; and a converting section for converting the screen data so as to generate a program for giving an instruction to the terminal-end communication section, in response to an input entered onto a screen region of the terminal apparatus that is indicated by the screen data, the instruction for changing the contents of the addresses, the terminal-end communication section transmitting to the terminal apparatus the program generated by the converting section, and changing that contents of the addresses that are indicated by the instruction for changing the contents of the addresses.

Again in the arrangement, similarly to the control server apparatus, the terminal-end communication section of the control server apparatus transmits to the terminal apparatus the program that is generated from the screen data by the converting section. On the other hand, a translating section of the terminal apparatus sends to the terminal-end communication section an instruction to change the content of the address, in accordance with the program. Then, the terminal-end communication section changes the content of the address.

As a result, the terminal apparatus can control the operation of the device on the screen of the content same as that of the display screen of the programmable display apparatus, without any trouble, as long as the programmable display apparatus can communicate with the terminal-end communication section, for example, even if the programmable display apparatus is accessing the terminal-end communication section from a remote area via the Internet. Furthermore, because the converting section generates the program from the screen data, and causes the terminal apparatus to execute the program, as in the above arrangement, it is not necessary to generate a screen for the terminal apparatus, thereby significantly reducing a labor for generating and administrating the screen, and a labor and a cost for installation.

Moreover, the control server apparatus is different in that the control sever apparatus used in the control system and the terminal-end communication section transmit in the common protocol the instruction for changing the contents of the addresses, to the programmable display apparatus to which the control apparatus is connected, when the addresses of the devices indicate which of the devices is to be controlled by the control apparatus.

Therefore, regardless of which designate protocol the terminal apparatus uses, the terminal-end communication section can change the content of the address of the device simply by communicating, in the common protocol, with the programmable display apparatus connected with the control apparatus. As a result, it is possible to reduce a labor for generating the terminal-end communication section, compared with a case where the communication is carried out in designated protocols respectively designated to control apparatuses.

Moreover, the respective control server apparatuses are preferably arranged that the terminal-end communication section communicates with the terminal apparatus via the Internet. This does not need communication cost, which depends on a distance between the control server apparatus and the terminal apparatus, unlike a case of communication via a public telephone line of the circuit switched connection system. Moreover, this enables a support staff of the control system to display/control by operating the terminal apparatus in a location connectable to the Internet, as by operating the programmable display apparatus. As a result, it is possible to maintain the control system without having the support staff of the control system in a vicinity of the control server apparatus.

A control system of the present invention is provided with the programmable display apparatuses including (a) the designated protocol communication, (b) the common protocol communication section, and (c) the relay section; and a control server apparatus including (d) a display apparatus-end communication section, connected to the programmable display apparatuses, for receiving data indicating screens of the programmable display apparatuses, (e) a converting section for converting the thus received data into a format that is displayable for a terminal apparatus, and (f) a terminal-end communication section for communicating with the terminal apparatus via a network so as to transmit the data that is converted into the format by the converting section.

With the above arrangement, in which the programmable display apparatus converts the designated protocol and the common protocol from one to the other as does the aforementioned control server apparatus, the control server apparatus can communicate in the common protocol, regardless of which designated protocol the terminal apparatus uses. This eliminates a labor of subscribing a new control apparatus in the control system. Moreover, because the control server apparatus receives data indicting the screen of the programmable display apparatus, converts the data in terms of the format, and transmit the data to the terminal apparatus, it is possible to display, on a terminal apparatus in a remote area, the screen having the same content as that of the display screen of the programmable display apparatus, without putting a burden on the control apparatus.

(2) A control terminal apparatus of the present invention, in order to attain the objects, is provided with a wide area network communication section of being connected, via a wide area network, to a local control system including a control unit for controlling a control object in accordance with a control program, and a control display apparatus for communicating with the control unit so as to display or control a control state of the control unit; and a serial port simulating section for presetting which local control system having a control unit that is to receive the control program, and for receiving, as a proxy of a serial port, the control program which a control program generating section outputs to a serial port, and transmits, to the local control system, instruction data indicating the control program and the control unit to receive the control program, so as to instruct the wide area network communication section to give an instruction for updating the control program.

In the above arrangement, the serial port simulating section receives the control program as the proxy of the serial port, when the control program generating section is about to output the control program to the serial port. Then, the serial port simulating section instructs the wide areas communication section to send to a preset local control system the instruction data indicating a control unit and a control program to receive the control program. On the other hand, the local control system updates, with the control data indicated by the instruction data, the control program of the control unit specified by the instruction data, when the local control system receives the instruction data via the wide area network such as the Internet.

A control system of the present invention is provided with the control terminal apparatus, and a local control system including a control unit for controlling a control object in accordance with a control program, and a control display apparatus for displaying or controlling a control state of the control unit, the control display apparatus having (a) a designated protocol communication section for communicating via the serial interface in a designated protocol designated to a type of the control unit so as to display or control the control state of the control unit, (b) a common protocol communication section for communicating with a network other than the serial interface, regardless of which type the control apparatus is of, in a common protocol that is preset, and (c) a relay section for relaying communication between the designated protocol section and the common protocol section, the local control system including a display apparatus specifying section for specifying, via the wide area network, the control display apparatus connected to the control unit to receive the control program, in accordance with instruction data, which the local control system receives from the wide area network, and instructing, in the common protocol and via the network, the control display apparatus to update the control program.

In the above arrangement, when the control terminal apparatus transmits the instruction data, the display apparatus specifying section of the local control system specifies the control display apparatus, to which the control unit to receive the control program is connected, in accordance with the instruction data. Then, the display apparatus specifying section instructs, in the common protocol, the control display apparatus to update the control program. On the other hand, in the control display apparatus, that instruction to update the control program, which is received by the common protocol communication section, is relayed by the relay section, and transferred to the control unit via the designated protocol communication section and the serial interface. In this way, the control program of the control unit is updated.

In the above arrangement, the communication in the designated protocol designated to the control unit and the communication in the common protocol are relayed by the control apparatus, which is requisite to the local control system, and which possesses enough processing capacity and communication capacity, as compared with the control unit, because the control apparatus communicates with a user when displaying/controlling. Because of this, the display apparatus specifying section can instruct the updating of the control program, always in the common protocol, even in a case where control units of different types coexist in the local control system, and in case where a control unit of a new type is added to the local control system. Thus, regardless of which type of control unit the reception end uses, it is possible to reduce labor for manufacturing the display apparatus specifying section.

(3) A control system of the present invention, in order to attain the objects, is so arranged as to be provided with an acquiring section for displaying a state of a device on a display-use screen that has been generated in advance, and for acquiring screen data and device data from a control display apparatus for giving a control instruction for the device via the display-use screen, the screen data being for the display-use screen, and device data indicating a state of the device; a generating section for generating terminal-use data for displaying the display-use screen on a display surface of the terminal apparatus, in accordance with the screen data and device data thus acquired; and a communication section for communicating with the terminal apparatus via a network so as to transmit the terminal-use data to the terminal apparatus.

In the above arrangement, when the acquiring section acquires the screen data and the device data, the generating section generates the terminal-use data in accordance with the data. The terminal data is transmitted to the terminal apparatus via the network by the communication means. In this way, displayed on the terminal apparatus is the display-use screen in accordance with the screen data and the device data.

Another control system of the present invention is, in order to attain the above objects, is so arranged as to be provided with the control display apparatus including a recording section for storing therein screen data, which is data of the display-use screen, and a transmitting section for transmitting the screen data stored in the recording section in accordance with a request from a terminal apparatus; a communication section for acquiring, from the control display apparatus, device data indicating a state of the device, the communication section being capable of communicating with the terminal apparatus via a network; an execution program recording section for storing therein an execution program for causing the terminal apparatus to perform an action of inquiring the communication section about the device data corresponding to the screen data transmitted, and an action of displaying the display-use screen on the terminal apparatus in accordance with a response to the inquiring; and a generating section for generating terminal-use data for displaying the display-use screen on a display surface of the terminal apparatus, in accordance with the thus acquired screen data and the device data, the communication section transmitting the execution program and the terminal-use data to the terminal apparatus so as to cause the terminal apparatus to perform the actions, and acquiring device data that is inquired about by the terminal, so as to transmit the device data.

In the above arrangement, when the terminal apparatus requests the transmission of the screen data, the transmitting section transmits the screen data stored in the recording section. Then, the generating section generates, in accordance with the screen data, the terminal-use data containing the program for executing the respective actions. The terminal-use data and the execution program (such as an applet) stored in the execution program recording section are transmitted to the terminal apparatus via the network by the communication section. Moreover, the communication section transmits the device data, which the communication section acquires from the control display apparatus, to the terminal apparatus, when the terminal apparatus inquires for the device data, by executing the execution program. The terminal apparatus that has received the device data, executes the execution program by using the terminal-use data, so as to display the display-use screen in such a manner that the state of the device is reflected on the display-use screen.

(4) A control system of the present invention, in order to attain the objects, is provided with a control display apparatus for displaying a state of a device on a display-use screen that has been generated in advance, and for giving a control instruction for the device via the display-use screen; a server apparatus including a server-end communication section for acquiring device data from the control display apparatus, and for transmitting the device data, the device data indicating the state of the device; a plurality of terminal apparatuses including a terminal-end recording section for storing screen data in a format suitable for display processing, the screen data being for the display-use screen, a display processing section for inquiring the server-end communication section about whether or not the server-end communication section has acquired the device data corresponding the screen data stored in the terminal-end recording section, and for displaying the display-use screen in accordance with the device data transmitted from the server-end communication section, and a terminal-end communication section for communicating with the server-end communication section via a local network so as to receive the inquiry from the display processing section and the device data as a reply for the inquiry.

In the above arrangement, in the terminal apparatus, the display processing section acquires the device data corresponding the screen data stored in the terminal-end storing section, by inquiring the server-end communication section, so as to display the display-use screen in accordance with the device data.

The control system is preferably arranged such that the server apparatus includes a server-end storing section for storing the screen data in a format suitable for display processing, and a communication relay section for relaying communication between the server-end communication section and a public network, the server-end communication section acquiring the screen data stored in the server-end storing section and giving the screen data to the communication relay section, and the display processing section (a) inquires the server-end communication section, by relay communication via the relay section via the public network, about whether or not the server-end communication section has acquired the screen data stored in the server-end storing section and the device data corresponding thereto, and (b) displays the screen-use screen in accordance with (i) the screen data transmitted from the server-end communication section by the relay communication and (ii) the device data corresponding thereto, (c) causes the server-end communication section to perform the communication via the local network for acquiring the screen data stored in the terminal-end storing section, and (d) causes the sever-end communication section to perform the communication via the public network for acquiring the screen data stored in the server-end storing section.

With this arrangement, in the terminal apparatus, the display processing section acquires the screen data stored in the server-end storing section and the device data corresponding thereto by inquiring the server-end communication section by the relay communication via the relay section via the public network, so as to display the display-use screen in accordance with the screen data and the device data corresponding thereto. Moreover, because the display processing section acquires any one of the screen data in accordance with the instruction from a user, communication via the local network or that via the public network is automatically selected. Thus, the user can perform communication suitable for a receiver of that screen data, without paying special attention to the selecting the communication. Therefore, while a user does not notice it, it is possible to perform a communication suitable for an end that acquires the screen data.

(5) In order to attain the objects, a control system of the present invention, for accumulating data regarding a control apparatus to which an input apparatus and an output apparatus are connected, by communication, via a designated network in a communication protocol designated to the control apparatus, between the control apparatus and display-type control apparatuses, which display control states of the input and the output apparatus caused by the control apparatus, and which give a control instruction to the control apparatus, and by communication, via a common network in a common communication protocol, between a host computer provided ranking above the display-type control apparatus, and at least one of the display-type control apparatuses, wherein: the display-type control apparatus includes: a protocol converting section for converting the communication protocols used in both the networks from one to the other; and a delivery section for delivering to the host computer, a user program for displays a control states of the control apparatus, the user program being executed when a preset delivery condition is satisfied, respective change elements, which are corresponded to addresses of the input and the output apparatus in the user program, and which are changed in accordance with data of the control instruction and the output data resulted from the control instruction data, and the control instruction data and the output data corresponding to the change elements, and the host computer includes: an accumulating section for accumulating the user program, the change elements, and both the data, which are thus delivered, sequentially in time sequence and per the display-type control apparatus; a searching section for consecutively searching and displaying the user program, the change elements and both the data accumulated in the accumulating section; a converting section for converting, into an execution program executable for a terminal apparatus, the user program searched out by the searching section as requested by the terminal apparatus; and a communicating section for transmitting the execution programs, the change elements, and both the data to the terminal apparatus that executes the execution program, so as to change the change elements in the user program in accordance with both the data.

In the above arrangement, the output data from the control apparatus is transferred to the display-type control apparatus via the designated network. In the display-type control apparatus, the protocol converting section converts the communication protocol of the designated network into the communication protocol of the common network. Thereafter, the output data is transferred from the display-type control apparatus to the host computer connected via the common network.

Moreover, when a predetermined delivery condition (such as specific time, specific interval) is satisfied, the executed user program (for example, a screen displayed on the programmable display apparatus, and a ladder program of a PLC), the respective change elements of the user program (for example, a symbol on the screen, and a ladder symbol on the ladder program), the control instruction data, and the output data, which correspond to the change elements, are delivered to the host computer. Then, the executed user program, the change elements, the control instruction data, and the output data are accumulated sequentially in time sequence per display-type control apparatus, by the accumulating section in the host computer.

Moreover, because the searched out user program is continuously displayed, a status of the user program at a time the control apparatus was in action can be reproduced. Further, when the user program searched out by the host computer is converted into the execution program by the converting section, the converted execution program is transmitted to the terminal apparatus by the communication section, together with the change elements and both the data. In the terminal apparatus, when the execution program is executed, the change elements in the user program are changed in accordance with both the data. As a result, for example, states of changing the change elements are displayed on the screen.

(6) A recording medium of the present invention is also arranged to store therein a control communication program for causing a computer to execute respective section so as to realize the control server apparatus, the control terminal apparatus, and the control system by software. When the program is read out from the recording medium and executed, the computer acts as the control server apparatus, the control terminal apparatus, and the control system.

For a fuller understanding of the nature and advantages of the invention, reference should be made to the ensuing detailed description taken in conjunction with the accompanying drawings.

BRIEF DESCRIPTION OF DRAWINGS

FIG. 6 is an explanatory view illustrating a relationship between the screen data and the screen to be displayed where the switch of the programmable device of the control system is ON.

FIG. 7 is an explanatory view showing a main portion of an applet that is generated by a compiler in the control system.

FIG. 13 is an explanatory view showing an example of a display-use screen for setting conditions as to a network in the control system of FIG. 12.

FIG. 17 is an explanatory view showing an example of an XML file to deliver from an open server to a client apparatus, in the control system of FIG. 16.

FIG. 18 is an explanatory view showing an example of an HTML file to deliver from an open server to a client apparatus, in the control system of FIG. 16.

FIG. 20 is an explanatory view showing an example of an HTML file to deliver from an open server to a client apparatus, in the control system of FIG. 19.

FIG. 41(a) is an explanatory view showing a format for retaining a record as to a screen that is to be stored in the database.

FIG. 41(b) is an explanatory view showing a format for retaining a record as to a ladder program that is to be stored in the database.

FIG. 42 is an explanatory view showing a format for retaining a record as to a screen and a ladder program that are to be stored in the database.

FIG. 43(a) is an explanatory view showing delivery conditions setting screen that is set by a delivery setting section in the personal computer.

FIG. 43(b) is an explanatory view illustrating a delivery station and a reception station that are set by the delivery setting section in the personal computer.

BEST MODE FOR CARRYING OUT THE INVENTION

The present invention is explained in more detail below via embodiments. However, the present invention is not limited to those.

First Embodiment

Explained below is an embodiment of the present invention with reference to FIGS. 1 to 30.

Figure 1:
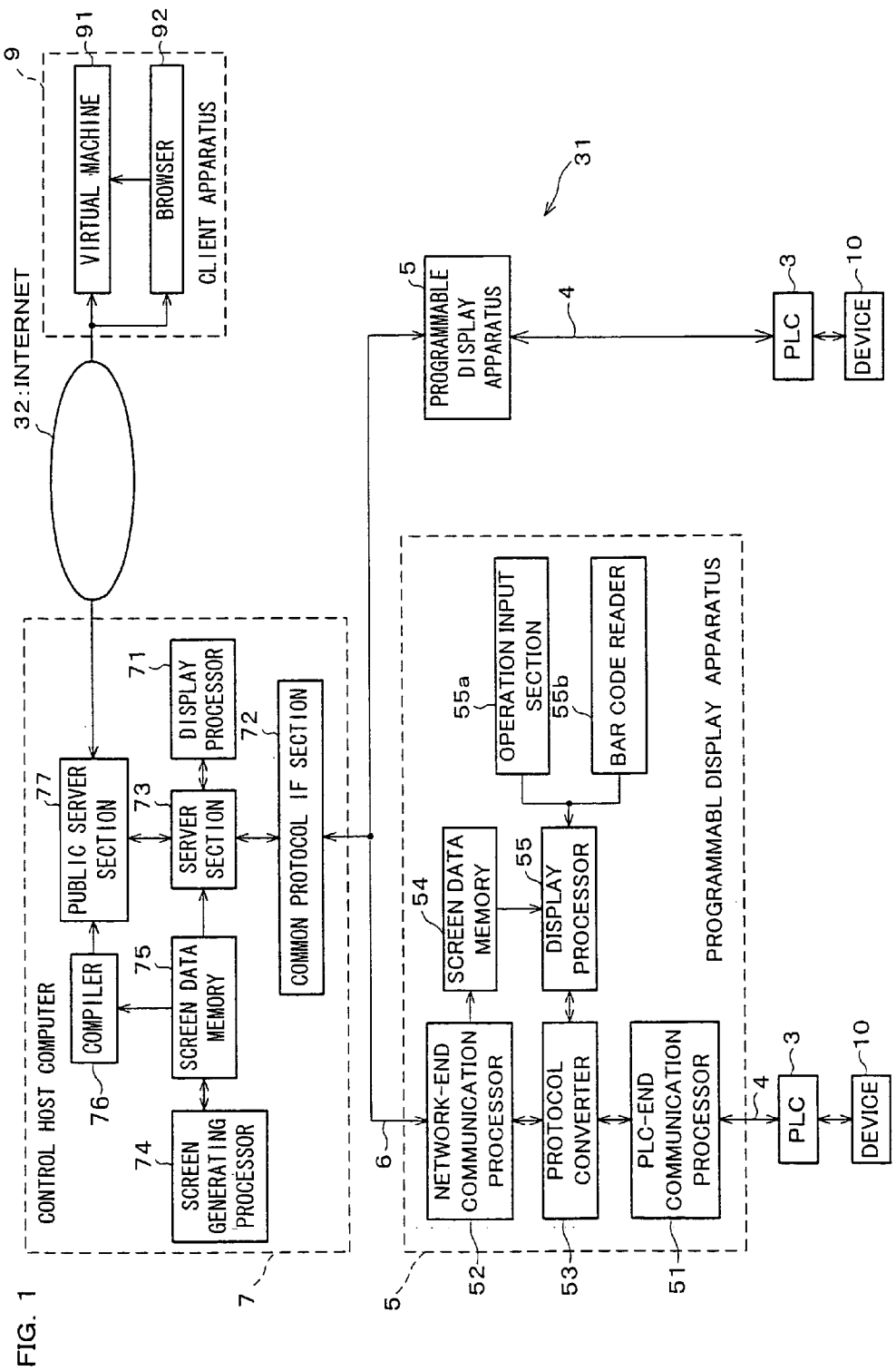
FIG. 1 is a block diagram illustrating an arrangement of a control system according to a first embodiment of the present invention.

A control system according to the present embodiment shown in FIG. 1 is a system that is especially suitable for use in controlling a target system that is controlled by a plurality of PLCs, which work in combination, for example, in case where the target system is an automatic assembling machine of a belt conveyer type.

The present control system is provided with programmable logic controllers (PLCs) 3, programmable display apparatuses (hereinafter, just referred to as display apparatuses) 5, a network 6, a control host computer (hereinafter, just referred to as a control computer) 7, and a client apparatus (terminal apparatus) 9.

The PLCs 3, which are control apparatuses for controlling respective devices 10 that compose target systems in accordance with a control program stored in advance, are connected with the display apparatuses 5 via serial cables 4. The PLCs 3 are provided with a CPU/power source module, an input unit, and an output unit. The CPU/power source module is provided with (a) a CPU section including a CPU and a memory, and (b) a power source section for supplying an electric power to each section of the PLCs 3. The CPU section controls the devices 10, which are control-object apparatuses (apparatuses to be controlled), in accordance with a control program. Specifically, the CPU section processes control data to be given to an output apparatus in accordance with a signal inputted via the input unit from an input apparatus, where the input apparatus and the output apparatus are the devices 10. The input unit and the output unit are component having an interface function to be connected with an input apparatus and an output apparatus, respectively. The input unit and the output unit exchange with the CPU section a digital signal or an analogue signal that is exchanged between those apparatuses.

As the input apparatuses, apparatuses such as sensors (temperature sensor, optical sensor), switches (push-button switch, limit switch, pressure switch and the like) are used. As the output apparatuses, actuators, relays, magnetic valves, and display apparatuses are used. Those input apparatuses and output apparatuses are positioned in each of target sections (where the apparatuses need be positioned) of various target systems such as manufacturing lines.

The display apparatuses 5 are operated by an operator in a vicinity of the target systems, in most cases. The display apparatuses 5 are connected with each other via the network 6. Moreover, a control computer 7 is connected to the network 6. On the other hand, the client apparatus 9 can be connected to the control computer 7 via the Internet 32. In most cases, the control computer 7 carries out supervising control, setting, and the like process as to the whole control system, from a remote location remote from the display apparatuses 5. Moreover, the target system, the display apparatuses 5, and the control computer 7 compose a local control system 31.

The display apparatuses 5 are provided with (a) a memory such as a RAM, a ROM, a flash ROM, a VRAM and the like, and (b) a processor such as a CPU. Those memory and processor control action of each section of the display apparatus 5. The display apparatuses 5 are display apparatuses that can control input and screen display in accordance with screen data determined by combining process instruction words (tag). The display apparatuses 5 are provided with a PLC-end communication processor 51 (dedicated protocol communication means), a network-end communication processor 52 (common protocol communication means), a protocol converter 53 (relay means), a screen data memory 54, and a display processor 55.

The PLC-end communication processor 51 is connected to the serial cable 4, while the network-end communication processor 52 is connected to the network 6. The protocol converter 53 relays communication between both the communication processors 51 and 52, while the screen data memory 54 stores the screen data. The display processor 55 carries out display processing in accordance with (a) the screen data, (b) operation by the operator on an operation input section 55a, such as a touch panel, (c) communication results, and the like. In addition, a bar code reader 55b or an ID sensor (not shown) and the like may be another input means.

Figure 2:
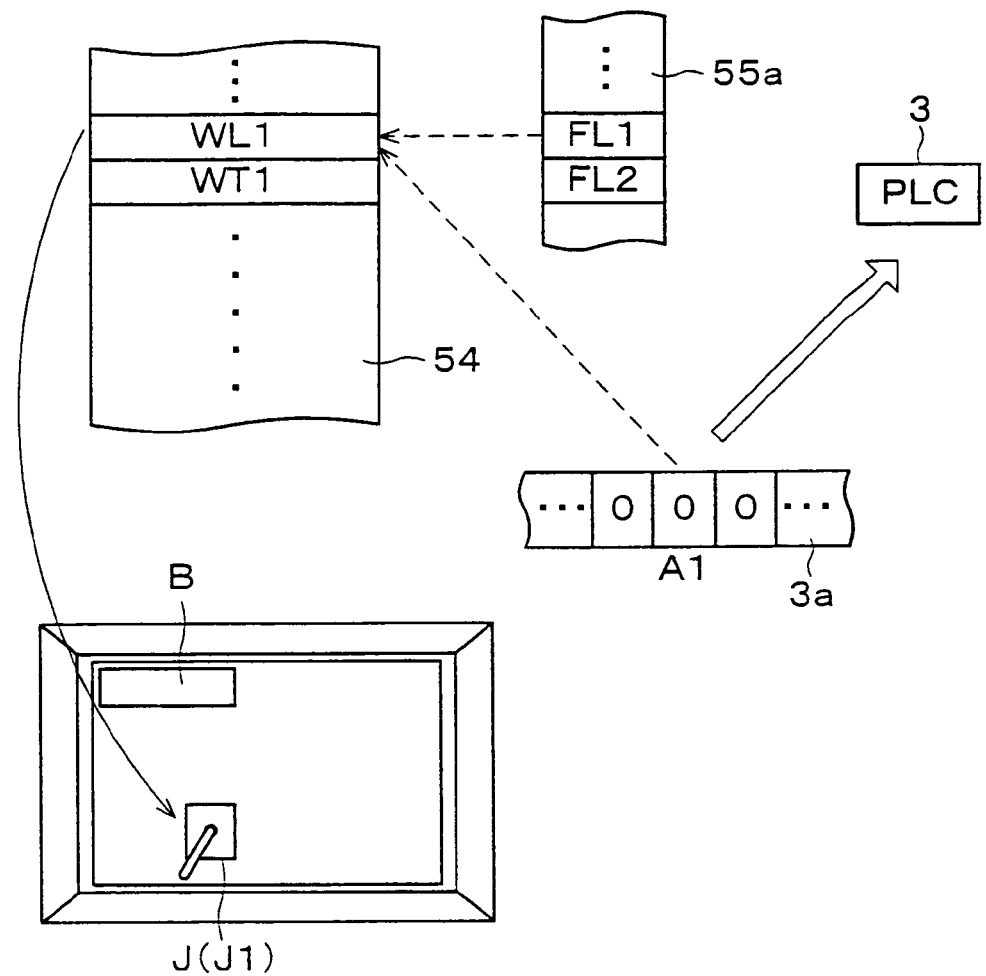
FIG. 2 is an explanatory view showing a relationship between screen data and a screen to be displayed, where a switch of a programmable display apparatus of the control system is OFF.

In the present embodiment, the display processor 55 can switch over between a plurality of unit screens. Each unit screen is formed by arranging, on a base screen, for example, (a) a stationary figure B, such as a name plate, whose display content will not be changed, component figure J (J1), such as a switch, a lamp, or a meter, which is converted in terms of its display conditions such as shapes, colors, and turning-on-and-off conditions, as shown in FIG. 2.

Figure 3:
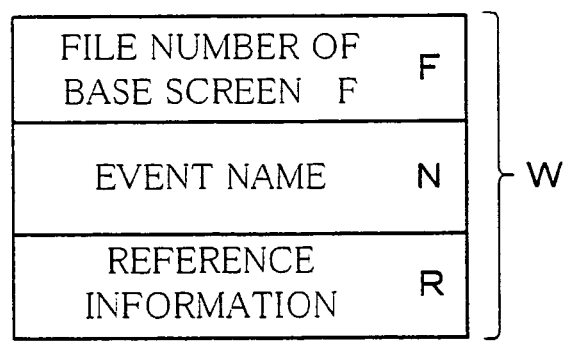
FIG. 3 is an explanatory view illustrating a data structure of process instruction words included in the screen data.

On the other hand, the screen data for displaying the screen is, as shown in FIG. 3, composed by combining (a) a file number F of the base screen, (b) an event name N for specifying contents of operation that should be performed on the base screen, and (c) a process instruction word (tag) W including one or more of reference information R, which is referred to for each event to be carried out (carry-out event).

Figure 4:
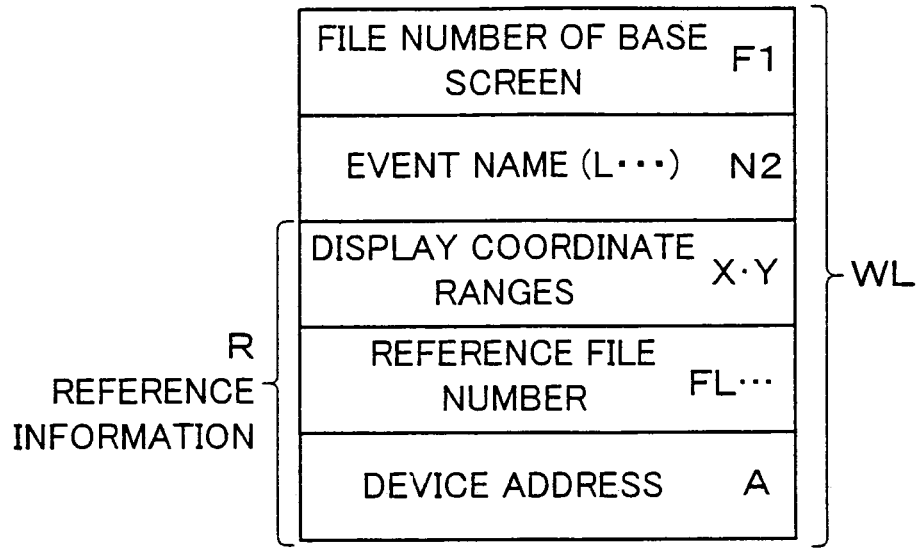
FIG. 4 is an explanatory view showing a data-structural example of a process instruction word for display, among the above-mentioned process instruction words.

A process instruction word WL shown in FIG. 4 is specifying information for specifying a display component. The process instruction word WL is used, for example, when a component figure J that corresponds to contents of a predetermined device address is displayed on a predetermined screen region (display coordinate ranges). Included in the reference information R of the process instruction word WL are display coordinate ranges (X·Y), device address A, and a file number FL to be referred to when displaying. Examples of the file number FL are a file of a figure representing ON and a file of a figure representing OFF, when the component figure J is a switch.

Figure 5:
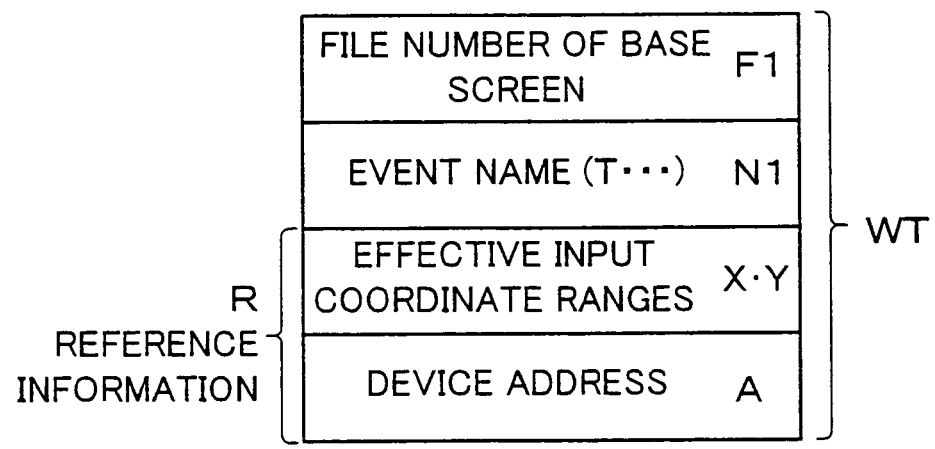
FIG. 5 is an explanatory view showing a data-structural example of a process instruction word for input, among the above-mentioned process instruction words.

A process instruction word WT shown in FIG. 5 is specifying information for specifying input operation via the input operation section 55b. Reference information R of the process instruction word WT includes (a) effective input coordinate ranges X×Y on a touch panel of the input section 24, and (b) a device address A that is turned ON in linkage with specifying of the input coordinate ranges.

On the other hand, the file number F of the base screen extracts, in a predetermined time interval, the process instruction words WL (display tag), which are the base screen that is being displayed, from the screen data memory 54, and reads out contents of the device address A of each display tag WL from a memory 3a of the PLC 3, so that the display processor 55 of the display apparatus 5 displays, on the screen, the component figure J corresponding to the contents. For example, in FIG. 2, the display tag WL1 stored in the screen data memory 54 represents a display of a switch, and corresponds to an apparatus of the device address A1.

When the display tag WL1 is carried out, the display processor 55 judges that the switch is OFF, because the contents of the device address A1 is "0". Then, the display processor 55 displays, in the display coordinate ranges (X·Y), a figure of the file FL1 that is corresponded to OFF, among the files stored in the memory 55a of the display processor 55. By doing this, the component figure J1 that represents the switch in the OFF state is displayed in the coordinate ranges (X·Y). As described above, the display processor 55 carries out the display tag WL1 in the screen data in the predetermined time interval, so that a state of device will be reflected in the screen on the display apparatus 5.

Moreover, upon reception of the input operation of the operator, such as pressing a touch panel (not shown), the display processor 55 reflects the input operation in the screen. In order to do this, the display processor 55 searches the screen data of the screen data memory 54 and searches out the process instruction word WT (input tag) that corresponds to the base screen that is being displayed, and that matches with the input operation. Then, in accordance with an input result, the display processor 55 changes the contents of the device address A indicated by the input tag WT.

For example, where the effective input coordinate ranges (X·Y) are set to be the same coordinate ranges as the component figure J1, and an input tag WT1 that changes the contents of the same device address A1 is included in the screen data, the input tag WT1 is found as a result of search performed by the display processor 55, when the operator presses the component figure J1 on the display-use screen shown in FIG. 2. In this case, the display processor 55 rewrites the contents of a device address A1 that corresponds to the input tag WT1, for example by giving instructions to the PLC-end communication processor 51 or the network-end communication processor 52.

Figure 6:
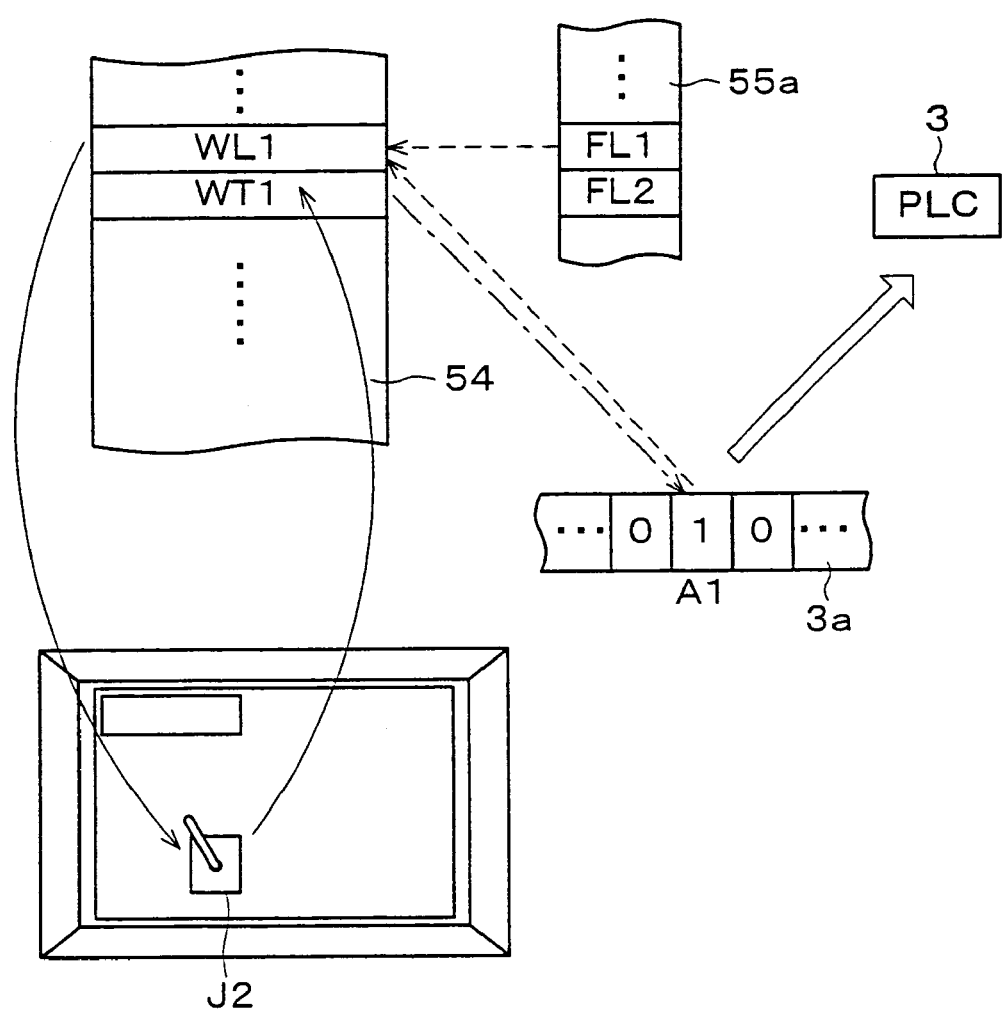

Further, after the input operation, the contents of the device address A1 is changed to "1", when the display processor 55 processes the display tag WL1. By doing this, the display processor 55 displays a component figure J2 that corresponds to a file FL2 and represents ON, as shown in FIG. 6. Because of this, the display processor 55 can rewrite the contents of the device address in accordance with the input operation, and can update the screen display in accordance with the contents of the device address.

Note that the device address A is an address for specifying a device to be an object of control (a device to be controlled), and represents one region of a storing apparatus provided to the display apparatuses 5, the PLCs 3, the control computer 7 or the like, such as the memory 3a of each PLC 3. Moreover, the device may be a memory that stores data manually inputted from an input apparatus such as the operation input section 55a or the bar code reader 55b. Further, as described later, the contents of each address can be acquired and the contents can be changed, for example, via communication of the PLC-end communication processor 51 or the network-end communication processor 52 with the PLCs 3 or another display apparatuses 5. The acquisition/changing may be carried out by giving instructions on each time of the acquisition/changing of the contents of each address. Alternatively, it may be so arranged that the display apparatuses 5 is provided with a chase so that the acquisition/changing may be carried out synchronously to an entity of the device address A, by accessing to the chase when the acquisition/changing of the contents is carried out, and communicating in every predetermined interval or for each predetermined event.

The control computer 7 (control server) is provided with a display processor 71, a common protocol (interface) IF section 72 (display apparatus-end communication means) and a server section 73. The control computer 7, in most cases, can display and control the state of the target systems, the PLCs 3, the display apparatuses 5 and the like, from a remote location that is remote from the display apparatuses 5. The display processor 71 performs supervising control of the whole control system, while the common protocol IF section 72 is connected with the network 6. The server section 73 responds to a request from the display processor 71 and the like, by communicating with each display apparatus 5 via the common protocol IF section 72 and the network 6.

Moreover, the control computer 7 is provided with a screen generating processor 74 for generating screen data of the display apparatuses 5, and a screen data memory 75 for storing the generated screen data. Screen data that regulate display/control action of the respective display apparatuses 5 are integrally generated (corrected) by the screen generating processor 74, then are delivered to the respective display apparatuses 5 via the server section 73, the common protocol IF section 72 and the network 6.

Here, the screen data is composed by combining the tags (process instruction word) that represent corresponding relationship between the region on the screen and the address of the device that corresponds to display and input on the region, as described above. The screen generating processor 74, for example, displays a pallet of tags, and prompts a user to select a tag and to place the desired tag on the screen. Moreover, the screen generating processor 74 displays thus placed tag on a specified coordinates. The screen generating processor 74 adjusts the coordinates of the tag in accordance with dragging and dropping by the user. Moreover, the screen generating processor 74 prompts the user to input a device address that relates to an input tag or a display tag.

By operating the screen generating processor 74 in accordance with this, the user can place the tag in the desired location on the screen and can generate the screen data simply by associating the tags and the addresses of the devices respectively. Because of this, the display and action of each display apparatus 5 can be more easily decided (changed), compared with a case where a display program of the display apparatus 5 is corrected. Therefore, a user of the control system (user of the control computer 7) can have the display and action of the display apparatus 5 adjusted according to actual conditions of the target system, level of skill of the operator of the display apparatus 5, or what the user likes.

The control computer 7 is further provided with a compiler 76 (converting means) and an open server section 77 (terminal-end communication means). The compiler 76 converts the screen data itself which the display apparatus 5 is using so as to displaying, or screen data having the same structure as the screen data, into an applet in the Java (Registered Trademark) language, which allows a virtual machine 91 of the client apparatus 9 to carry out an equivalent process. The open server section 77 delivers the applet to the client apparatus 9 via the Internet 32, and communicates with the applet that is carried out by the client apparatus 9.

The compiler 76 stores, for each type of the tags, classes including methods that are to be carried out by the virtual machine 91, in a storing apparatus (not shown) in advance. Moreover, the compiler 76 can generate a code that calls out a method, for each type of the tags of the screen data, wherein the method corresponds to the type of the tag for which the method is called out, and the compiler 76 can output the applet.

Specifically, for example in case of the display tag, the method is a drawing method that is called out in a predetermined time interval so that the method requests data of a specific device address from the open server section 77, and carries out display that corresponds to a response. Moreover, in case of the input tag, the method is an input method that is called out when an input event occurs, and requests the open server section 77 to write, into a specific device address, data that corresponds to an input result.

On the other hand, upon receipt of an instruction to generate the applet, the compiler 76 reads, out of the screen data memory 75, screen data that corresponds to the applet to be generated, and extracts a tag from the screen data. Moreover, the compiler 76 generates an instance of the class that corresponds to the type of the tag that is an object of conversion, in accordance with the type of the tag extracted from the screen data. And, the compiler 76 outputs, to a field of the instance, a character string (code) for setting a parameter of the tag.

In the present embodiment, as shown in FIG. 7, the type of tag and the parameter are specified as variable numbers of a <param> component, while "Gpj.class" generates the instance and sets the parameter, in accordance with the variable number. Further, after the output of the character string is ended as to all the tags in the screen data, the compiler 76 attaches, in front and behind the code generated in accordance with each tag, a character string (a character strings such as "<HTML>", "<TITLE>") that are necessary as HTML (HyperTExt Markup Language) documents, and a character string (such as <APPLET>) that are for operating the generated code as applets, then finishes compiling.

In this manner, the compiler 76 can generate the applet to cause the client apparatus 9 to display the same screen as a screen displayed in case the display apparatus 5 displays the screen data. Moreover, the compiler 76 of the present embodiment stores the generated applet (HTML document) in a storing apparatus (not shown) in such a manner that the applet is associated with the screen data, because the generated applets are identical in contents, as long as the screen data is not altered. The open server section 77 reads out the identical screen data from the storing apparatus, upon request of the identical screen data. This improves a generating speed, compared with a case the compiling is carried out for every request.

Moreover, the open server section 77 distinguishes the screen data that the client apparatus 9 requests, for example in accordance with URI (Universal Resource Identifier) or the like, and sends the applet to the client apparatus 9 via CGI (Common Gateway Interface), BGI (Binary Gateway Interface), or the like. In addition, the open server section 77, upon receipt of instructions of obtaining/altering contents of the device address A, relays the instructions, and sends the instructions of obtaining/altering the contents to an entity of the device address, for example, the display apparatus 5 itself, or the PLC 3 connected with the display apparatus 5, similarly to the case where the display apparatus 5 communicates with other display apparatuses 5 or the PLC 3 so as to obtain/alter the content of the device address A.

Note that, the open server section 77 is also able to reduce its response time with respect to the applet, by caching the contents of the device address, as the display processor 55 does.

The client apparatus 9 is, in addition to the virtual machine 91, provided with a browser 92 that is realized by a general-purpose browser software and the like. The browser 92 causes the virtual machine 91 to execute the applet that the browser 92 receives through communication with an apparatus connected with the Internet 32. Moreover, the browser 92 can receives and looks over a document such as the HTML document, from the server apparatus via HTTP (Hyper Text Transfer Protocol), for example.

Figure 8:
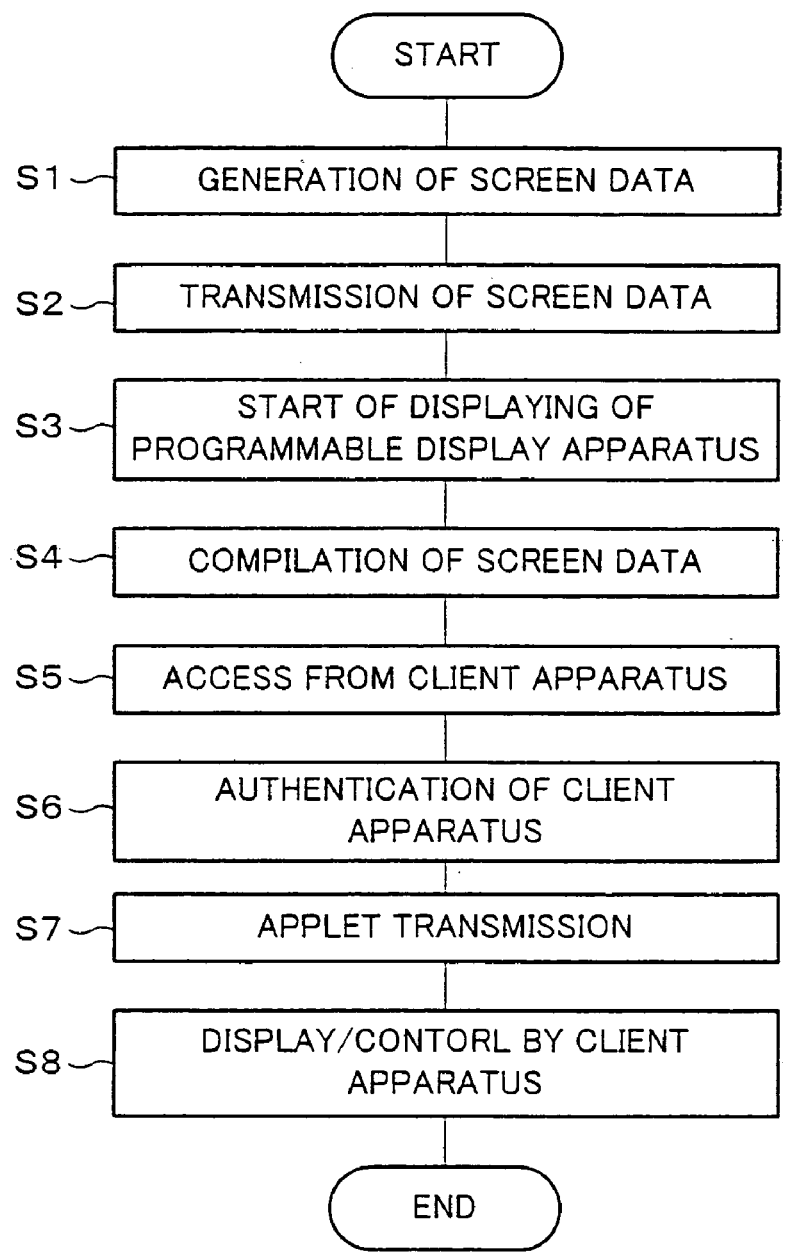
FIG. 8 is a flow chart illustrating how the control system is operated.

The above-mentioned control system operates in a procedure of a flow chart shown in FIG. 8. To begin with, a user of the control system operates the previously-discussed screen generating processor 74 so as to generate/modify the screen data according to how the target system actually is, how an operator of the display apparatus 5 is skilled, or as the user prefers (S1). Further, the generated screen data is transmitted to the display apparatus 5 after the screen data is checked as to whether it operates normally, for example by simulation or connection test (S2). Then, the display apparatus 5 starts displaying in accordance with the screen data (S3).

Here, a most suitable screen cannot be defined to a particular screen, because what is the most suitable screen depends on factors such as the preference and skill of a user. Therefore, the screen is frequently converted comparatively. However, the present embodiment can smoothly deal with those requests, because, as described above, in the present embodiment, the user of the control system (the control computer 7) can generates the screen data by combining the tags. Therefore, the screen can be most suitable all the time. Moreover, because the management is carried out integrally by the control computer 7, the screen data is more easily managed, compared with a case in which the management is carried out in many places at the same time.

The compiler 76 compiles the screen data generated at S1, and generates the applets, then stores the applets in the storing apparatus (not shown) (S4).

While the control system is operated, the browser 92 accesses to the open server section 77, via the Internet 32, so as to instruct the open server section 77 to display a screen of a display apparatus 5 (S5). In response to this, the open server section 77 carries out authentication as to whether the display/control by using the screen is authorized or not for the client apparatus 9, so that the open server section 77 rejects an access from an unauthorized client apparatus 9 (S6). Here, checked is, for example, whether or not an identification number and a password received from the client apparatus 9 have a predetermined combination.

When it is checked that the client apparatus 9 is an regularly authorized one, the open server section 77 reads out, from the storing apparatus, an HTML document that includes the applet that is requested by the client apparatus 9, among the applets compiled at S4. Then, the open server section 77 sends the HTML document to the client apparatus 9 via the Internet 32 (S7).

On the other hand, at S8, the browser 92 extracts an applet element (a portion from "<APPLET>" to "</APPLET>") from the received HTML document, so as to cause the virtual machine 91 to execute the applet. In this manner, the virtual machine 91 carries out the same display/control as the display apparatus 5 does, via communication with the open server section 77.

Specifically, at a predetermined time interval, the virtual machine 91 executes a drawing method of instance in accordance with each display tag in the applet. As a result, the virtual machine 91 makes an inquiry to the open server section 77 as to the contents of the device address A. Meanwhile, the open server section 77 instructs the server section 73 to read out the contents of the device address A. The server section 73, as described later, obtains the contents of the device address A, then transmits the contents to the open server section 77, similarly to the case where the display processor 71 reads out the contents of each device address. Further, when the contents of the device address A are transmitted from the open server section 77 to the virtual machine 91 via the Internet 32, the drawing method updates the display of display region (X·Y) in accordance with the contents of the device address A.

Here, the applet is a result of compiling of the screen data. Each instance of the applet is set so as to refer to the same device address as a corresponding tag in the screen data. Moreover, each instance is generated so as to display the same screen as the tag, provided that the contents of the device address are same. Therefore, when the applet is executed, the part figure J1 (J2) that indicates the state of the device is displayed on the display-use screen of the client apparatus 9, as in FIGS. 2 and 6.

Note that action of switching unit screens is also realized as an input tag on the screen data of the present embodiment. The input tag is associated with, as a device address, a region in which data indicating a unit screen currently displayed, among the display regions in the display apparatus 5. Therefore, when the applet in which the screen data of a display apparatus 5 is compiled is executed in the client apparatus 9, the client apparatus 9 and the display apparatus 5 display the same unit screen all the time.

When input is carried out by using a mouse or the like in the virtual machine 91 during the execution of the applet, the virtual machine 91 executes the input method of an instance in accordance with the input operation, among instance corresponding to the input tags in the applet. In this manner, the virtual machine 91 requests the open server section 77 to write the data according to an input result, into a specific device address.

On the other hand, upon receipt of a request of writing from the virtual machine 91, the open server section 77 transmits the request to the server section 73. Further, the server section 73 rewrites the contents of the device address A, similarly to the case where the display processor 71 controls the device. As a result, the client apparatus 9 has the display-use screen that reflects on a result of the action as the display apparatus 5 does, at a time the drawing method is carried out after the writing.

Note that the flow chart shown in FIG. 8 explains the example where the screen data generated at S1 is compiled by the compiler 76 and stored in advance. However, the present invention is not limited to this. For example, the compiling of the screen data requested by the client apparatus 9 may be executed when the screen data is not compiled. In this case, a response speed to the client apparatus 9 is slower at first compiling. However, it is possible to update the screen data after the compiling to reduce possibilities of recompiling. Thereby, it is possible to reduce the number of times the compiling is executed.

As described above, in the control system of the present embodiment, the compiler 76 compiles the screen data, and generates the applet that can be executed on the virtual machine 91 of the client apparatus 9, and then the open server section 77 transmits the applet via the Internet 32. With this arrangement, the client apparatus 9 can display the screen that is identical with the screen to be displayed on the display apparatus 5, and control the PLC 3 and the display apparatus 5 by performing the same action as the display apparatus 5, even in a case where no program for supervising and controlling is pre-installed in the client apparatus 9, or in a case where the client apparatus 9 is in a remote location.

Moreover, the control computer 7 converts the screen data into the applet and makes the applet public. Because of this, a new screen data for use in the remote location is not necessary for the user of the control system. Thereby, significantly saved is labor for generating the screen. Further, when no screen data for the remote location is specially generated, the screen in the remote location and the screen on the display apparatus 5 are maintained to be identical all the time. Thereby, labor for management is significantly reduced, compared with a case the screen data for the both are separately generated and controlled to be identical with each other all the time.

Note that the present embodiment is explained referring to the example where the applet is generated that causes the client apparatus 9 to perform (a) the action of transmitting the inquiries and the instructions of converting in the same manner as the display apparatuses 5 do, and (b) the action of displaying in accordance with the response, and the control computer 7 relays the transmission of the contents of the device address. But the present invention is not limited to this.

For example, the control computer 7 may communicate with the display apparatus 5 so as to generate a file in the bit map format or in the JPEG format, which has identical contents to that of the screen display of the display apparatus 5, and to transmit the file to the client apparatus 9. The control computer 7 receives the data representing the screen of the display apparatus 5, and converts the data in terms of the format so that the data has a format in which the client apparatus 9 can display the data. Thereafter, the control computer 7 transmits the data to the client apparatus 9. In this way, it is not necessary to pre-install in the client apparatus 9 the program for the displaying and controlling of each display apparatus 5. Thereby, labor, time, and cost for installing are saved.

However, if communication speed between the control computer 7 and the client apparatus 9 is slow, for example in case they communicate with each other via the Internet, speed of updating the screen on the client apparatus 9 is reduced when the data representing the screen is transmitted.

On the contrary, in the present embodiment the control computer 7 (a) distributes the applet for causing the client apparatus 9 to ask the inquiry, to give instructions of converting, and to display, and (b) relays the transmission of the contents of the device address. This significantly reduces an amount of data transmitted, and greatly improves the response speed of the client apparatus 9. Moreover, it is possible to further improve the response speed, because the client apparatus 9 end can deal with a user interface such as moving a cursor.

In addition, almost similar effect can be obtained by sending an execution program for causing the client apparatus 9 to execute action similar to that of the applet, instead of sending the applet, wherein the execution program is generated for example by compiling a program language such as BASIC.

However, it is possible to execute the applet even if a machine language that an operation system (OS) and a CPU of the client apparatus 9 can execute is different, provided that the client apparatus 9 is provided with the virtual machine 91, where the control computer 7 transmits the applet so that the virtual machine 91 interprets the applet so as to display and control. Therefore, it is possible to perform the display/control at a greater number of the client apparatuses 9, in the same manner as the display apparatuses 5, without increasing varieties of the applets to be generated by the control computer 7.

Moreover, in the present embodiment, the control computer 7 and the client apparatus 9 communicates with each other via the Internet 32. Because of this, the control computer 7 and the client apparatus 9 can communicate with each other by being respectively connected to nearest Internet service providers (ISP) via the public network, even if they are located remotely from each other. Therefore, communication cost is significantly lowered, compared with a case where they are respectively connected via a public telephone line of the circuit switching type.

In addition, the communication via the Internet 32 allows the user of the client apparatus 9 to supervise and control without hindrance, as he uses the display apparatus 5, even if (a) the client apparatus 9 and (b) the system being composed of the control computer 7, the display apparatuses 5, and the PLCs 3 are located respectively in different countries. As a result, the user of the client apparatus 9 can be accurately informed of the state of the system, and give appropriate advice to an operator of the system, thereby support the operator, even if he is in a country other than the country in which the system is located. Therefore, it is not necessary to have a large number of support personals in vicinity of the system, thus significantly reducing labor for supporting.

By the way, in the present embodiment, the control computer 7 communicates with the display apparatus 5 in order that the open server section 77 of the control computer 7 obtains/coverts the contents of the address of the device. But, the present invention is not limited to this. Similarly to the conventional system shown in FIG. 44, the control computer 7 may directly communicate with the PLC 3 so as to obtain/convert the contents of the address of the device.

However, in this case, for communicating with the PLC 3, the control computer 7 needs to communicate in a dedicated protocol specific to the type of the PLC 3. Because of this, it is necessary to have labor for generating a communication program for the control computer 7.

Figure 44:
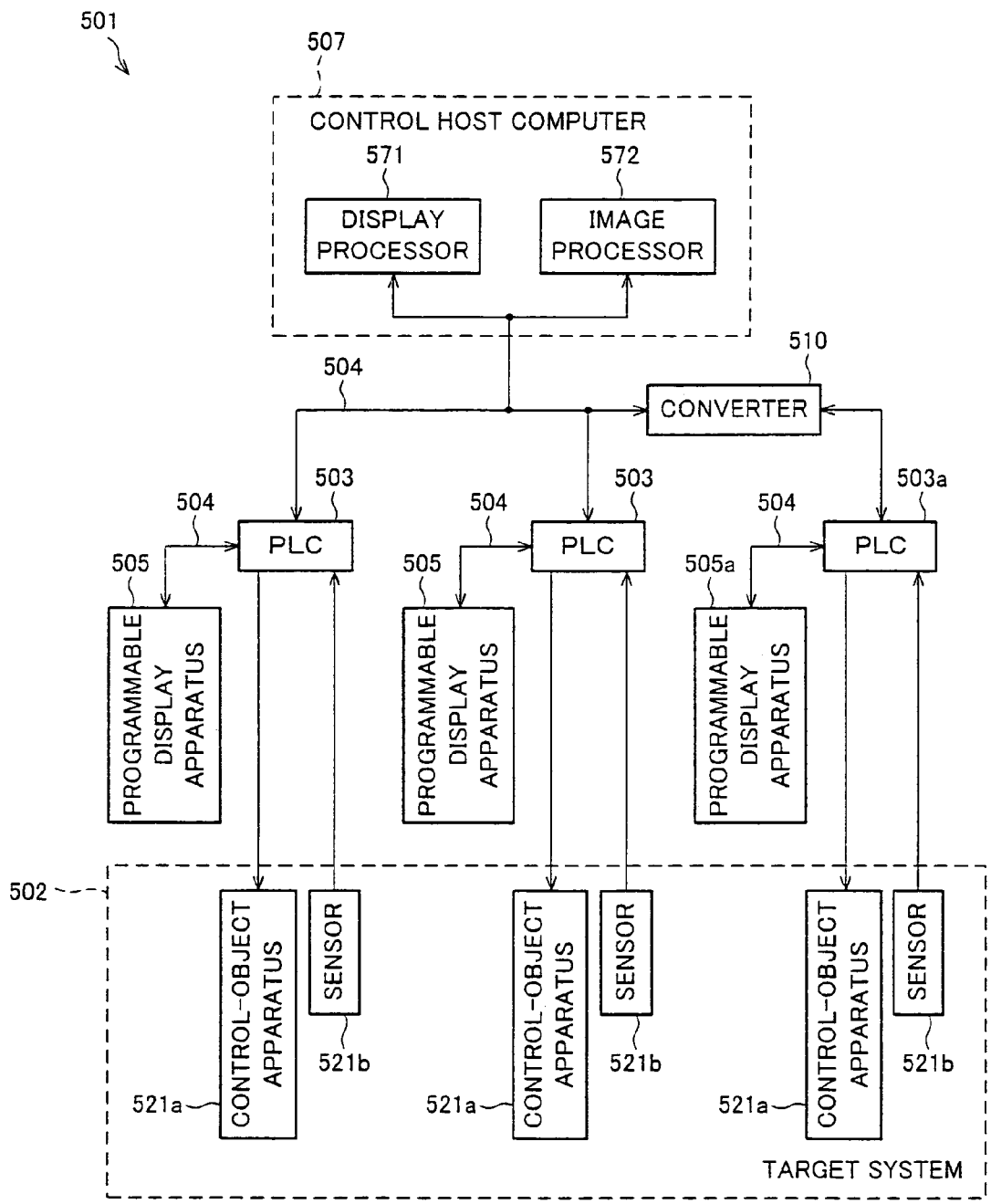
FIG. 44 is a block diagram showing a conventional control system.

In the present embodiment, on the contrary, the protocol is converted by the display apparatuses 5, which are requisite to the control system, and whose calculating ability and memory capacity are not fully used compared with the PLCs 3. This allows the computer 7 to communicate in the common protocol, regardless of the types of the PLCs 3. Thus, it is possible to significantly reduce the labor for generating the communication program. Note that the display apparatuses 5 need to communicate in the dedicated protocol for communicating with the PLCs 3, even if the display apparatuses 5 are connected as shown in FIG. 44. Therefore, even if the display apparatuses 5 are provided between the control computer 7 and the PLCs 3, the labor for generating the communication protocol for the display apparatuses 5 will not be increased.

Specifically, in the control system of the present embodiment, a protocol (the common protocol) for transmission in the network 6 is specified so that data strings 61 (See FIG. 10) to be transmitted in the network 6 in displaying/controlling are identical among the PLCs 3 of different types, when the contents of the display or the contents of the control is identical, regardless of the types of the PLCs 3. Moreover, the display apparatus 5 that is provided in a central position in the communication inter-converts the common protocol and the dedicated protocols that are respectively specific to the types of the PLC 3, so that that display apparatus 5 relays the communication between (a) the PLC 3 to which that display apparatus 5 is connected, and (b) the control computer 7 or another display apparatus 5. In this manner, the control computer 7 and each display apparatus 5 can communicate with each other in the common protocol even if different dedicated protocols are used between the PLCs 3 that are respectively connected to the display apparatuses 5.

The target system is provided with a control-object apparatus, for example, a valve or a motor, which operates in accordance with instructions, or devices 10, which may be a flow sensor or a temperature sensor, which detects a state of respective components in the target system. On the other hand, the PLCs 3 respectively communicate with the devices 10 so as to control the respective devices 10 in accordance with the control program stored in advance. The control program is transmitted to each PLC 3, for example by being transmitted from the control computer 7 via the display apparatus 5.

Here, because the PLCs 3 have been developed from the sequencer that uses a relay, in most cases, different control programs are used by the PLCs 3 of different manufacturers, and different product types for example, so that each type of PLCs 3 uses not only its own control program, but also its own dedicated protocol. Therefore, the PLC 3, which is connected with the display apparatus 5 via the serial cable 4, communicates with the display apparatus 5 in the communication protocol in which the PLC 3 can communicate.

Figure 9:
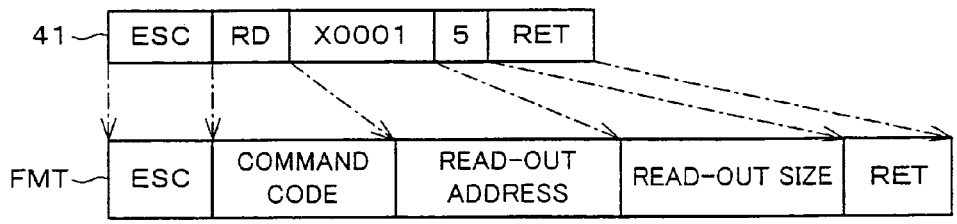
FIG. 9 is an explanatory view showing an example of a data transmission format that is used in a dedicated protocol in the control system.

In the dedicated protocol, when read-out of data is instructed, as schematically shown in FIG. 9, transmitted is a data string 41, which includes a control code (ESC) for indicating that a code transmitted next is a command, a command code (RD) for instructing the PLC 3 to read out the data, a read-out starting address (X0001), a read-out size (5) and a control code (RET) for indicating an end of the transmission. However, in most cases, the respective PLCs 3 are different from each other in terms of (a) sequences for the address, size, and the like, (b) the control code itself, (c) a representation format for representing the address or the code (for example, a type of code for representing a bit width or a character for indicating the numeral value), or (d) commands systems, in which the command code is included.

On the other hand, the network 6 of the present embodiment is, for example, a LAN (Local Area Network) such as the Ethernet (Trademark: Xerox Corp.). In the network 6, the respective display apparatuses 5 and the control computer 7 communicate with each other in the TCP/IP protocol. Because of this, a communication apparatus capable of communicating in the TCP/IP can freely participate in the network 6 without disturbing transmission of data between other communication apparatuses, for example, even if a control host computer (not shown) or the like used by a developer of the control system is in a location different from where an operating company of the control system, and is connected from the location via the telephone line.

Note that, in the TCP/IP protocol, each module, such as TCP modules or IP modules, attaches a header for use in transmission, to the data string 61 to be transmitted. However, in the present specification, wordings "the data string 61 to be transmitted via the network 6" are used to mean "data string, which a upper layer requests a TCP module to transmit, and which the TCP module of reception end to send to the upper layer".

Figure 10:
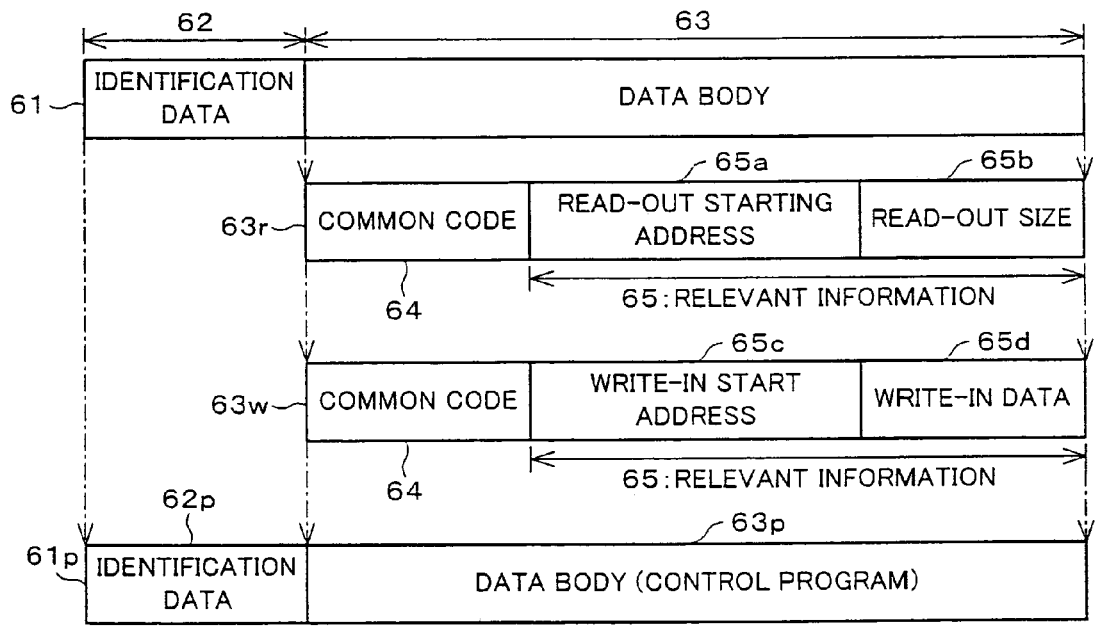
FIG. 10 is an explanatory view illustrating an example of a data transmission format that is used in a common protocol in the control system.

In the present embodiment, in the common protocol, which is specified for use in transmission in the network 6, the data string 61 includes (a) identification data 62, which is for identification, for example, as to whether the data string 61 is the data for displaying/controlling or the control program, and (b) a data body 63, as shown in FIG. 10. Further, as the data for displaying/controlling, a data body 63$r$ used in sending to the PLC 3, for example, a command for instructing data read-out includes (a) a common code 64 for representing contents of the command, and (b) a read-out starting address 65$a$ and a read-out size 65$b$, which are relevant information 65 to be attached to the common code 64. Moreover, the data body 63$w$ for instructing data write-in includes a write-in start address 65$c$ and a write-in data 65$d$, as relevant information 65.

In the common code 64, regardless of the command codes of the PLCs 3, a universal code is used for commands having the same contents, among the commands understandable for each of PLC 3. Moreover, also unified regardless of the types of the PLCs 3 are order and format of transmission of data of relevant information 65, such as reading-start address 65$a$ and reading size 65$b$. This makes it possible to specify one command for one meaning in the common protocol, regardless of which PLC3 is connected to the display apparatus 5. Further the data strings 61 to be transmitted through the network 6 when displaying/controlling have the same data string, regardless of the types of the PLCs 3.

Here, the display apparatuses 5, as described above, are provided with the PLC-end communication processor 51, the network-end communication processor 52, and the protocol converter 53, which are shown in FIG. 1. In case the dedicated protocol and the common protocol are different from each other, the protocol converter 53 inter-converts the protocols from one to the other. In this way, the display apparatus 5 can display on its screen the states of the PLC 3 connected thereto or that of the PLC 3 connected to the other display apparatus 5, while relaying communication in the dedicated protocol and communication in the common protocol according to need. Moreover, the display apparatus 5 outputs instructions for the PLC 3 in accordance with operation by an operator.

Note that the conversion of protocol is carried out, for example, by a method disclosed in International Patent Publication WO NO. 99/56186 (Published on Nov. 4, 1999).

The protocol converter 53 stores, as protocol information for inter-converting the protocols, (a) a data transmission format FMT for representing a format of the data string 41 to be transmitted in the dedicated protocol, and (b) a command code in the designated protocol, (c) a command conversion table TBL for representing a corresponding relationship between a command code in the dedicated protocol and the command code.

Specifically, as shown in FIG. 9, the data transmission format FMT is a skeleton-like data string, which is a part of the data string 41, and in which a part changed in accordance with the data contents to be actually changed, for example data contents for reading and writing, a data size or address for reading and writing, is left undefined. Only usage is defined in the undefined part. In addition, where a region for command code is left undefined, when a data transmission format FMT extruded from a data string to be transmitted actually is common between a plurality of commands, it may be so arranged that the regions of the command codes are also undefined and the data transmission format is used in common between the commands.

Figure 11:
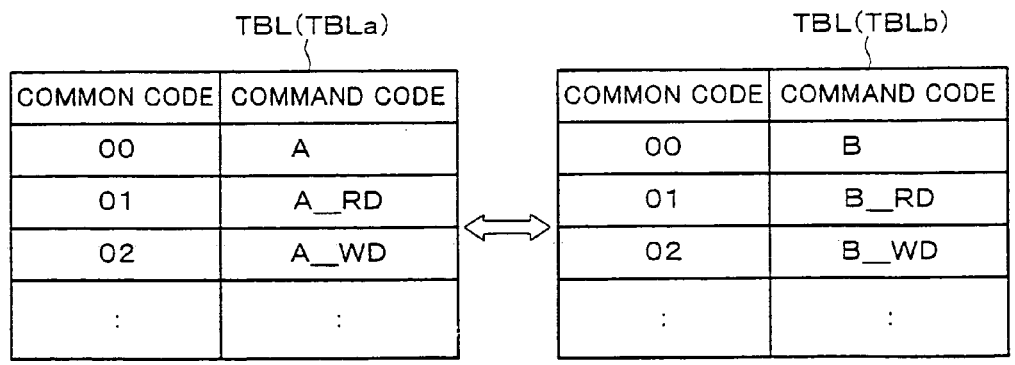
FIG. 11 is an explanatory view showing an example of command conversion tables to look up for mutual conversion of the dedicated protocol and the common protocol by the programmable display apparatus.

Moreover, the command conversion table TBL, as shown in FIG. 11, shows correspondence between the command code 64 and the command code of the PLCs 3 connected to the serial cables 4. The protocol converter 53 converts one code into another code.

Before the display apparatuses 5 and PLCs 3 transmit the data regarding the display and control, combination between the data transmission format FMT and the command conversion table TBL is set in accordance with the communication protocol of the PLCs 3, so that the protocol information is changed over when a PLC 3 using a different communication protocol is connected. For example, if a PLC 3 of type A is replaced with a PLC 3 of type B, a command conversion table TBLa is changed over to a command conversion table TBLb, which are shown in FIG. 11.

Note that, the communication protocol may be selected, for example, by user's operation of the computer 7 or the display apparatuses 5. Further, the display apparatuses 5 themselves may send, to the PLCs 3, a command that can specify the communication protocol of the PLCs 3, while sequentially selecting communication protocols that can be sent out, and may identify the communication protocol automatically in accordance with a response code from the PLCs 3. Moreover, the display apparatus 5 may be so adopted as to store the protocol information, with respect to all the communication protocols used by PLCs 3 that can be connected to the display apparatuses 5, or may be so adopted that the display apparatuses 5 stores only a communication protocol of PLCs 3 currently connected thereto, and downloads in accordance with need. The downloading may be carried out in various methods, such as from the control computer 7 or using a recording medium.

As described above, while the control system is operating, the protocol converter 53 generates the data string 41 to be sent and received to/from the PLCs 3. In this way, the display apparatuses 5 can send and receive data to/from the PLCs 3, without asking where inputted data come from, and can respond to the replacement of the PLCs 3, without stopping the control system.

Here, the display apparatuses 5 are requisite elements to the control system. For displaying a high-resolution screen, the display apparatuses 5 recently have a recording capacity of, for example, a few M bits (in general, PLCs have a few tens bits), and an operation speed that is fast enough for such displaying. Therefore, the display apparatuses 5 can perform the protocol conversion with a sufficient reserve capacity, compared with a PLC 3 suitable for the I/O control.

Moreover, because there is no PLC 3 between the display apparatuses 5 and the control computer 7, the PLCs 3 can concentrate in controlling the target systems. Therefore, by having the conventional arrangement shown in FIG. 44, that is, by connecting the respective PLCs 503 with each other and connecting the respective PLCs 503 with the display apparatuses 505, it is possible to reduce the recording capacity and operation ability of the PLCs, compared with the arrangement in which the PLCs 503 process most of communication within the control system 501.

Note that, one of examples of processes in which a large amount of communication is processed is a process in which the screen data is downloaded from the control computer 7 to the display apparatus 5 when the product to be manufactured by the target system is going to be changed to another product. However, in the local control system 31 of the present embodiment, the screen data does not pass through the PLCs 3. Therefore, normal action of the PLCs 3 is maintained because the PLCs 3 do not have a large workload even when the screen data is downloaded.

Moreover, the respective display apparatuses 5 and the control computer 7 communicate with each other in the common protocol, regardless of the types of the PLCs 3. Therefore, this allows plural types of PLCs 3 to be in the same local control system 31, thus giving more varieties in selecting the types. Further, the common communication protocol is used in the network 6 in the local control system 31. Therefore, it is possible to freely utilize apparatuses, such as a hub, a bridge, and a rooter, which are to be connected to the network 6. Further, this improves a degree of freedom as to the positional arrangements of those apparatuses and the PLCs 3. In addition, it is possible to reduce a manufacturing cost of the local control system 31 as a whole, because it is not necessary to have a converter 510 (see FIG. 44) of the conventional control system.

In addition, in the present embodiment, where the display apparatus 5 converts the protocols, apparatuses such as the display apparatus 5 and the control computer 7, which are connected to the network 6, can communicate with each other in the common protocol, regardless of the types of the PLCs 3. Therefore, the server section 73 and the common protocol IF section 72 of the control computer 7 can communicate only in the common protocol with the respective display apparatuses 5 and the PLCs 3 via the display apparatuses 5.

More specifically, the server section 73 identifies, based on the device address, a recipient (IP address) that will receive the data that may be a write-in request, a read-out request, or the like. In case the recipient is the display apparatus 5, the server section 73 transmits the data to the IP address in the common protocol. On the other hand, if it is judged that the device address is the PLC 3, the server section 73 transmits the data to the display apparatus 5 of the IP address that is connected to the PLC 3.

Note that, association between the respective display apparatuses 5 and the respective IP addresses is determined when the display apparatuses 5 are connected to the network 6, for example, via designation by the user of the control computer 7, or via allotting a vacant IP address by the control computer 7. The association is stored in the storing region (not shown) of the server section 73. Moreover, for example in case those addresses are determined for each display apparatus 5, the device address of the respective display apparatuses 5 and the device addresses of the PLCs 3 to be connected with the display apparatuses 5 are determined by the control computer 7 by reading out a correspondence table stored in the display apparatus 5, or by distributing a correspondence table to the display apparatuses 5 if the addresses can be set by the control computer 7. Therefore, the server section 73 can, by looking up to the correspondence table of the device addresses and the correspondence table for the IP addresses, determine the IP address, which will be a recipient for a reading-out request or a writing-in request.

Here, each section in the display apparatus 5, the control computer 7 and the client apparatus 9 is a function block that is realized by such an arrangement where processing means such as a CPU executes a program stored in storing means such as a ROM or a RAM, so as to control input/output means such as a touch panel or a liquid crystal display apparatus, or a communication circuit such as an interface circuit. Therefore, it is possible to realize the display apparatus 5, the control computer 7 and the client apparatus 9, simply by a computer that has those means, the computer reading a recording medium (for example, a CD-ROM) that stores therein the program, and executing the program. Especially, it is possible to realize the virtual machine 91 and the browser 92 of the client apparatus 9 by using general-purpose browser software, which is pre-installed on most of computers. Those computers can be operated as the client apparatuses 9, without installing a special program.

Note that, if a program for downloading programs via another communication path, such as the serial cable 4, the network 6, and the Internet 32, or the like is pre-installed in the computer, it is also possible to distribute the program to the computer via the communication path.

Next, another configuration of the control system is explained.

Figure 12:
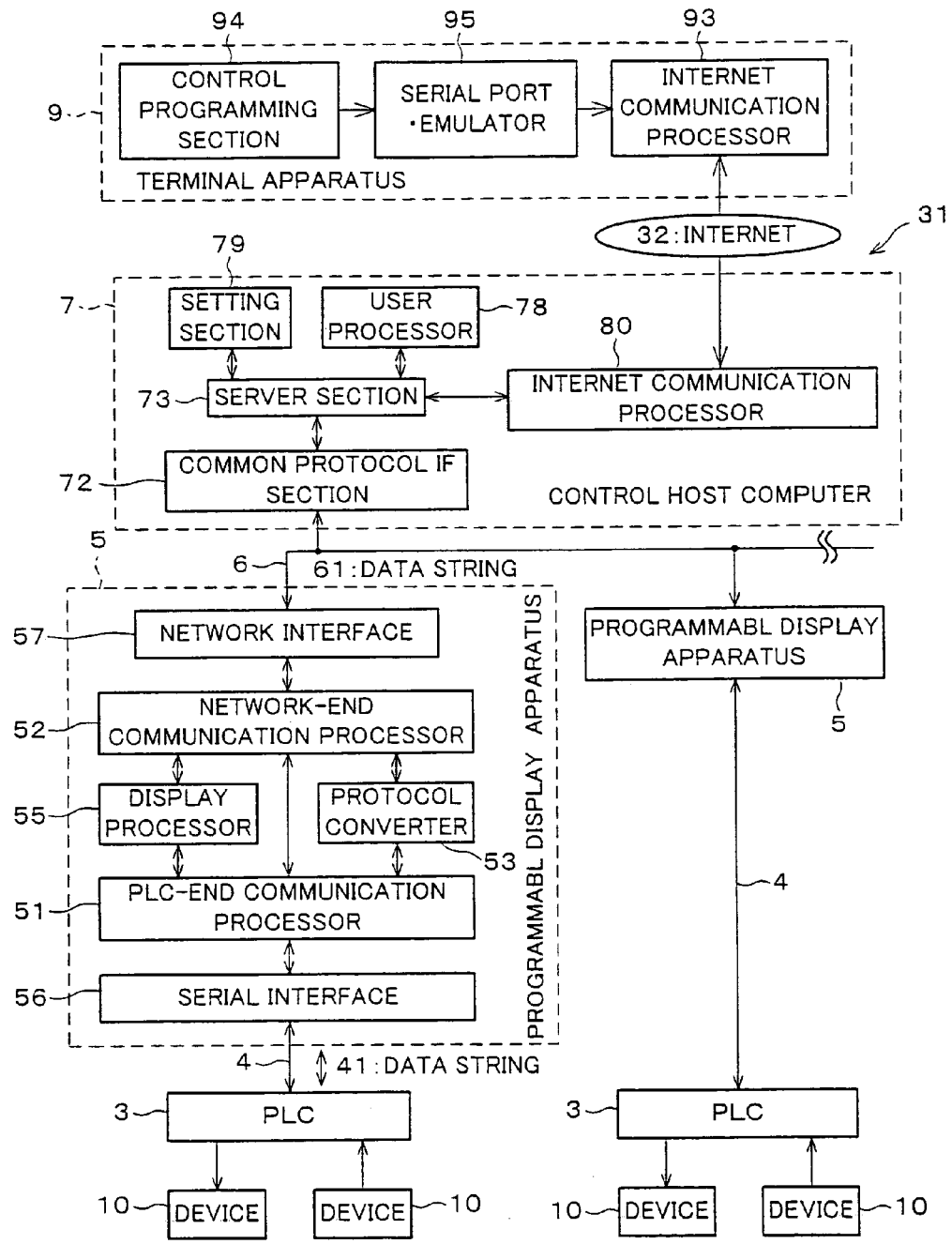
FIG. 12 is a block diagram illustrating an arrangement of another control system.

In a local control system 31 of the present control system shown in FIG. 12, display apparatuses 5 have almost a similar arrangement as the display apparatuses 5 shown in FIG. 1. The display apparatus 5 of the present control system is provided with (a) a serial interface 56 that is provided between a serial cable 4 and a PLC-end communication processor 51 (dedicated protocol communication means), and (b) a network interface 57 that is provided between a network 6 and a network-end communication processor 52 (common protocol communication means and relay means). Although, both the interfaces 56 and 57 are not mentioned in the explanation on the control system of FIG. 1, the display apparatus 5 in the control system of FIG. 1 is also provided with both the interfaces 56 and 57.

Moreover, a display processor 55 of the display apparatus 5 instructs the network-end communication processor 52 so as to output, to another display apparatus 5, a data reading/writing command (command for reading and writing data) for a device 10 connected to the another display apparatus 5, when the display processor 55 displays/controls a state of the device 10. The data reading/writing command is specified in a common protocol. This allows the display processor 55 to communicate with the PLC 3 connected with the another display apparatus 5, without knowing a type of the PLC 3.

On the other hand, the PLC-end communication processor 51 communicates with the PLC 3 in a dedicated protocol that is specific to the PLC 3. In accordance with requests from a protocol converter 53 and the display processor 55, the PLC-end communication processor 51 outputs, to the PLC 3, the data reading/writing command and a control program that is outputted by the PLC-end communication processor 51. In case the PLC-end communication processor 51 receives from each of sections 51, 53, and 55 instructions to communicate with the PLC 3, the PLC-end communication processor 51, for example, stores the instructions temporarily, then processes the instructions one by one, so as to output commands and control programs requested by the respective instructions to communicate.

The network-end communication processor 52 sends and receives data string 61 to/from another display apparatus 5 and the control computer 7. Moreover, the network-end communication processor 52 identifies usage of a data body 63 (for what purpose the data body 63 is used), in accordance with identification data 62 in the thus received data string 61. In case the data body 63 is data for displaying/controlling, the network-end communication processor 52 gives the protocol converter 53 the data body 63. Moreover, in case the data body 63 is a control program, the network-end communication processor 52 gives the PLC-end communication processor 51 the data body 63, so that the PLC-end communication processor will send the control program to the PLC 3. Further, in case the data body 63 is screen data that represents a background screen of the display apparatus 5 or a location of a figure element corresponding to the device 10, the network-end communication processor 52 gives the data body 63 to the display processor 55 so as to update the screen data. On the contrary to this, when the network-end communication processor 52 receives the data body 63 from the protocol converter 53, the PLC-end communication processor 51 or the display processor 55, the network-end communication processor 52 attaches the identification data 62 to the data body 63, and sends the data body 63 to another display apparatus 5 or the control computer 7.

The protocol converter 53 generates the previously discussed data string 41 (see FIG. 9) that the protocol converter 53 sends and receives to/from the PLC 3 on real time while the local control system 31 is operating.

The control computer 7 further is provided with a user processor 78 and a setting section 79. The user processor 78 instructs a server section 72 so as to carries out processes such as a process of displaying/controlling a state of each devices 10 and a process of accumulating.

The setting section 79 performs setting of the whole local control system 31, for example, setting a station name and IP address of each display apparatus 5. Specifically, the setting section 79 manages, for example as shown in FIG. 13, (a) the station name and IP address of each display apparatus 5, (b) a maker, type, and version of the PLC 3 connected, and (c) the devices 10 connected respectively to the PLCs 3, (d) and the like.

Lists of stations participating the network may be set by an administrating personnel of the local control system 31 using the input means (such as a keyboard) of the control computer 7. Alternatively, for example, the list of the stations participating the network may be automatically generated by the setting section 70 in accordance with status information, which indicates IP address of the display apparatuses 5 and PLCs 3 connected thereto. The status information is transmitted from the respective display apparatuses 5, in response to a node searching signal, which the setting section 79 instruct the server section 72 to transmit to the network 6.

Here, as described above, in the present local control system 31, the data string 61 transmitted through the network 6 by the display apparatus 5 having the protocol converter 53 is same, as long as the data string 61 represents the same display contents/control contents, regardless of the types of the PLCs 3. Because of this, even if the types of the PLCs 3 are different, the user processor 78 of the control computer 7 gives instructions to the server section 72 in the same procedure, so as to instruct the PLC 3 to control. Thereby, the user processor 78 can receive the data from the PLC 3. Therefore, what is required is to provide only a display apparatus 5 that must communicate with the PLC 3 with a program for communicating in the dedicated program. Moreover, even if a PLC 3 that communicate in a new communication protocol is developed, only the display apparatus 5 must deal with that PLC 3. As a result, it is possible to reduce labor for manufacturing and maintenance management of the local control system 31, compare with the control system of FIG. 44.

The client apparatus 9 (control terminal apparatus) is provided with an Internet communication processor 93 (wide area network communication means), a control program generating section 94 (control protocol generating means), and a serial port emulator (hereinafter, referred to as an SPE) 95 (serial port simulating means). The Internet communication processor 93 can be connected to the control computer 7 via the Internet 32. The client apparatus 9 of FIG. 1 is also provided with the Internet communication processor 93. The control program generating section 94 generates or modifies the control program of the PLC 3, and outputs the control program in a format in which the control program can be outputted from the serial port. The SPE 95 receives the control program instead of the serial port, and instructs the Internet communication processor 93 to transmit instruction data that indicate the control program itself and a PLC 3 of a destination.

On the other hand, the control computer 7 is provided with an Internet communication processor 80 that can be connected with the Internet communication processor 93 of the client apparatus 9 via the Internet 32 (wide area network). The Internet communication processor 80 specifies the PLC 3 of the destination, in accordance with the received instruction data, and instructs the server section 72 to transmit, to the display apparatus 5 connected to the PLC 3, the control program in the common protocol. In this way, the client apparatus 9 updates the control program of the PLC 3, from an arbitrary position that can be connected to the Internet 32.

Here, in order to realize the control program generating section 94, the present control system can utilize control program generating software that is used in an apparatus, such as the control host computer 507 shown in FIG. 44, directly connected via the serial port, because the SPE 95 is provided to the present control system. In this way, for example, mnemonic, ladder circuit diagram, flow chart, or sequential function chart (SFC) can be used to write a control program, without developing new control program generating software for each type of the PLCs 3. Moreover, the control program generating section 94, which is presumed to be directly connected with the PLC 3, outputs the control program as data string to be outputted to the serial port.

On the other hand, the SPE 95 can set, in advance, (a) the control computer 7 of the local control system 31 having the PLC 3, and (b) the display apparatus 5 to which the PLC 3 is connected, in order to specify the PLC 3 of the destination. In addition, in case the display apparatus 5 is connected with more than one PLC 3, also set is which of the more than one PLC 3 of the destination.

Specifically, the SPE 95 can set the control computer 7 to which the Internet communication processor 93 is connected, for example by showing in advance a list of the local control system 31 that are permitted to update the control program of the PLCs 3, for promoting a user to select. Note that data to specify the control computer 7, such as addresses and domain names on the Internet 32, is stored in advance.

Moreover, the SPE 95 lets the user to specify the display apparatus 5, for example by displaying information with which the display apparatus 5 can be specified, among information displayed on a list of network participating stations shown in FIG. 5, in other words, by displaying a box in which an IP address or a station name is inputted or selected. Especially, the SPE 95 can automatically display choices by communicating with the control computer 7 in advance so as to look up memory contents of the setting section 79. This allows the user of the SPE 95 to designate the recipient in the same way as he specifies the display apparatus 5 by using the setting section 79 of the control computer 7.

Furthermore, when the SPE 95 receives, from the control program generating section 94, the data string for indicating the control program for the PLCs 3, the SPE 95 instructs the Internet communication processor 93 to transmit, via the Internet 32 to a control computer 7 specified by the setting set in advance, instruction data including (a) an identifier that indicates the display apparatus 5 and the PLCs 3, and (b) the data string indicating the control program.

In case the PLCs 3 are different in types, thus having memory areas of different sizes, different address maps such as locations, or different machine languages that their processing units, such as CPUs, can understand, it is necessary to generated a control program for each PLC 3. On the other hand, the control program generating software carries out a relatively complicated process because the control program generating software generated the control program from the ladder diagram or the like, as described above. Therefore, it is troublesome to newly generate, for each types of the PLCs3, the control program generating software that is capable of outputting the control program to the control computer 7 via the Internet 32.

On the contrary, in the present embodiment, the provision of the SPE 95 allows conventional control program generating software to be utilized. Therefore, it is possible to significantly reduce the labor to generate a program that realizes the respective sections (91 to 95) of the client apparatus 9.

Here, the respective sections 78 to 80 and 93 to 95 are functional blocks that are realized by a program, as the respective sections 71 to 77, 91, and 92 described above.

With the above arrangement, at S11 (see FIG. 14), as to the respective display apparatuses 5 subscribed in the network, the setting section 79 sets IP addresses, station names, and the PLCs 3 connected to the respective display apparatuses 5 as network setting, prior to normal processes for displaying/controlling. Here, in case the protocol converting section 53 of the display apparatus 5 do not have the protocol information of the PLC 3 currently connected to the display apparatus 5, the protocol information may be downloaded from the setting section 79 to the protocol converting section 53. In this case, transmitted as the data string 61 shown in FIG. 9 are the date main body 63 indicating the contents of the program information, and the identification data 62 indicating the data string 61 is the protocol information. The data main body 63 is handed down to the protocol converting section 53 by the network-end communication processor 52.

In case the control computer 7 instructs the PLC 3 to control, as an example of normal processes, the user processor 78 instructs the server section 73 to transmit an data writing command to the PLC 3 in the common protocol shown in FIG. 9 (S12). The server section 73 refers to the network setting of S11 so as to obtain the IP address of the display apparatus 5 to which that PLC 3 is connected, and transmits to the IP address the data string 61 that indicated the data writing command (S13).

On the other hand, in the display apparatus 5, the network-end communication processor 52 judges that the data string 61 is data for displaying/controlling, based on the identification data 62 of that data string 61, so that the network-end communication processor 52 hands down the data body 63 to the protocol converting section 53 for protocol conversion (S14). The protocol converting section 53 extracts the common code 64 and the relevant information 65 out of the data main body 63 in the common protocol, and selects, by looking up to the command conversion table TBL shown in FIG. 11, a command code that is recognizable to the PLC 3 and corresponds to the command code 64. Moreover, if necessary, a transcription of the relevant information 65 is converted to an expression that is recognizable to the PLC 3.

As a result of those, determined are the command code to be transmitted to the PLC 3, data contents, a size and address of the data, and the like. In response to this, the protocol converting section 53 generates the data string 41 to be transmitted to the PLC 3 by referring to the data transmission format FMT, and instructs the PLC-end communication processor 51 to transmit the data string 41.

Furthermore, the PLC-end communication processor 51 refers to a transmission request from the protocol converting 53 and transmission requests from other sections, such as a transmission request of the data string 41 from the display processor 55 and transmission request of the control program from the network-end communication processor 52, so as to transmit to the serial cable 4 the data strings 41 indicated respectively by those (S15). On the other hand, upon receipt of the data writing command in their designated protocol, the PLCs 3 control the states of the devices 10 in accordance with the command (S16).

Note that the above procedure is explained referring to the case of the data writing command as an example. However, the protocol converting section 53 also performs the protocol conversion in case of the data reading command. Moreover, the data transmission from the PLCs 3 to the control computer 7 is carried out in an inverse procedure with respect to the above procedure. Here, the protocol converting section 53, upon the receipt of the data string 41 from the PLC 3, applies the data string 41 to the data transmission format FMT, so as to extract the command, the data contents, the size and address of the data and the like that are indicated by the data string 41, generates the data body 63 in the common protocol, and output the data main body 63 to the network-end communication processor 52. In this way, the user processor 78 can receives, from the PLC 3, a data string in the common protocol, regardless of the type of the PLC 3.

Figure 15:
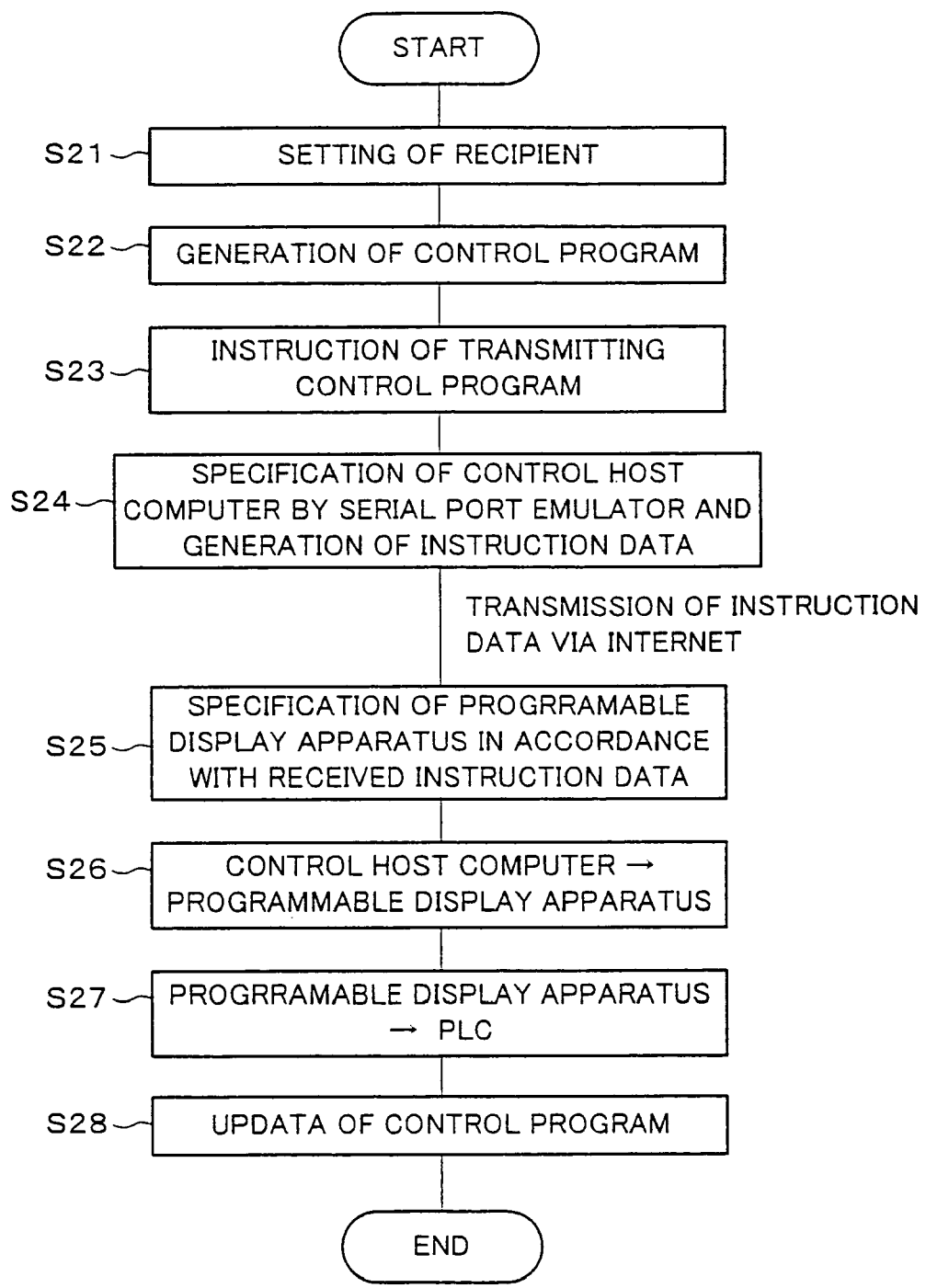
FIG. 15 is a flow chart for illustrating how the control system of FIG. 12 operates when a control program is updated.

On the other hand, when updating the control program, a process shown in FIG. 15 is carried out. Namely, the SPE 95 of the client apparatus 9 sets the recipient of the control program, prior to the updating of the control program (S21). The recipient, which is, as described above, combination in which the PLC 3 is paired with station names and IP addresses of the control computer 7 and the display apparatus 5 or the like combination, is specified with the same information as the network setting at S11, except the control computer 7. Here, by looking up to the setting of S11, the server section 73 can obtain the IP address of the display apparatus 5 to which the PLC 3 is connected. Therefore, by inquiring the server section 73 via the Internet communication processor 93, the Internet 32, and the Internet communication processor 80, the SPE 95 allows a user of the SPE 95 to specify the display apparatus 5 in the same manner as the network setting, without his learning a new specifying method.

Note that, when communicating via the Internet 32 at steps such as S21 or later described S24, the Internet communication processor 80 certifies whether or not the client apparatus 9 or the user thereof is authorized to update the control data, for example by checking whether or not an identification number and a password received from the Internet communication processor 93 are predetermined combination, so that the Internet communication processor 80 will reject an access from an unauthorized client apparatus 9. Because a client apparatus 9 failed to be certified is rejected by the control computer 7 to access, data from that client apparatus 9 will not flow through the network 6. Thus, it is possible to improve security of the local control system 31.

Moreover, the control program generating section 94 determines a control program is to be transmitted to the PLC 3 (S22), for example by generating or modifying a control program, or select a control program that is generated in advance.

Further, the control program generating section 94 instructs, for example, an operation system (OS) or the like to transmit the control program to the serial port (S23). Then, the SPE 95 receives the control program instead of the serial port, for example by intercepting a transmission instruction, and generates an identifier that indicates the display apparatus 5 and the PLC 3 set at S21, and instruction data that indicates the received control program. Then, the SPE 95 instructs the Internet communication processor 93 to send the instruction data to the control computer 7 that is set at S21 (S24). In response to this, the Internet communication processor 93 sends the instruction data to the Internet communication processor 80 of the control computer 7, via the Internet 32.

On the other hand, in the control computer 7, upon receipt of the instruction data, the Internet communication processor 80 instructs the server section 73 to transmit the control program to the display apparatus 5 that is specified in accordance with the instruction data (S25). Further, the server section 73 generates a data string 61$p$ (see FIG. 10), by adding an identification data 62$p$ to a data main body 63$p$, which is the control program itself, the identification data 62$p$ indicating that the data main body 63$p$ is a control program, and transmits the data string 61$p$ to the IP address of the specified display apparatus 5 (S26).

Figure 14:
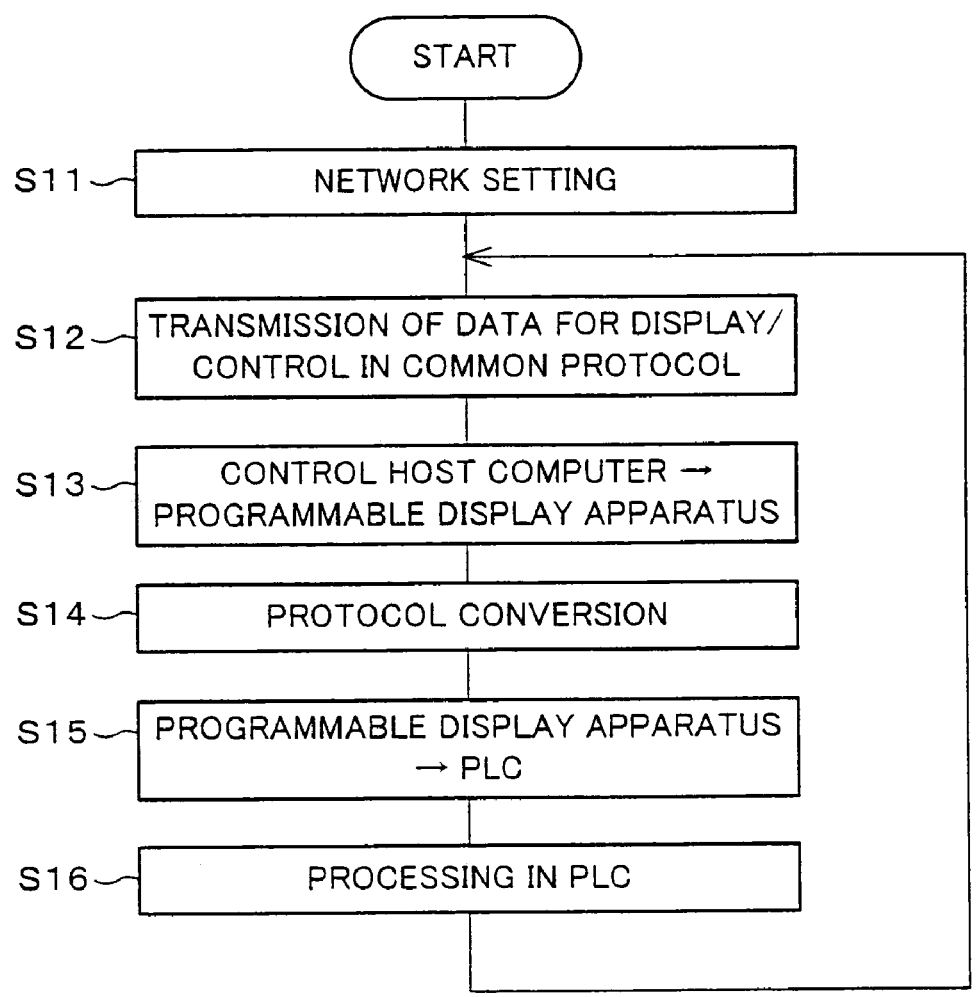
FIG. 14 is a flow chart for showing how the control system of FIG. 12 operates when normal displaying/controlling is carried out.

Note that, in case the recipients is specified by other data than the IP address, the IP address of the recipient is specified by looking up to the network setting of S11 shown in FIG. 14.

The network-size communication processor 52 of the display apparatus 5 judges that the data main body 63$p$ is a control program, in accordance with the identification data 62$p$ of the data string 61$p$, and instructs the PLC-end communication processor 51 to transmit the data main body 63$p$ as it is. Moreover, the PLC-end communication processor 51 transmits the data main body 63$p$ to the PLC 3 in response to this (S27).

Here, the data main body 63$p$ is a data string identical to the data string outputted by the control program generating section 94, that is, the data string to be outputted to the serial port. Therefore, because the PLC-end communication processor 51 outputs the data main body 63$p$, the PLC 3 can receive the control program without any trouble, so as to update the control program, even though the Internet 32 and the network 6 exist in a transmission line for the control program (S28).

Note that, in the present control system, discussed is a case where the SPE 95 of the client apparatus 9 designates the display apparatus 5 to specify the PLC 3. However, the present invention is not limited to this. For example, an identifier that can specify the PLC 3 in the whole control system may be added to the instruction data, so that the same effect will be obtained even when the Internet communication processor 80 of the control computer 7 specifies the display apparatus 5 in accordance with the identification.

However, in case the SPE 95 specifies the PLC 3 in the same method as the setting section 79 as described above, the user of the SPE 95 does not need to learn a method other than that method of the setting section 79. Thus, it is possible to realize a more user-friendly control system.

Moreover, in the present control system, exemplified is a case where the PLC 3 makes a response in accordance with the request from the section for displaying or controlling. However, the PLC 3 or the display apparatus 5 may deliver the data every cycle of a predetermined period or every predetermined event. In this case, the transcription for transmission of the data through the network 6 may be defined without considering which type the PLC 3 is of. In any of those cases, a transmission protocol (common protocol) of the display/control data of the network 6 is so defined that the data for the identical control instructions or the identical conditions will be identical when transmitted through the network 6, no matter which type the PLCs 3 are. Thus, the similar effect is obtained as long as the display apparatuses 5 interconvert the common protocol and the designated protocol for each type.

Next, still another configuration of a control system is explained.

Figure 16:
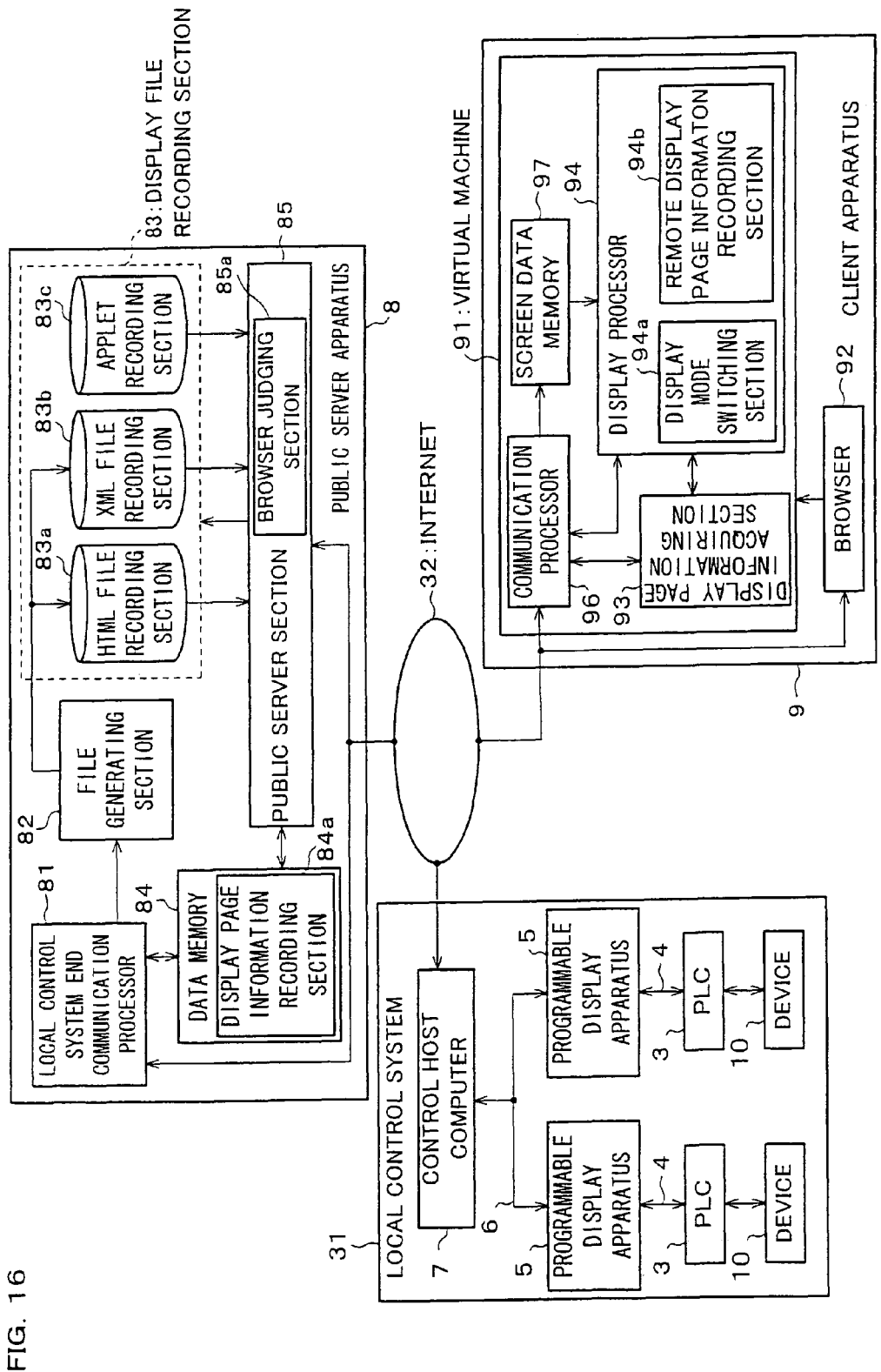
FIG. 16 is a block diagram illustrating an arrangement of still another control system.

The control system shown in FIG. 16 is further provided with a public server apparatus 8 for release to the public the data indicating conditions of a local control system 31. In a control computer 7, an Internet communication processor 80 shown in FIG. 12 communicates with a public server apparatus 4 via the Internet 32. In case the local control system 31 and the public server apparatus 8 communicate with each other in cipher, an Internet communication processor 80 uses a predetermined cipher key or a double sign key so as to communicate with the public server apparatus 8 in cipher. The Internet communication processor 80 stores therein various data to be used for connection with the Internet 32.

The Internet communication processor 80 communicates with the public server apparatus 8 in desired timing, such as at a point of time when received an instruction from a user, and at a point of time when screen data is changed, so as to transmit screen data of the foregoing screen data memory 75 (see FIG. 1) to the public server apparatus 8. Moreover, the Internet communication processor 80 accesses to the public server apparatus 8 in predetermined timing, such as at a point of time when a device 10 is changed and or in a predetermined time interval, so as to transmit to the public server apparatus 8 content (device data) of a device address A that is necessary for releasing data to public in the public server apparatus 8. The content of the device address A is obtained via a server section 73, in the same manner as a display processor 71 obtains. Further, when the Internet communication processor 80 found, as a result of the communication with the public server apparatus 8, that a client apparatus 9 has instructed to change the device data, the Internet communication processor 80 relays the instruction so as to transmit, to an entity of the device address A such as the display apparatuses 5 or the PLCs 3 connected to the display apparatuses 5, the instruction for changing the content, similarly to the case where the display processor 71 changes the content of the device address A.

The public server apparatus 8 is provided with a local control system end communication processor (hereinafter, just referred to as a local communication processor) 81, a file generating section 82, a display file recording section 83, a data memory 84, and a public server section 85.

Here, each of the sections 81, 82, 84, and 85 are also functional blocks realized by a program, similarly to the foregoing respecting sections 71 to 77, 91 and 92. Moreover, storing process of a display file into the display file recording section 83 is also realized by a program.

An XML (extensible mark-up language) file to be stored in an XML file recording section 83$b$ is generated for each unit screen that is included in screen data of the display apparatuses 5. Each XML file includes an XML element (element), which indicates each tag (process instruction word) that relates to the unit screen.

The XML file is schematically explained here. For example, in case the screen data of the display apparatus 5 includes, in the format shown in FIG. 4, a display tag WL indicting that base screen (unit screen)=1 (main screen), the XML file that corresponds to the main screen includes a Tag element E1 that corresponds to the display tag WL, shown in FIG. 17. The tag element E1 includes Tag Name element E11, an X element E12, a Y element E13, a Library No. element E14, a Bit Symbol Name element E15, and the like, which correspond to (a) an event name, (b) a display coordinate ranges, (c) a reference file number, and (d) a device address, and the like. The library No. element E14 indicates a registration number of a library tag that is for letting a user to use a figure registered in the library. Moreover, contents of the respective elements E11 to E15 are set to "L_0000", "−232", "120", "101", and "010100".

Moreover, for example, in case the screen data of the display apparatus 5 includes an input tag WT in the format shown in FIG. 5, the XML file that corresponds to the main screen includes a Tag element E2 that corresponds to an input tag WT. Further, set in the Tag element E2 so as to have contents in accordance with the contents of the input Tag WT, are Tag Name element E21, a Symbol Name element E22, an X element E23, a Y element E24, an X2 element E25, a Y2 element E26 and the like, which correspond to an event name, a device address, an effective input range and the like.

As described above, the file generating section 82 can generate the XML file for a unit screen by orderly extracting process instruction words (tags WL and WT and the like tags) for the unit screen, that is, tags whose file numbers of a base screen have predetermined values, and generating XML elements that corresponds to the tags, then setting contents of the XML elements in accordance with the tags.

An applet to be stored in an applet recording section 83c is realized as a bit code written in Java language that is executable for a virtual machine 91, similarly to the applet used in the control system of FIG. 1. Moreover, the applet includes (a) a class for defining a method corresponding to a type of a tag that can appear in the screen data, and (b) a class for defining a method for calling out, in accordance with the XML file, the method corresponding to the type of the tag. On the contrary, the virtual machine 91 refers to the XML file and calls out the method corresponding to the type of the tag in accordance with the XML element that indicates the tag. Then, the virtual machine 91 executes the method.

An HTML file to be stored in an HTML file recording section 46 is generated for each display apparatus 5.

The HTML file includes, as shown in FIG. 18, (a) a character string P11 for causing the virtual machine 91 to execute the applet, and (b) a character string P1 that is necessary as an HTML document such as "<HTML>" and "<TITLE>". Moreover, as shown in FIG. 18, the HTML file may includes a character string P2 that is in a format of HTML, for example, a character string for displaying a word and an image that explain the display apparatus 5 displayed by the applet. Further, the HTML file may include a character string P12 for causing an applet to be executed, the applet being for switching over the unit screens.

In the present control system, the XML file is provided for each unit screen. For example, the character string P11 includes information (global information) relating to the whole screen data (the display apparatuses 5), such as designation of a unit screen that is to be displayed first when the browser 92 of the client apparatus 9 displays the HTML file. In case of the present control system, the information is specified as a parameter for executing the applet. For example, the first unit screen is specified as an attribute value (in this example, "1") having an attribute name "BASESCR" of PARAM element.

The virtual machine 91 is provided with a display page information acquiring section 93, a display processor 94, a communication processor 96, and a screen data memory 97.

The display page information acquiring section 93 acquires, via the communication processor 96, the Internet 32, a public server section 85, display page information that indicates a unit screen that is currently being displayed, based on the screen data, on the display apparatus 5, the display page information being stored in a display page information recording section 84a of the public server apparatus 8.

Further, the display processor 94 is provided with a display mode switching section 94a and a remote display page information recording section 94b.

The display mode switching section 94a switches over, in accordance with instruction from an operator of the client apparatus 9, from/to a coincide display mode in which the client apparatus 9 displays the same unit screen as one the display apparatus 5 currently displaying, to/from a non-coincide display mode in which the client apparatus 9 can display a different unit screen. The remote display page information recording section 94b stores therein remote display page information that indicates a unit screen to be displayed next on the client apparatus 9.

In the present control system, the file generating section 82 may be proved with generators (not shown) for each specification of the client apparatus 9 (for example for each type of browsers), the generators being for generating, in accordance with the screen data of the display apparatus 5, a specified display file that corresponds to specification of hardware and software of a client apparatus 9 that is expected to access. Moreover, it may be so arranged that the file generating section 82 is provided with one generator so as to generate display files that correspond respectively to specifications of the client apparatus 9, by switching over, for example, by means of a switch.

Each generator may be so arranged to automatically generate HTML/XML files when the local communication processor 81 receives the screen data from the local control system 31, and to respectively store the HTML/XML files in a predetermined folder that is set in the display file recording section 83 (both file recording sections 83a and 83b). Alternatively, it may be so arranged that the HTML/XML files for the client apparatus 9 is generated by selecting by the use of the public server apparatus, in the file generating section 82, the specification (for example, types of the browser software) of the client apparatus 9 to be displayed, and the files are stored in the specified folder.

Figure 21:
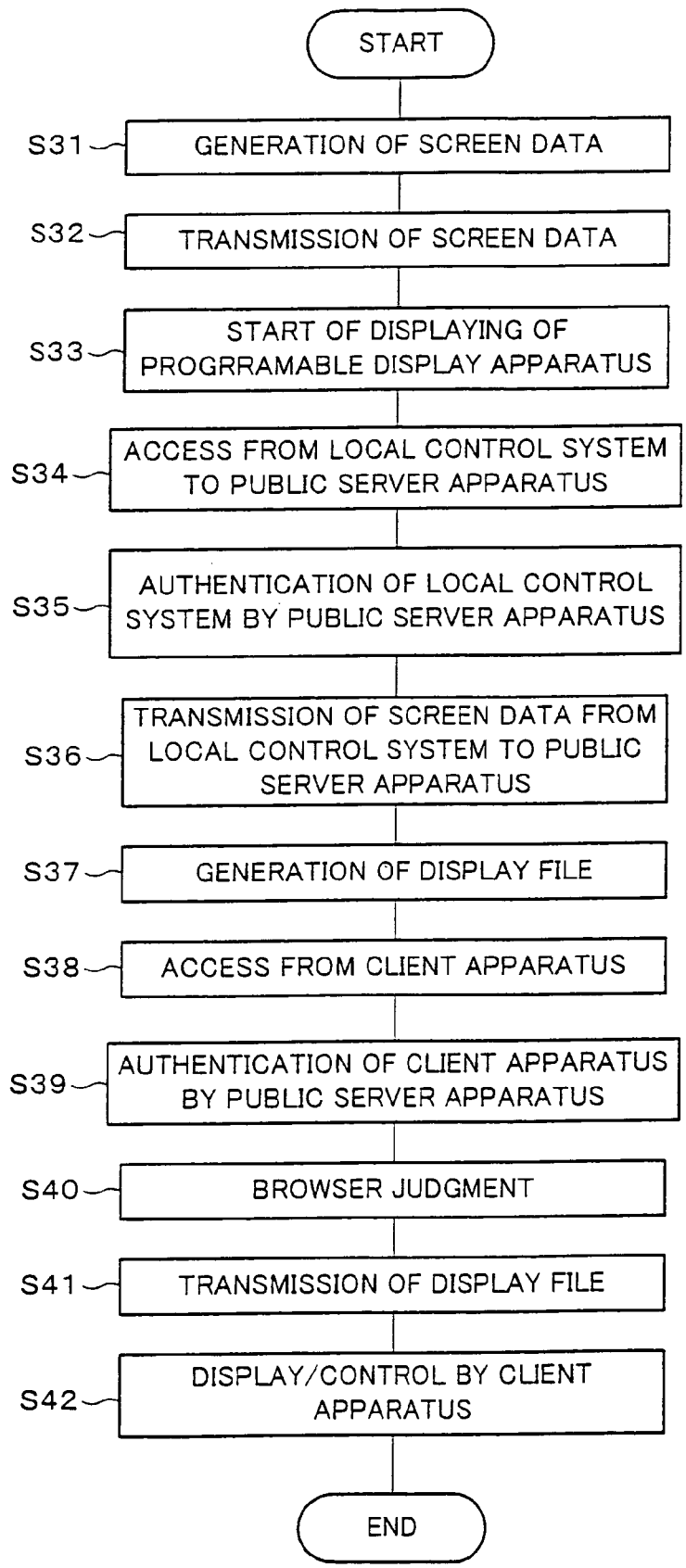
FIG. 21 is a flow chart illustrating how communication action shown in FIGS. 16 and 19 is carried out.

Next, operation of the present control system is explained, referring to a flow chart shown in FIG. 21.

To begin with, a user of the local control system 2 operates an image processor 74 (see FIG. 1) of the control computer 7, so as to generate or adjust the screen data in accordance with actual conditions of a target system, level of skill of an operator of the display apparatus 5, or what the user likes (S31). The thus generated screen data, for example, is delivered to the display apparatus 5 after being confirmed, for example by simulation or a connection test, that the thus generated data operates normally (S32). Then, the display apparatus 5 starts displaying according to the screen data (S33).

Next, when the screen data is updated, the control computer 7 (the Internet server communication processor 80) accesses to the public server apparatus 8 (S34). The public server apparatus 8 (the local communication processor 81) performs authentication of the local control system 31 and the user thereof, for example, by comparing combination of prestored account and passwords with received combination of account and passwords (S35). If the authentication is succeeded, the screen data is transmitted from the local control system 31 to the public server apparatus 8 (S36).

After the public server apparatus 8 receives the screen data from the local control system 31, the file generating section 82 generates a display file (a HTML file, alternatively a HTML file and an XML file), in accordance with the screen data (S37). Moreover, the file generating section 82 stores the display file in the generated HTML file recording section 83a and XML file recording section 83b of the display file recording section 83.

Further, similarly to the aforementioned S5 (see FIG. 8), to display a screen of a display apparatus 5 of a certain local control system 31 is instructed (S38). Similarly to S6, authentication as to whether or not the display and control by the screen is authorized to the user or the client apparatus 9 (S39). Access from an unauthorized user or client apparatus 9 is rejected.

When it is confirmed that the access is from an authorized and regular user or client apparatus 9, the browser judging section 85a judges which type of browser the client apparatus 9, which sent a request, has (S40). When doing this, the browser judging section 85a detects a browser name recited in a header section of the request from the client apparatus 9, for example. The public server section 85 reads the HTML file, XML file and applet, requested by the client apparatus 9, from among the display files that were generated at S37, and are stored in the display file recording section 83, and transmits the HTML file, XML file and applet to the client apparatus 9 via the Internet 32 (S41).

Then, the client apparatus 9 extracts an applet element (a part from "<APPLET>" to "</APPLET>") out of the HTML file that the browser 92 received, and causes the virtual machine 91 to execute it (S42). By doing this, the virtual machine 91 communicates with the public server section 85 in accordance with a parameter that is directly given to the applet by the HTML file or a parameter that is given to the applet by the XML file, then performs displaying and controlling similar to those performed by the display apparatus 5.

The public server section 85, upon receipt of the request from the browser 92, the request being for requesting the display apparatus 5 of the certain local control system 31 to display the screen, reads device data (content of a device address A), in accordance with the device address A, out of a storing region corresponding to the requested local control system 31 (a region corresponding to a user-use region corresponding to the display file and a region corresponding to the device address A) in a storing region in the data memory 84. Then, the public server section 85 transmits the device data to the client apparatus 9. A drawing method updates a display of a display region (X·Y) set by the parameter, in the display-use screen of the client apparatus 9 in accordance with the device data, when the requested device data reaches the client apparatus 9 via the Internet 3.

Moreover, for example an input operation, such as an operation of a mouse, is carried out while the display file is being executed, the virtual machine 91 executes an input method of instance that is in accordance with the input operation, among instances corresponding to input tags in the HTML/XML files. By doing this, the virtual machine 91 requests the public server section 85 to write the data according to an input result into a specific device address A. The public server section 85 rewrites the content of the region of the requested device address A, in the storing region in the data memory 84, upon receipt of a request for rewriting from the client apparatus 9. As a result, reflected onto the display-use screen of the client apparatus 9 is an operation result, similarly to the display apparatus 5, when the drawing method is executed after the writing.

Figure 22:
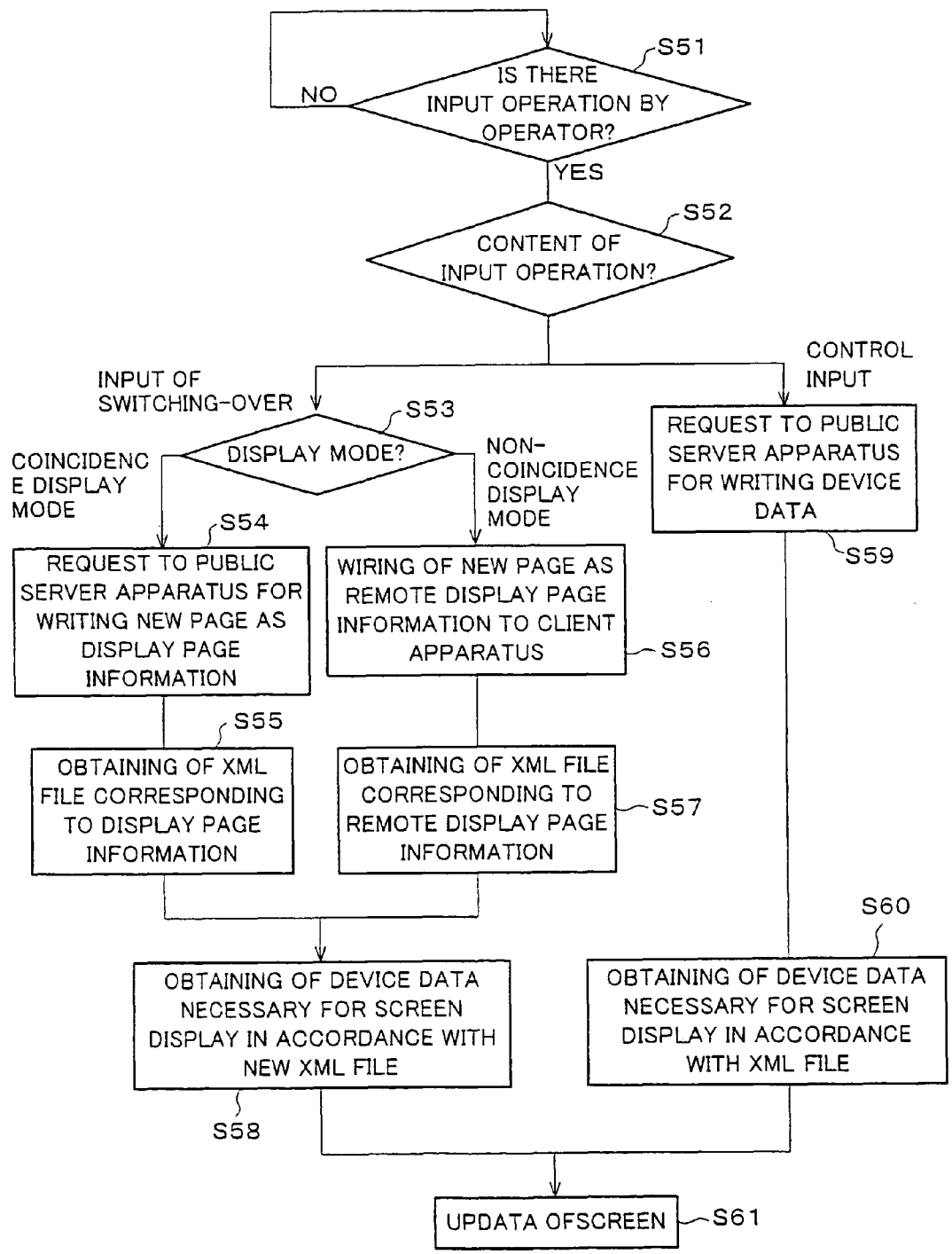
FIG. 22 is a flow chart showing how the client apparatuses of the control systems of FIGS. 16 and 19 operate.
Figure 23:
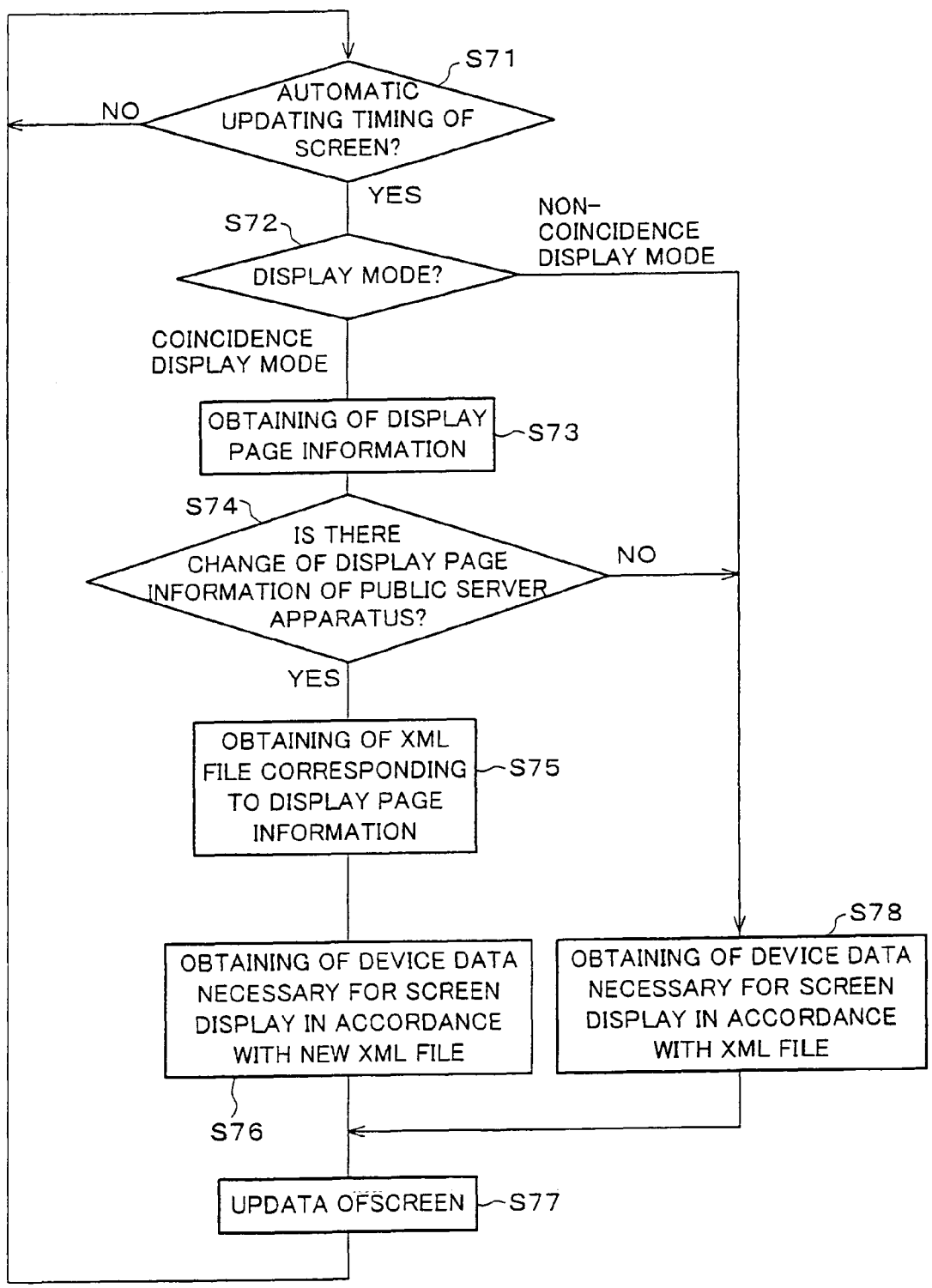
FIG. 23 is a flow chart illustrating how the client apparatuses of the control systems of FIGS. 16 and 19 operate.

Here, the operation of the present control system is explained, referring to the flow chart shown in FIGS. 22 and 23.

To begin with, in case where an operator carries out an input operation to the client apparatus 9, the display processor 94 waits for the input operation by the operator (S51), as shown in FIG. 22. Upon detection of the input operation by the operator, the display processor 94 judges a content of the input operation (S52). Next, when page switching-over is inputted by the operator as a result of the judgment of the input operation (the content of the input operation is "input page switching-over" at S52), the display processor 94 judges, in accordance with setting of the display mode switching section 94a, which display mode is set, the coincidence display mode or the non-coincidence display mode (S53).

if it is judged that the display mode is the "coincidence display mode", the display processor 94 requests, via the communication processor 96, the public server section 85 to write a specified new page, as display page information, into the display page information recording section 84a (S54). After than, the display processor 94 acquires the XML file by requesting, via the communication processor 96, the public server section 85 to transmit an XML file that corresponds to the display page information (the data of the screen currently displayed). Then, the display processor 94 stores the XML file in the screen data memory 97 (S55).

On the other hand, if it is judged that the display mode is the "non-coincidence display mode", the display processor 94 writes the specified new page in the remote display page information recording section 94b, as the remote display page information (S56). The display processor 94, then, requests, via the communication processor 96, the public server section 85 to transmit the XML file that corresponds to the remote display page information, and acquires the XML file. Then, the display processor 94 stores the XML file in the screen data memory 97 (S57).

Further, the display processor 94 acquires the device data by requesting, via the communication processor 96, the public server section 85 to transmit device data that is necessary for screen display, in accordance with the new XML file acquired from the display file recording section 83, and stored in the screen data memory 97 (S58).

On the contrary, if the control input is performed by the operator as a result of the judgment at S52 (the content of the input operation is "control input" at S52), the display processor 94 requests, via the communication processor 96, the public server section 85 to write the specified device data into the data memory 84 (S59). After that, the display processor 94 acquires the device data necessary for the screen display, by requesting the public server section 85 to transmit the device data, in accordance with the XML file stored in the screen data memory 97, that is, the XML file that is drawing a screen, whose data the operator instructed to change (S60).

Finally, the display processor 94 plots so as to update the screen, in accordance with the device data acquired from the data memory 84, and the display file (HTML/XML files and applet) stored in the screen data memory 97 (S61).

FIG. 23 is a flow chart showing a procedure of the screen updating in automatic updating timing of the client apparatus 9. Here, automatic updating timing of the screen is, for example, a predetermined time interval.

To begin with, the display processor 94 waits for the automatic updating timing of the screen (S71). When the automatic updating timing of the screen comes, the display processor 94 judges, in accordance with the setting of the display mode switching section 94a, which mode the display mode is, the coincidence display mode or the non-coincidence display mode (S72). If it is judged that the display mode is the "coincidence display mode", the display processor 94 acquires, from the display page information acquiring section 93, display page information stored in the display page information recording section 84a (S73). The display processor 94 judges whether the thus acquired display page information has been changed or not (S74).

If it is judged that the display page information has been changed, the display processor 94 acquires the XML file that corresponds to post-change display page information stored in the display page information recording section 84a, by requesting, via the communication processor 96, the public server section 85 to transmit the post-change display page information. Then, the display processor 94 stores the post-change display page information in the screen data memory 56 (S75). After that, the display processor 94 acquires the device data necessary for the screen display by requesting, via the communication processor 96, the public server section 85 to transmit the device data, in accordance with the new XML file thus acquired from the display file recording section 83 and stored in the screen data memory 97 (S76).

On the other hand, if the judgment at S72 shows that the display mode is the "non-coincidence display mode", and if the judgment at S74 shows the display page information has not been changed, the display processor 94 acquires the device data necessary for the screen display, by requesting, via the communication processor 96, the public server section 85 to transmit the device data (S78). Here, the display processor 94 carries out the requesting in accordance with the XML file stored in the screen data memory 97, that is, the XML file on which the last plotting is carried out.

Finally, the display processor 94 plots so as to update the screen, in accordance with the device data acquired from the data memory 84, and the display file (the HTML/XML files and the applet) stored in the screen data memory 97 (S77).

Here, in the example of FIG. 18, the first unit screen is specified as the attribute value (in this example "1") of the attribute name "BASESCR" of the PARAM element. In this example, if it is in the coincidence display mode, the attribute "BASESCR" is invalidated, so that an initial display is carried out with an initial screen number, which is set in the display apparatus 5. Moreover, if it is in the non-coincidence display mode, the display processor 94 stores, as the remote display page information, "1" in the remote display page information recording section 94b of the client apparatus 9. Then, the display processor 94 acquires corresponding HTML/XML files, and displays a unit screen "1" on the client apparatus 9. Here, the display page information recording section 84a of the data memory 84 stores therein the display page information for indicating the unit screen displayed on the display apparatus 5, regardless of the remote display page information.

In the present control system, the data memory 84 stores all device data necessary for the screen display, including the display page information for indicating the unit screen currently displayed on the display apparatus 5, so that the local control system 31 and the public server apparatus 8 are synchronized. Therefore, the client apparatus 9 acquires the state of the local control system 31 via the data memory 84, and display the state on the screen, without directly communication with the local control system 31. Namely, it is possible to display, on the client apparatus 9, a screen different from the screen displayed on the display apparatus 5.

Moreover, in the present control system, requisite is the transmission of the device data. Thus, it is possible to have a simplified setting on the local control system 31 end. Therefore, it is possible to display the state of the local control system 31 on a remote client apparatus, without giving the user of the local control system 31 a burden. Especially, the client apparatus 9 and the local control system 31 do not directly communicate with each other for the screen display on the client apparatus 9. This secures safety of the local control system 31 against the client apparatus 9.

Moreover, it may be so arranged that the screen data memory 97 stores HTML/XML files for screens designated for the client apparatus 9, which are not to be displayed on the display apparatus 5, so that the screens and the unit screen that is to be displayed on the display apparatus 5 are displayed in a switching-over manner that is performed by the switching-over by the display mode switching section 94a. This makes it possible to establish, on the client apparatus 9, a display-use screen for system data, which is not necessary at a site of operation, or a display-use screen for remote maintenance.

Note that in the present control system the applet, which is distributed by the public server section 85, perform the display/control in accordance with the XML files indicating the tags (processing instruction words) that respectively relate to the unit screens. However, the present invention is not limited to this.

For example, as shown in FIG. 20, it may be so arranged that instances corresponding to all the tags included in the screen data are generated as a PARAM element to be recited in the HTML file, and a character string (code) that is set by setting each field of the instances to be in accordance with the contents of the tags. In this case, the file generating section 82 looks up the contents of all the tags included in the screen data, and generates the character string for calling out the apple for screen display in accordance with a result of the looking-up, as indicated by the character string P11a, and writes the character string in the HTML file.

Figure 19:
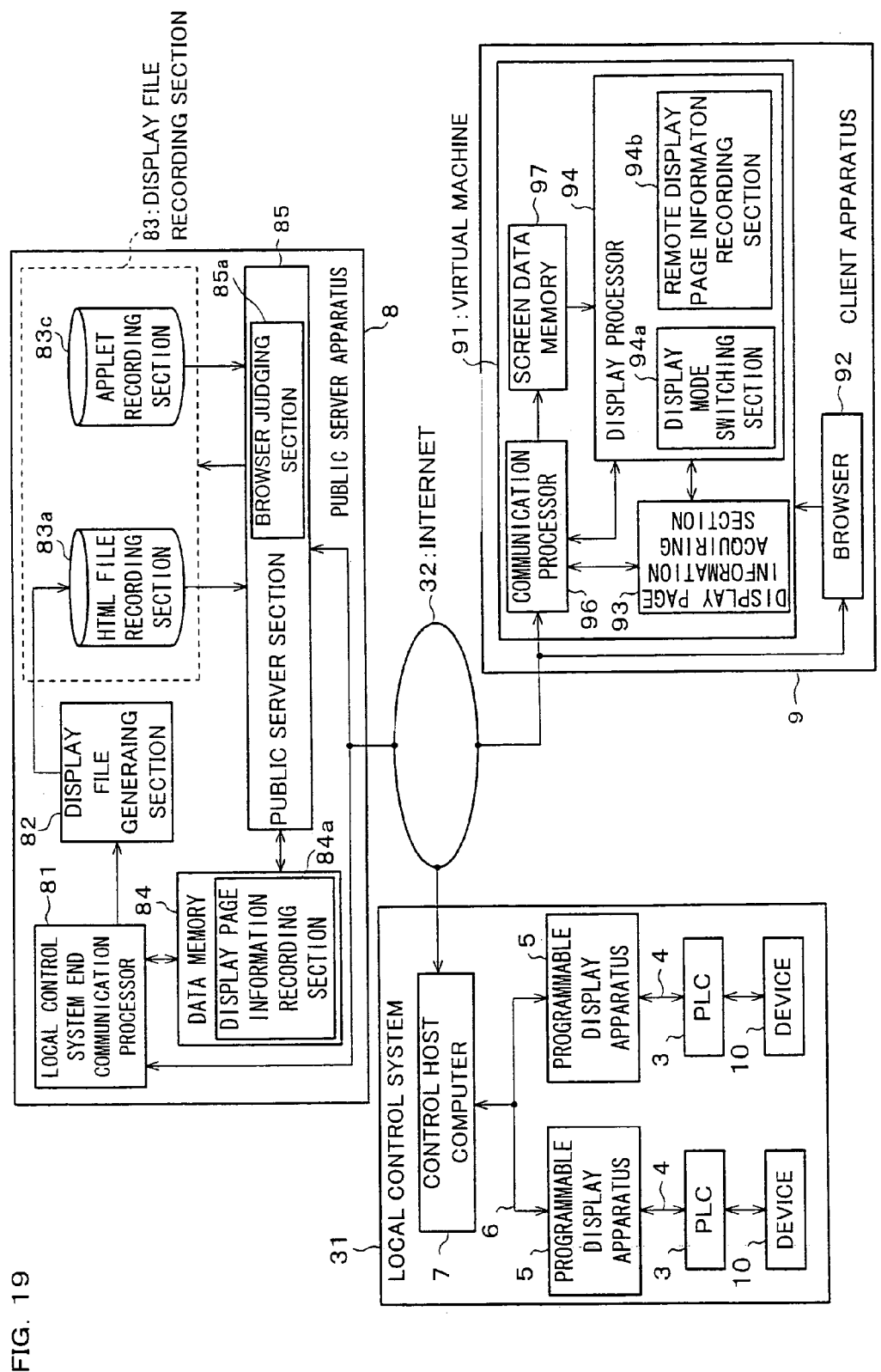
FIG. 19 is a block diagram showing a modification of the control system of FIG. 16.

In this case, generated as the display file is only the HTML file. Therefore, as shown in FIG. 19, the control system does not require the XML file recording section 87 (see FIG. 16). Thus, in the display file recording section 83, the HTML file and applet are stored in each of the folders that respectively correspond to the specifications of the client apparatus 9.

Regardless of the operation of the applet and the method of calling out the applet, if the public server section 85 can instruct the client apparatus 9 to operate, namely, to display as the display apparatus 5 in accordance with the state of the device based on the screen data, and to instruct, as the display apparatus 5, the changing of state of the device in accordance with the operation of the operator, the control systems shown in FIGS. 16 and 19 attain substantially similar effects.

Furthermore, another configuration of the control system is explained below.

Figure 24:
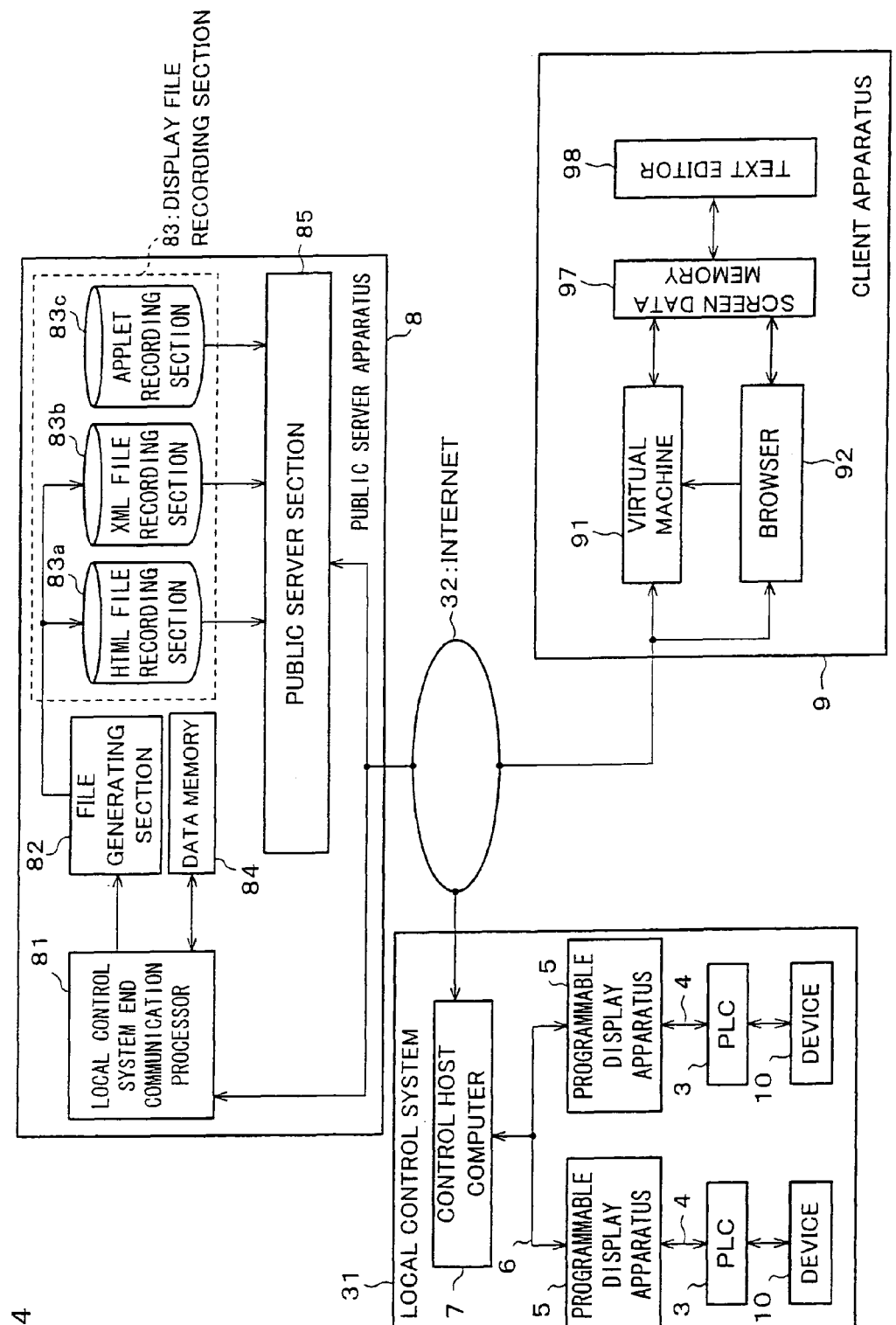
FIG. 24 is a block diagram showing an arrangement of a control system of another configuration.

The control system shown in FIG. 24 has a structure basically similar to the control system shown in FIG. 16. However, in the present control system, the client apparatus 9 is further provided with a text editor 98.

The text editor 98 displays/edits a text file among files stored in a screen data memory 97.

Figure 25:
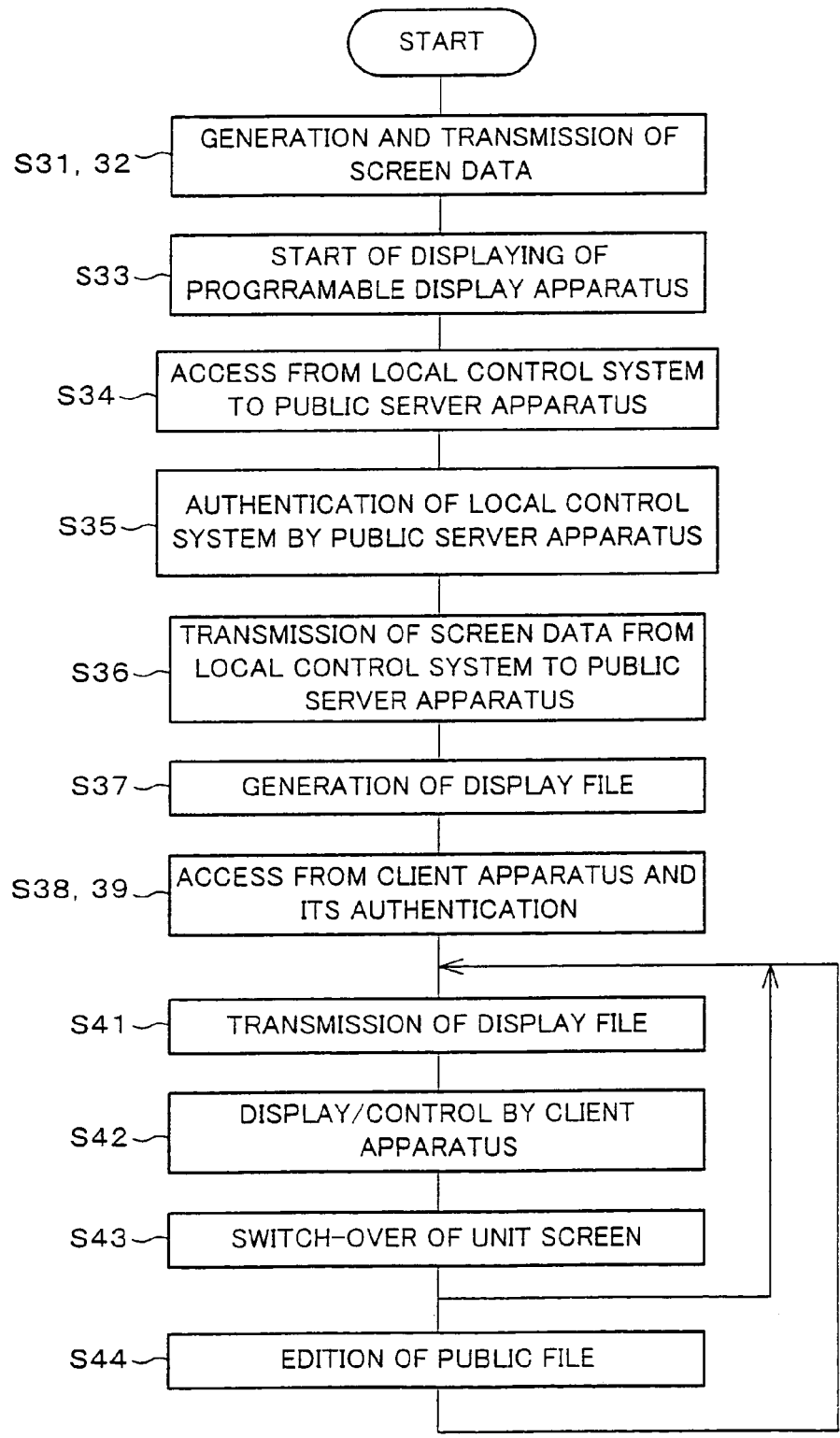
FIG. 25 is a flow chart showing how the control system of FIG. 24 operates.
Figure 26:
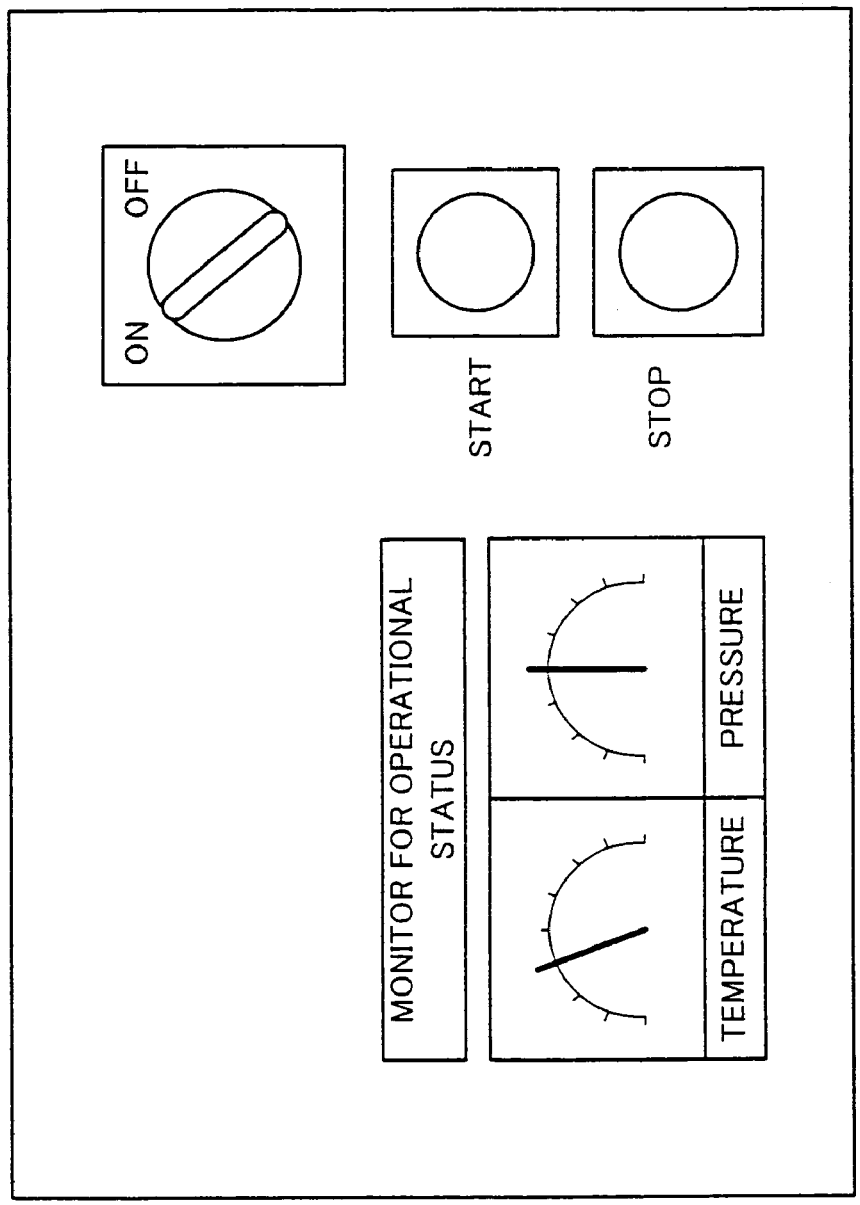
FIG. 26 is an explanatory view illustrating another display-use screen displayed on a programmable display apparatus or a client apparatus, in the control system of FIG. 24.

Referring to the flow chart shown in FIG. 25, operation of the present control system is explained below. To begin with, from S31 to S39, and to S41 and S42, the action is carried out following a procedure similar to that of the flow chart of FIG. 21. When a user of a client apparatus 9 instructs to switch over the screen, a virtual machine 91 reads a new XML file from a public server apparatus 8, and stores it in a data memory 84. Then, the virtual machine 91 displays a unit screen corresponding to the XML file, for example, as shown in FIG. 26 (S43). On the other hand, when a screen of another display apparatus 5 is directed, a HTML file and a XML file are transmitted from the public server apparatus 8 to the client apparatus 9 so as to be stored in a data memory 84.

Moreover, if the user of the client apparatus 9 wishes to display or operate, at the same time, (a) the state of the device displayed on the unit screen shown in FIG. 2 and (b) the state of the device displayed on the unit screen shown in FIG. 26, the text editor 98 is operated by the user so as to edit the XML file that corresponds to both the unit screens, and generate a new XML file (S44).

Here, the XML file is, as shown in FIG. 17, a text file and can be edited by a versatile program of the text editor 98 or the like. Moreover, elements of the XML file can be designed hierarchically, so that elements (E11 to E15 and E21 to E26) relating to the contents of the process instruction words are contained below a layer of Tag elements (E1 and E2) corresponding to the respective process instruction words (tags). For example by operating the text editor 98, the unit of the Tag elements are respectively edited (inserted/deleted) so as to insert or delete, into or from the XML file, an action, such as display action indicated by the process instruction word (tag) or input operation. Note that in the text editor 98, each Tag element is expressed as a series of texts (<Tag> to </Tag> are text).

Figure 27:
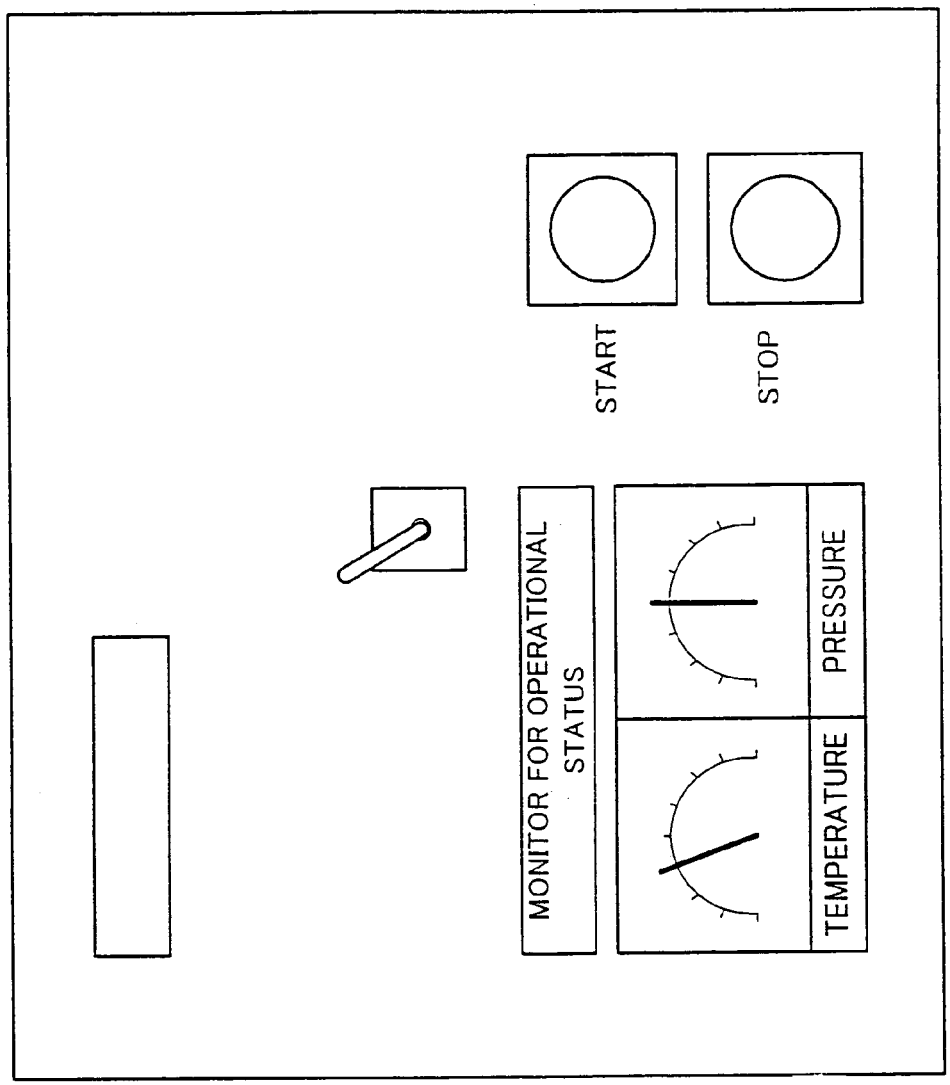
FIG. 27 is an explanatory view showing a display-use screen based on a new XML file that is generated by editing each XML showing the display-use screen.

Here, in case Tag elements from a plurality of XML files exist together, display areas or input areas relating to the each Tag element may overlap. However, positions of those areas are determined by X elements and Y elements or the likes, and are surrounded by predetermined marks so that those elements relate to coordinates. Therefore, the display areas and the input areas can be moved by adjusting contents of those elements. Thus, it is possible to easily generate a new screen, for example, as shown in FIG. 27. The XML file for displaying the screen is generated by deleting the tag element relating an ON/OFF switch from the XML file of the screen shown in FIG. 26, and by inserting a Tag element relating to switch therein, the Tag element being extracted from the XML file shown in FIG. 2, then by changing the contents of the elements of the Tag relating to the switch, the contents of the elements indicating the display/input areas. Each of those editing actions is an editing action to edit the text, so can be carried out by the versatile text editor 98 without a problem.

Figure 28:
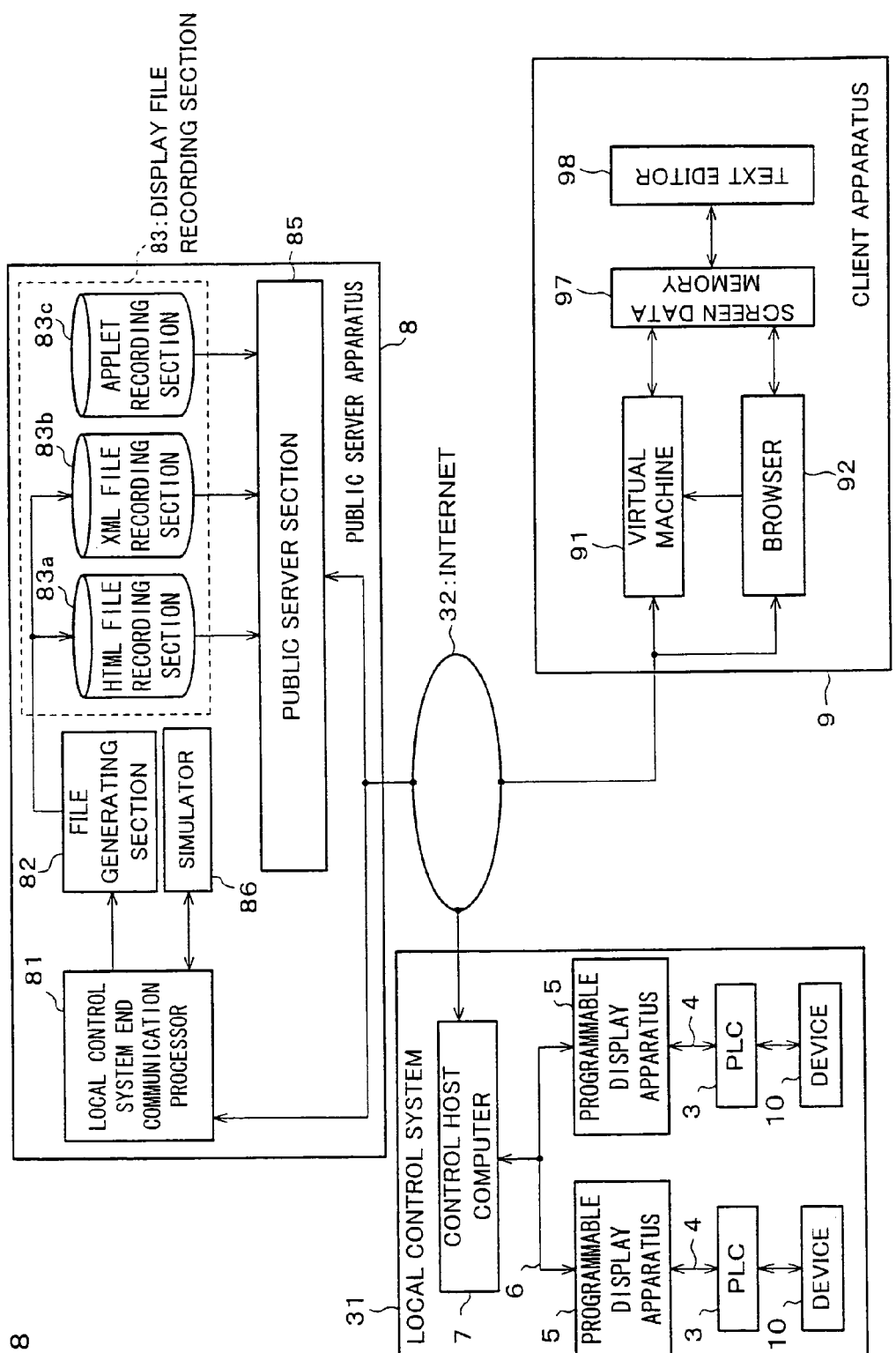
FIG. 28 is a block diagram showing an arrangement of a control system, which is a modification of the control system of FIG. 24.

The present control system may be provided with a simulator 86, for example as shown in FIG. 28, instead of the data memory 84 of the public server apparatus 8 shown in FIG. 24. The simulator 86 simulates inputting and outputting of a device of a local control system 31. With this arrangement, it is possible to supervise and control a virtual local control system, instead of the actual local control system 31.

Specifically, the public server section 85 transfers, to the simulator 86, an inquiry from the client apparatus 9 and instructions for changing contents. The simulator 86 may simulate, by means of calculation in accordance with characteristics of the device itself, the inputting and outputting of the device. Alternatively, the simulator 86 may simulate the inputting and outputting of the device by looking up a table, which is stored in advance, and in which a last output is corresponded to an input of this time or the output of the device is corresponded to time or a number of times of the looking-up. This simulator 86 is also a function block realized by the execution of the program stored in the recording means by processing means, as the other components.

Figure 29:
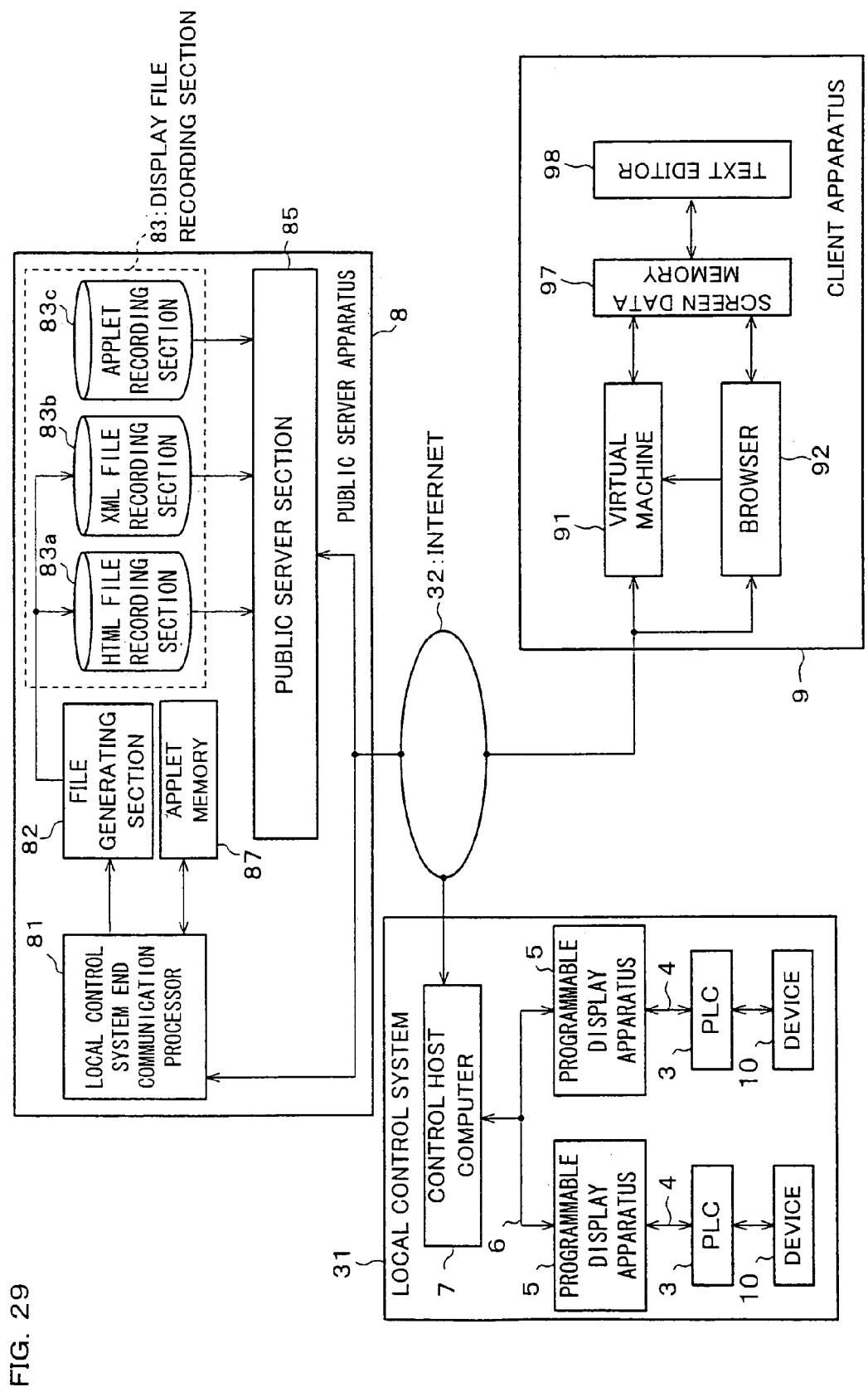
FIG. 29 is a block diagram showing an arrangement of a control system, which is another modification of the control system of FIG. 24.

Alternatively, the present control system may be provided with an applet memory 87, instead of the simulator 86, as shown in FIG. 29. The applet memory 87 stores therein an applet for simulation, which causes the client apparatus 9 to simulate the inputting and outputting of the device of the local control system 31. This makes it possible to deliver the applet for causing the client apparatus 9 to execute the same action as the simulator 86, together with the applet for causing the client apparatus 9 to execute the same action as the display apparatus 5.

With this arrangement, a public server section 85 transmits, to the client apparatus 9, an applet of the applet memory 87, together with the applet of the applet memory 87. On the other hand, when a virtual machine 91 of the client apparatus 9 executes the applet, a simulator similar to the simulator 86 is formed in the client apparatus 9. Moreover, when the applet stored in the applet memory 87 is executed in the client apparatus 9, the client apparatus 9 inquires the simulator 86 in the client apparatus 9 instead of the public server section 85, so as to perform screen display in accordance with the result of the inquiring to the simulator.

In those control systems, it is possible to supervise and control the virtual local control system 31, generated by the simulator 86 (or the simulator formed in the client apparatus 9), by using a client apparatus 9 provided in a remote area, while preventing an irregular access to the local control system. Therefore, it is possible to have a virtual experience of the action/action result of the actual display apparatus 5. Thus, for example, those control systems are suitable for training an operator of the display apparatus 5.

Moreover, in each of the control systems, for example, other mark up languages such as SGML (Standard Generalized Markup Language) are applicable, besides the XML file, in order to attain similar effects.

Figure 30:
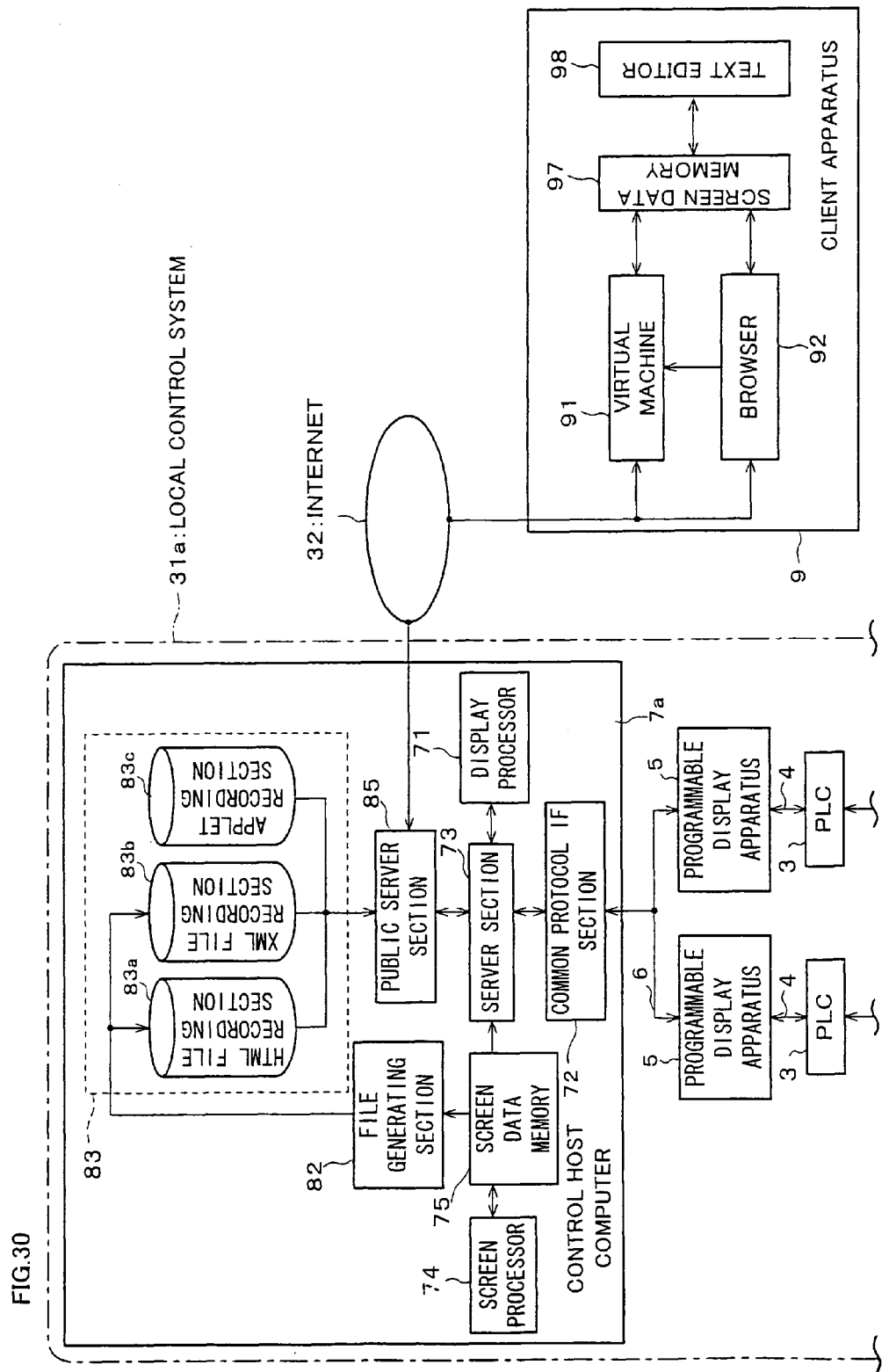
FIG. 30 is a block diagram illustrating an arrangement of a control system, which is a modification of the control systems of FIGS. 24, 28 and 29.

Additionally, in a control system shown in FIG. 30, a control computer 7a of a local control system 31a is provided with a file generating section 82, a display file recording section 83, and a public server section 85, instead of the Internet communication processor 80 (see FIG. 12) However, the public server section 85 accesses to a server section 73 so as to acquire a content of a device address and instructs to change the content of the device address, instead of accessing the data memory 82. Moreover, the file generating section 82 reads out screen data from a screen data memory 75 so as to generate a HTML file and an XML file.

Second Embodiment

Described below is another embodiment of the present invention, with reference to FIGS. 31 to 37. Note that, in the present embodiment, constituent elements having the equivalent function as the constituent elements of the aforementioned first embodiment are labeled in the same manner and their explanations are omitted here.

Figure 31:
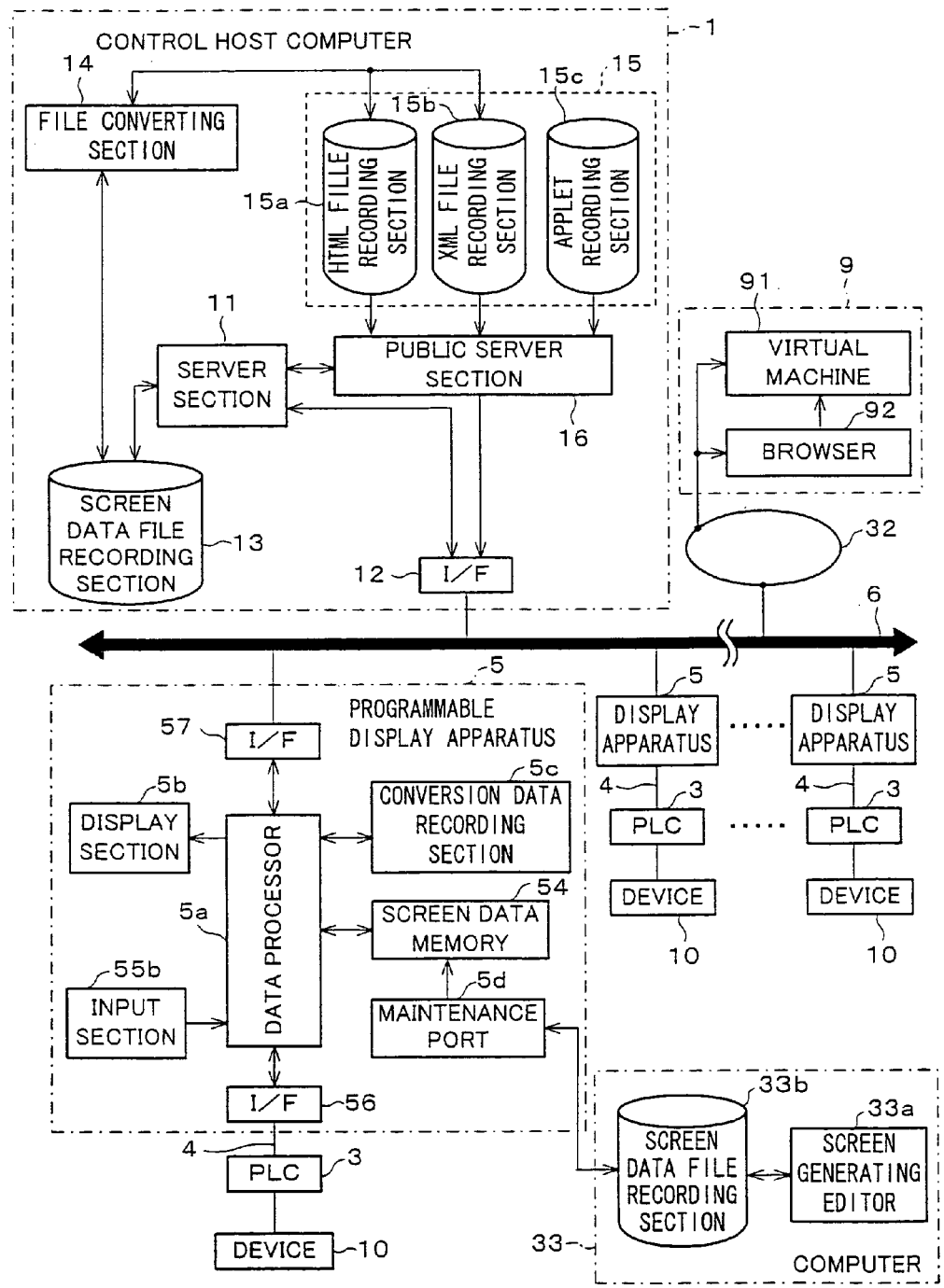
FIG. 31 is a block diagram showing an arrangement of a control system according to a second embodiment of the present invention.

A control system of the present embodiment is, as shown in FIG. 31, provided with a control host computer (hereinafter, just referred to as a control computer) 1, a plurality of display apparatuses 5, and a plurality of PLCs 3.

The control computer 1 and the display apparatuses 5 are connected to each other via a network 6, which allows communication in a common communication protocol. On the other hand, the display apparatuses 5 and PLCs 3 are respectively connected to each other via a serial cable 4, which allows communication in a specific communication protocol. Moreover, the display apparatuses 5 are connected to a computer 33 for generating a screen (screen for display). Further, the network 6 is connected to the Internet 32 as a network, via a router (not shown). A client apparatus 9 is connected to the Internet 32.

In the present control system, similarly to the control system of the first embodiment, a communication protocol (common protocol) common to communication protocols that can be transmitted through the network 6, so that the display apparatus 5 can perform data communication via the network 6 in a universal communication protocol, regardless of which communication protocol is to be transmitted through the serial cable 4.

The computer 33 is, for example, composed of a personal computer, and is provided with a screen generating editor 33a and a screen data file recording section 33b, which are mentioned above.

The screen generating editor 33a has a substantially equivalent function to that of the screen generating processor 74 (see FIG. 1) of the control system of the first embodiment. The screen data file recording section 33b stores therein screen data for one screen, as one file (screen data file). The screen data is generated by the screen generating editor 33a. The screen data stored therein is transmitted to the display apparatus 5, and downloaded to a screen data memory 54, as required.

The display apparatus 5, as a control-use display apparatus, is provided with a screen data memory 54, an input section 55b, a serial interface (in figures, I/F) 56, a network interface (in figures, I/F) 57, a data processor 5a, a display section 5b, a conversion data recording section 5c and a maintenance port 5d. The display apparatus 5 is equivalent to the display apparatus 5 of the control system of the first embodiment (see FIG. 1, for example) in terms of basic functions.

The data processor 5a is provided with a PLC-end communication processor 51, a network-end communication processor 52, a protocol converter 53, and a display processor 55, which are aforementioned. The data processor 5a performs various data processes in order to perform a process for uploading (transmitting) to the control computer 1 a screen stored in the display apparatus 5, in addition to the above-mentioned process of protocol conversion, and display control of the screen.

In case the serial cable 4 and the network 6 have different communication protocol, the data processor 5a carries out the protocol conversion process so as to convert from one communication protocol to the other, looking up data stored in the conversion data recording section 5c. Moreover, the data processor 5a carries out the display control so as to cause the display section 5c to draw the screen by using VRAM or the like in accordance with the screen data generated by a screen generating editor 33a that is described above. Moreover, the data processor 5a switches over a plurality of screens in accordance with an input of user's instructions to switch over.

The data processor 5a (transmission means) extracts a specified screen data for one unit screen, out of the screen data stored in the screen data memory 54, in accordance with the request from a later-descried server section 11 of the control computer 1, and transmits the specified screen data to the control computer 1. Further, the data processor 5a registers in advance in the screen data memory 54 or the like, a password for authorizing an access, so that uploading of the screen data is authorized when the password inputted by the user into the control computer is checked to be the registered password. It is possible to prevent unintentional uploading of the screen data by carrying out security check for the uploading of the screen data in this way.

The data processor 5a is a functional block realized by executing a program provided by a recording medium, similarly to the respective members of the control computer 7 (see FIG. 1).

The display section 5b is composed of a flat plate-type display element, such as a liquid panel or an EL panel, in order to compose a display apparatus 5 in a small size, for easy assembly of the display apparatus 5 into a control panel or the like.

The conversion data recording section 5c stores therein data necessary for protocol conversion process. The data may be in any format that allows mutual conversion of the communication protocol between the serial cable 4 and the network 6. However, the conversion data recording section 5c of the present embodiment stores therein a data transfer format that indicates a format of data to be transferred via the serial cable 4, and a command conversion table (see FIG. 11) that indicates the corresponding relationship between the command codes to be transmitted between the cable 4 and the network 6.

The screen data memory 54 (recording means) of the present embodiment is a memory for storing the screen prepared by the user by using the screen generating editor 33a, and is composed of a flash ROM or the like.

The maintenance port 5d is a communication port for communicating with the computer 33. The maintenance port 5d is provided for downloading to the screen data memory 54 the screen data of the screen prepared by the screen generating editor 33a of the computer 33, and the like purposes.

The control computer 1 is, similarly to the general-purpose personal computer, provided with a CPU, a memory (RAM, ROM or the like), an external recording apparatus (hard disc drive, an MO drive, or the like), a display apparatus, and an input apparatus (a keyboard, a mouse, and the like). Moreover, the control computer 1 is provided with a server section 11, a common protocol IF section (in figures, labeled as I/F) 12, a screen data file recording section 13, a file converting section 14, a file recording section 15 and a public server section 16.

The common protocol IF section 12 is connected to the network 6 in order to communicate with the display sections 5. The common protocol IF section 12 has a function substantially equivalent to that of the common protocol IF section 72 of the control system of the first embodiment.

The server section 11 carries out data communication with the display apparatuses 5 via the network 6, collects output data of the PLC 3, which is transmitted from the PLC 3 via the display apparatuses 5, and the like processes. The output data is data (device data) indicating a state of a device (numeral value, On/Off-state, or the like), or an output of the PLC 3 itself (such as an alarm output). Moreover, the server section 11 supplies the output data or the device address to the public server section 16 as required.

The server section 11 requests the data processor 5a of the display apparatus 5 to upload the screen data in accordance with input instructions of the user, and stores, into the screen data file recording section 13, the screen data thus uploaded via the data processor 5a. Moreover, the server section 11 communicates with the data processor 5a also in accordance with a request from the client apparatus 9 via the public server section 16.

The screen data file recording section 13 stores therein the file (screen data file) of the screen data uploaded from the screen data memory 54 of the display apparatus 5 by the data processor 5a and the server section 11.

The file converting section 14 (generating means) generates data for use in terminals by converting into the HTML file and the XML file the screen data file stored in the screen data file recording section 13. The file converting section 14 has a function substantially equivalent to that of the file generating section 82 (see FIG. 16).

The display file recording section 15, which has a function substantially equivalent to the display file recording section 83 (see FIG. 16), is provided with an HTML file recording section 15a, an XML file recording section 15b, and an applet recording section 15c.

The public server section 16 (communication means and acquisition means) has a function substantially equivalent to that of the public server section 77 of the control system (FIG. 1) of the first embodiment. The provision of the public server section 16 enables the control computer 1 to function as a Web server (server apparatus) on the Internet 32.

The server section 11, the file converting section 14, and the public server section 16 are, similarly to the data processing section 5a, functional blocks that are realized by executing the program supplied by the recording medium. Moreover, also realized by the program is a process of storing the display file in the display file recording section 15.

In the communication thus arranged, the public server section 16 of the control computer 1 instructs the client apparatus 9 to perform actions substantially equivalent to the display action of the display apparatus 5 to display according to the screen data in accordance with the state of the device, and to the instruction action of the display apparatus 5 to instruct to change the state of the device according to an operation. However, the actions of the client apparatus 9 are different from the actions of the display apparatus 5 according to the screen data in that the data is displayed on a display-use screen of a display apparatus (not shown) of the client apparatus 9, and the operation is inputted via an input apparatus (not shown) of the client apparatus 9.

Figure 32:
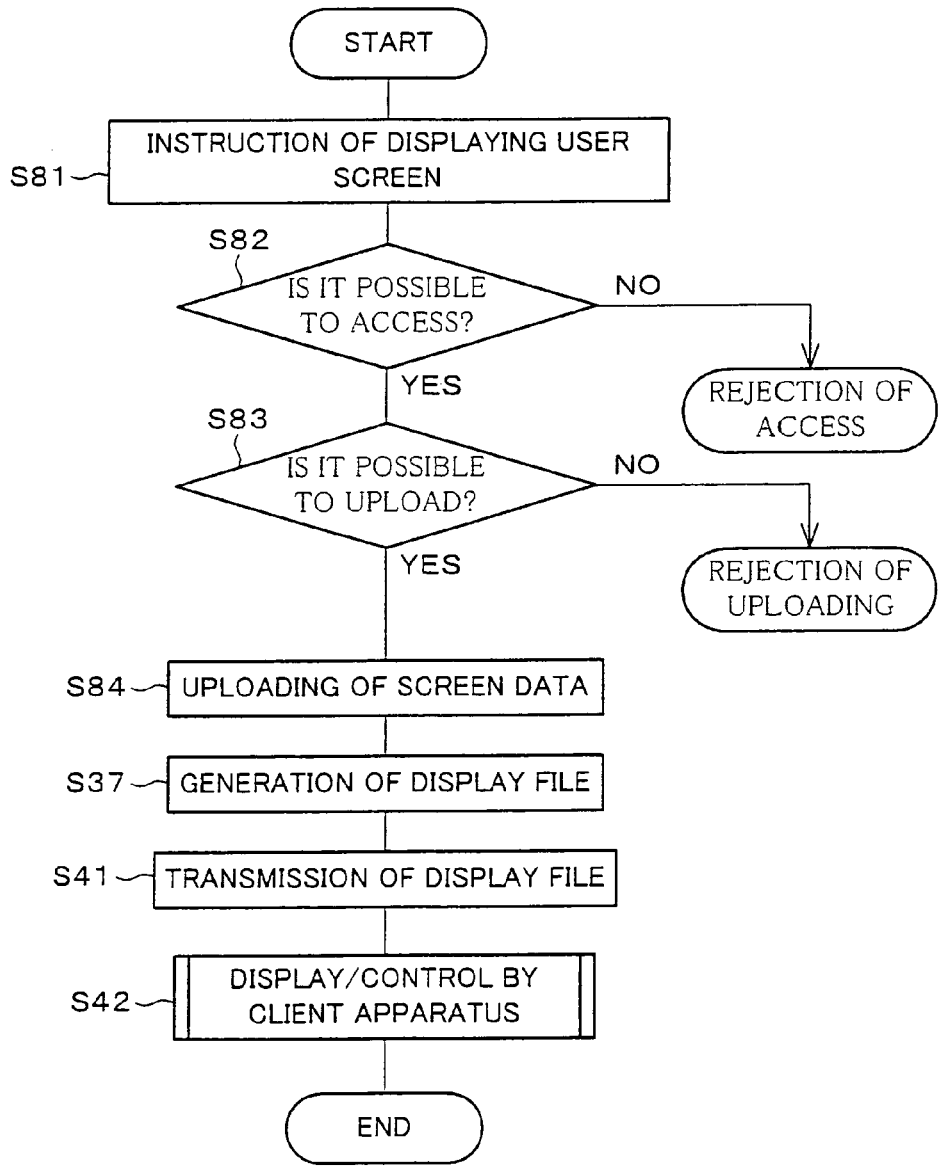
FIG. 32 is a flow chart illustrating a process procedure for making a screen data public by uploading the screen data from a programmable display apparatus in the control system of FIG. 31.

Next, with reference to a flow chart of FIG. 32, described are how in the communication the screen data of the display apparatus 5 is displayed on the client apparatus 9, and how the operation is carried out based on the screen thus displayed.

To begin with, the client apparatus 9 accesses the public server section 16 of the control computer 1 via the Internet 32, so as to instruct the client apparatus 9 to display a screen of the display apparatus 5 (S81). Then, for example by checking whether an identification number, password or the like received from the client apparatus 9 is in the registration, the public server section 16 checks whether or not the client apparatus 9 or the user thereof is authorized for the display/control via the screen (S82). The public server section 16 rejects an access from a client apparatus 9 not in registration.

If the access is authorized, in the display apparatus 5 the data processor 5a checks whether or not the client apparatus 9 and the user thereof is authorized for the uploading of the screen data (S83), for example by checking the ID number, the password, or the like, about which the public server section 16 inquires via the server section 11, as to whether the ID number, the password, or the like is registered in the display apparatus 5 in advance. The data processor 5a rejects the uploading of an authorized client apparatus 9.

If the uploading is authorized, the screen data (screen data file) of the display apparatus 5 is uploaded to the screen data file recording section 13 or the like (S84). Here, the data processor 5a of the display apparatus 5 extracts the screen data specified by the screen data memory 54, and transfers the screen data to the control computer 1. In the control computer 1, the server section 11 receives the screen data, and stores the screen data in the screen data file recording section 13 or the main memory.

The rest of the procedure is carried out similarly to S37, S41, and S42 of the procedure (see FIG. 21) of the control system (see FIG. 16) of the first embodiment. However, a process of S37 is carried out in accordance with the screen data file uploaded to the screen data file recording section 13. In the process of S37, the control computer 1 synchronizes contents stored in the server section 11, and an entity of the device address stored in the display apparatus 5.

Note that for synchronizing, decided for example in accordance with changing time and priorities in operation is which of the contents of the server section 11 and the entity of the device address in the display apparatus 5 is to be transferred.

For example, in case the contents stored in the server section 11 is updated in accordance with the contents of the device address of the display apparatus 5, the server section 11 acquires the contents of the device address, and transmits the contents as device data, as does the display apparatus 5. In an opposite case, where a change in the contents stored in the server section 11 is transferred to the entity of the device address, the server section 11 reads out the device data stored therein when the display apparatus 5 accesses to the server section 11. Then, the sever section 11 transfers the device data to the display apparatus 5.

Note that again in the present embodiment a format of the files are not limited to the HTML file and the XML file. For example, the file to be displayed in accordance with the device data, such as an HTML file to display data worked out by statistical work of the device data, may be publicized.

Moreover, again in the embodiment, instead of the applet, another execution program may be transferred to attain a substantially similar effect.

As described above, the communication of the present embodiment is so arranged that the screen data stored in the display apparatus 5 is uploaded so that the file to be publicized is generated in accordance with the screen data, so as to display the screen of the screen data on the client apparatus 9 whereby the operation can be performed via the screen. With this arrangement, it is possible to display on the client apparatus 9 the same screen as that displayed on the display apparatus 5, even if the control computer 1 is, unlike the computer 33, provided with no screen data file recording section 8b designated for storing the screen data. Therefore, it is not necessary to store in the control computer 1 the same screen data as that stored in the screen data file recording section 33b.

Next, described is another embodiment of the present control system.

Figure 33:
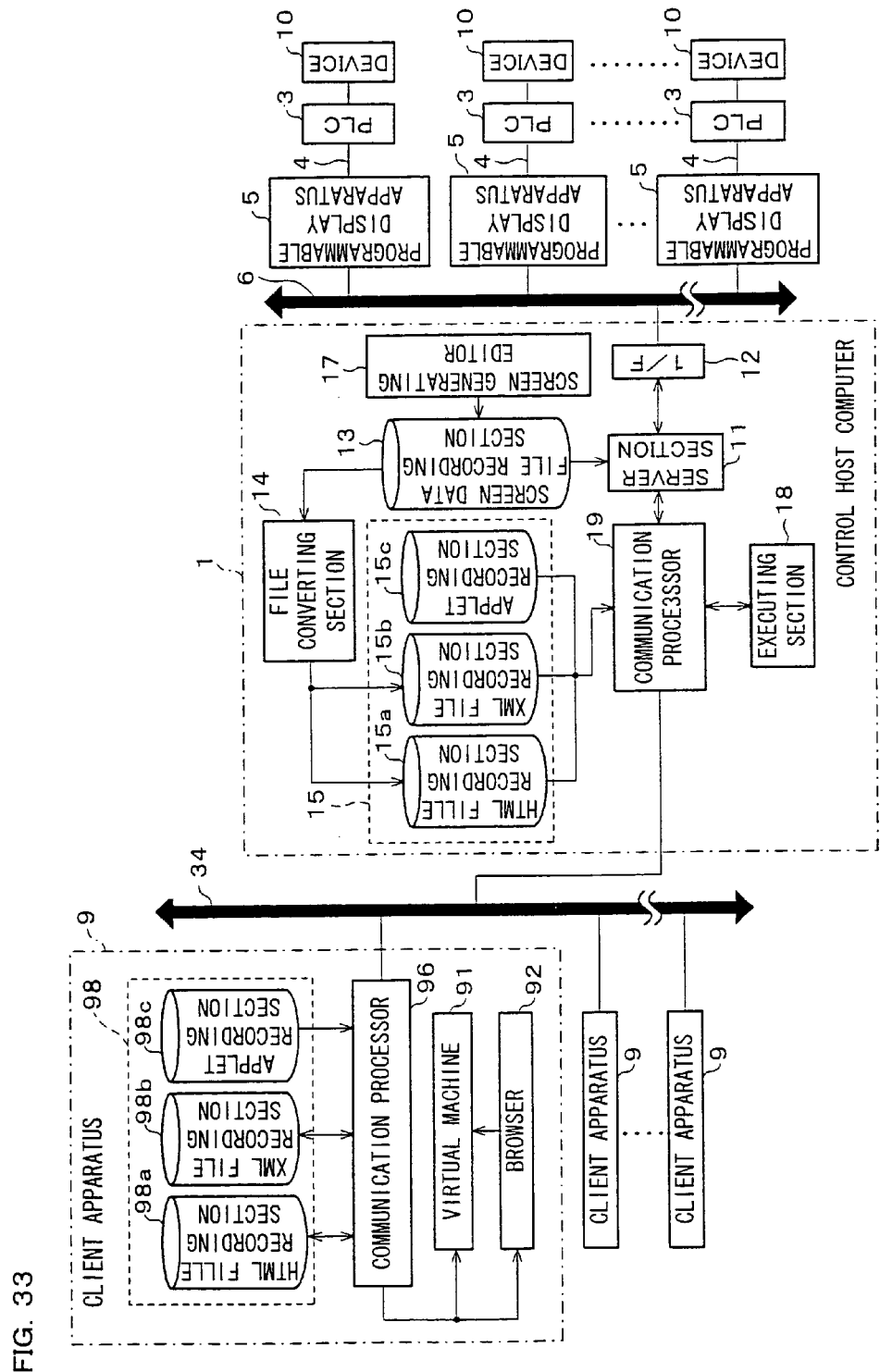
FIG. 33 is a block diagram showing another arrangement of the control system according to the second embodiment of the present invention.

A control system shown in FIG. 33 is provided with a control computer 1, a plurality of display apparatuses 5, a plurality of client apparatuses 9, and a plurality of PLCs 3.

In the control system, a public-end common network 34 (local network) is a local network such as the Intranet uniformly using the TCP/IP for communication. By adopting the public-end common network 34 thus arranged, it is possible to use an application program used in the Internet. The public-end common network 34, which is in a network configuration for exchanging information within a closed area such as inside a company, requires a firewall for protection of information that is so important and not to be released to public.

Here, a server section 11 supplies to a communication processor 19 the output data and the device address as request. Moreover, the server section 11, upon receipt of an instruction to change contents of a device address A from the client apparatus 9, rewrites the contents of the device address A to be a value specified in the instruction.

A screen generating section 17 has a function substantially equivalent to that of the screen generating processor 74 (see FIG. 1) of the control system of the first embodiment. The screen data file recording section 13 stores therein, as one file (screen data file) screen data per one screen of screens generated by the screen generating section 17.

The communication processor 19 (server-end communication means) communicates with a later-described applet of the client apparatus 9, via a communication processor 96. Moreover, the communication processor 19, which performs a main role in communication process of the control computer 1, performs communication process in response to accesses from the later-described communication processor 96 of the client apparatus 9, accesses from a display file recording section 15 (server-end storing means) and the server section 11 within the control computer 1, accesses to the server section 11 and the communication processor 96. In the communication process, for example, an HTML file, an XML file, or device data is transmitted to an executing section 18 in accordance with a request for an applet stored in an applet recording section 15*c*, and is transmitted back to the communication processor 96 by accessing to the server section 11 in accordance with a request made by the applet stored in a later-described applet recording section 98*c*.

Moreover, the communication processor 19, which has a user account file, uses the user account file so as to perform protecting process that is in accordance with a level of the access from the client apparatus 9. For the protecting process, for example, user names, passwords, access levels, alarm log generation, comments, and the like of each user are set in the communication processor 19. The access levels are for example a level at which only reading of the display content of the display apparatus 5 is authorized, a level at which not only reading but also writing of the display content is authorized, a level at which transmission of a reset command to the display apparatus 5 is validated, and a level at which generation of the alarm log file is authorized.

The reset command is a command for resetting the display apparatus 5 as a means to restore the display apparatus 5 from troubles such as communication errors. It is possible to perform restoration via the control computer 1 by transmitting such command from the control computer 1. The alarm log file is a file for displaying on the control computer 1 the alarm information from the PLC 3. The alarm log file is stored in the display apparatus 5.

The execution section 18 is a program for executing an applet stored in an applet recording section 15*c* (execution program recording means). The execution section 18 has a function equivalent to that of the virtual machine.

The server section 11, the communication processor 19 and the execution section 18 are also functional blocks realized by executing a program provided by a recording medium, similarly to the data processor 5*a* (see FIG. 31).

Here, the client apparatuses are provided with a display file recording section 98 (terminal-end storing means). The display file recording section 98 is provided with an HTML file recording section 98*a*, an XML file recording section 98*b*, and an applet recording section 98*c*. The HTML file recording section 98*a* and the XML file recording section 98*b* are respectively stores therein an HTML file and an XML file respectively identical to those stored in the HTML file recording section 15*a* and the XML file recording section 15*b*. The applet recording section 98*c* stores therein applets generated in advance respectively for specifications of the client apparatuses 9.

The applets stored in the applet recording section 98*c* have a function substantially equivalent to those stored in the applet recording section 15*c*. However, the applets stored in the applet recording section 98*c* are executed by a virtual machine 91 (display processing means) in order to allow the client apparatus 9 to display thereon the screen to be displayed on the display apparatus 5 thereby allowing operation via the screen. In this point, the applets stored in the applet recording section 98*c* are different from those stored in the applet recording section 15*c*. Therefore, the virtual machine 91 for executing the applet refers to the XML file and reads out, in accordance with an XML element indicating a tag, a method suitable to a type of the tag. For example, among methods that the virtual machine 91 executes, a method corresponding to a display tag is the drawing method, and a method corresponding to an input tag is the input method.

The communication processor 96 (terminal-end communication means) communicates with a communication processor 19 via the public-end common network 34, as requested by the applets. Moreover, the communication processor 96, which plays a main role in communication of the client apparatuses 9, performs communication process in response to accesses from the display file recording section 98 accesses from the communication processor 19, accesses from the virtual machine 91, and the like accesses. In the communication process, the HTML file and the XML file from the respective file recording sections 98*a* and 98*b* are downloaded to the virtual machine 91 for example as requested by the applets, while the device data obtained from the server section 11 is acquired by accessing to the communication processor 19.

In the control system thus arranged, the control computer 1 opens the HTML file stored in the HTML file recording section 15*a*, when the control computer 1 is instructed to display thereon the screen to be displayed on the display apparatus 5. Then, the execution section 18 extracts each APPLET element ("<APPLET>" to "</APPLET>") of the HTML file received via the communication processor 19, and executes the each element. Moreover, the execution section 18 acquires from the XML file recording section 15*b* via the communication processor 19 the XML file necessary for displaying the screen. Further, the executing section 18, while referring to the XML file, displays on a display section (not shown) provided to the control computer 1 the screen of the display apparatus 5 specified by the HTML file, whereby the executing section 18 instructs control that is in accordance with an operation performed on the screen, by input from an operation section (not shown) also provided to the control computer 1.

The execution of the applet by execution section 18 makes it possible to display on the control computer 1 the screen to be displayed on the display apparatus 5, and allows input operation via the screen by using the control computer 1.

Figure 34:
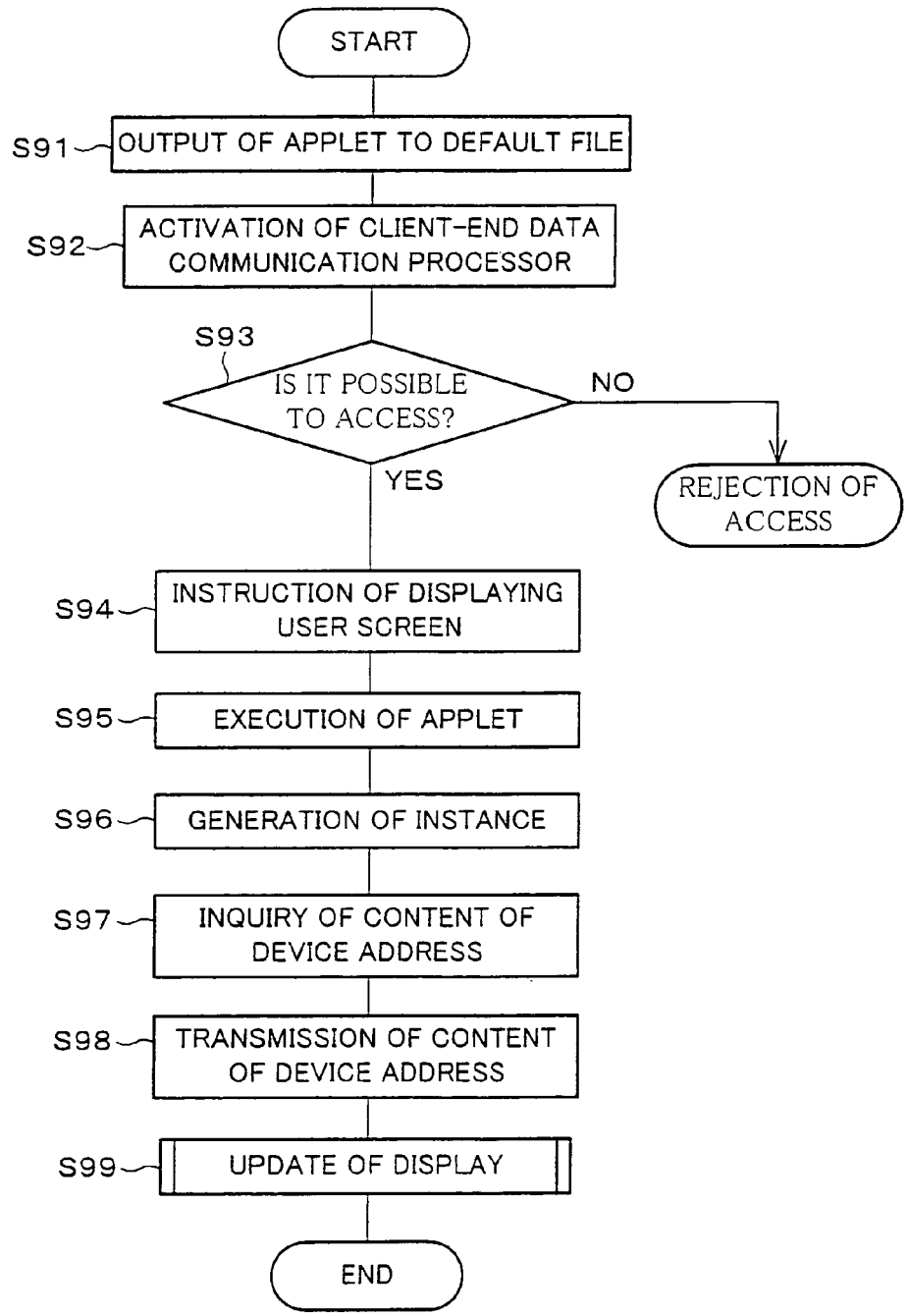
FIG. 34 is a flow chart illustrating a process procedure for causing a client apparatus of the control system of FIG. 33 to display a screen that is to be displayed on a programmable display apparatus.

Next, described below is a process for displaying on the client apparatus 9 the screen data of the display apparatus 5, with reference to a flow chart of FIG. 34.

When a user of the client apparatus 9 instructs to display on the client apparatus 9 the screen displayed on the display apparatus 5, the applet stored in the applet recording section 98*c* is outputted to default.htm, which is a default file of the HTML file recording section 98*a* (S91). In this state, the communication processor 96 is activated when the HTML file recording section 98*a* opens a HTML file corresponding to the desired screen of the display apparatus 5 to be displayed on the client apparatus 9 (S92).

The communication processor 96 accesses via the public-end common network 34 to the communication processor 19 in the control computer 1. Then, the communication processor 19, using the setting of security described above, checks whether or not the client apparatus 9 or the user is authorized for the display/control using the screen (S93), for example by checking whether or not a user name, a password or the like received from the client apparatus 9 is in registration. An access from an unauthorized client apparatus 9 would be rejected. At the same time, an access level is also checked.

If the access is authorized, the communication processor 96 accesses to the server section 11 via the communication processor 19, so as to instruct to display the screen of the display apparatus 5 (S94). The communication processor 19 limits the access through the server section 11 to data of the display apparatus 5, in accordance with the predetermined access levels.

Next, a browser 92 of the client apparatus 9 acquires the HTML file from the HTML file recording section 98*a* via the communication processor 96, and acquires, again from the HTML file recording section 98a, an applet specified by each APPLET element (a part from "<APPLET>" to </APPLET>") in the HTML file, so as to cause the virtual machine 91 to execute the applet (S95). Moreover, the virtual machine 91 acquires the XML file necessary for displaying the screen, via the communication processor 96 from the XML file recording section 98b, so as to generate instances respectively in accordance with processing instruction words, while looking up the XML file (S96). Of those instances, a drawing method of the instance corresponding to the instruction word for display is executed in a predetermined time interval. As a result, the virtual machine 91 inquires the server section 11 about the content of the device address A via the communication processor 96 and the communication processor 19 (S97).

On the other hand, the server section 11, when inquired, reads data out of an area corresponding to the device address A within a recording area of the user corresponding to the applet, and transmit the data to the client apparatus 9 by communication (S98). When the data is transferred to the client apparatus 9 via the public-end common network 34, the drawing method updates a display of a predetermined display region (X, Y) on the screen displayed on the client apparatus 9, in accordance with the data (the content of the device address A) (S99).

The HTML file includes a plurality of applets. Each applet draws, from the browser 92, relative coordinates (for example, relative coordinates having its origin at its left upper corner). This allows the client apparatus 9 to display the state of the device, regardless of a number and an order of the applets included in the HTML file.

On the other hand, the virtual machine 91 executes an input method of the instance corresponding to the input operation of the instances corresponding to the processing instruction words for input use, when input operation, such as operation of a mouse, is performed. By doing this, the virtual machine 91 requests, via the respective communication processors 96 and 19, the server section 11 to write the data according to an input result in a specified device address. The server section 11 rewrites the content in the area of the device address A, which is requested, within the recording area. The rewritten content is transmitted to the display apparatus 5 via the network 6. As a result, the result of the operation is reflected on the screen displayed on the client apparatus 9, similarly to the display apparatus 5, when the input method is carried out after the writing.

This allows the client apparatus 9 to display the screen having the same content as that of the display apparatus 5, and to control the state of the device in the same operation, even if the client apparatus 9 is in a location remote to the display apparatus 5 and connected to the control computer 1 via the public-end common network 34.

As described above, the control system of the present embodiment is so arranged that the applet installed in each client apparatus 9 inquires, via communication between the communication processors 96 and the 19, the server section 11 of the control computer 1 so as to cause the virtual machine 91 to instruct for display action and the changing in contents of the device address. With this arrangement, it is possible to see, one the client apparatuses 9 located remotely from the location of the display apparatus 5, the content of the screen displayed on the display apparatus 5 at the same time the screen is displayed on the display apparatus 5. Moreover, it is possible to operate on the screen on the client apparatus 9.

Moreover, because the control computer 1 is provided with the execution section 18 capable of accessing the communication processor 19, so that the control computer 1 executes the applet stored in the applet recording section 15c. Therefore, it is possible to see, also at the control computer 1, the content of the screen displayed on the display apparatus 5 at the same time the screen is displayed on the display apparatus 5. Again, it is possible to operate on the screen at the control computer 1.

For a server apparatus for a general Internet communication using HTTP, it is possible to have software for Web server, and CGI for exchanging data with the client apparatuses. However, processes via the software for Web server, and CGI are not so efficient. On the contrary, in the communication described above, the control computer 1 and the client apparatuses 9 rather directly communicates with each other, via the communication processor 19 and the communication processor 96. This improves communication speed, thereby attaining efficient exchange of data between the control computer 1 and the client apparatuses 9.

Moreover, in the present control system, in which the control computer 1 has no software for the Web server, it is impossible to utilize a security function of the software for Web server against accesses from the client apparatus 9. However, its security is improved because the access to the data of the display apparatus 5 is limited by the access level that is set in advance for each user. Moreover, this access limiting method does not authorize or reject accesses collectively in all level unlike a general access limit in the Internet communication. Instead, in the access limiting method it is possible to set at individual levels as to whether authorized or rejected, but not wholly at all the levels. Therefore, for example, it is possible to authorize a higher leveled access to a user of an important position regarding the communication, such as a system administrator.

Yet another modification of the present control system is explained below.

Figure 35:
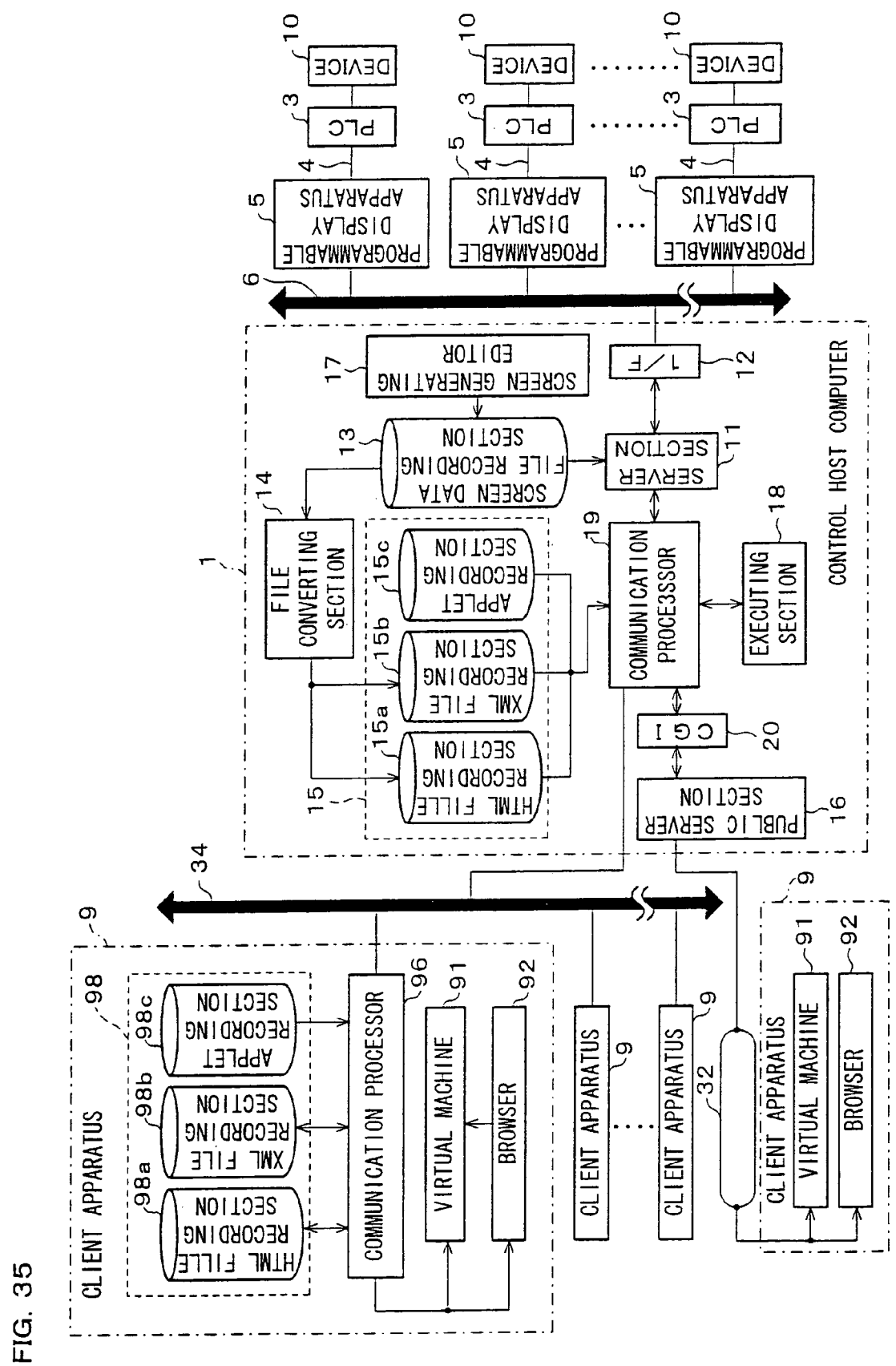
FIG. 35 is a block diagram of an arrangement of a modification of the control system of FIG. 33.

In a control system shown in FIG. 35, client apparatuses 9 are connected so as to be capable of performing Internet communication with a control computer 1 via the Internet 32 as a public network.

The control computer 1 of the present control system is further provided with a CGI (Common Gateway Interface) 20.

A browser 92, when instructed to access the control computer 1 and causes the control computer 1 to display on the client apparatus 9 a screen as a Web page, recognizes it, and recognizes that communication using HTTP is to be carried out. On the other hand, the browser 92 of the client apparatus 9, when instructed to cause the client apparatus 9 to display the screen, recognizes that communication via a communication processor 96 is to be carried out when an HTML file stored in an HTML file recording section 98a is opened.

The CGI 20 (communication relay means), which is provided on a server apparatus of a general Internet communication, is an interface program independent of a platform. The CGI 20, which is for the browser 92's access to the communication processor 19 via a public server section 16, outputs to the public server section 16 a replay (HTML data) from the communication processor 19 for the access.

In this control system, a server section 11 has functions (a) to count up how many nodes are accessing to the communication processor 19 from the client apparatus 9 via the CGI 20, and how many time relay accesses are made via the communication processor 19 to other stations, and (b) to display the counting. This makes it easier to control the accesses, so as to understand the state of the communication access to the communication processor 19, thereby checking for unauthorized accesses.

Figure 36:
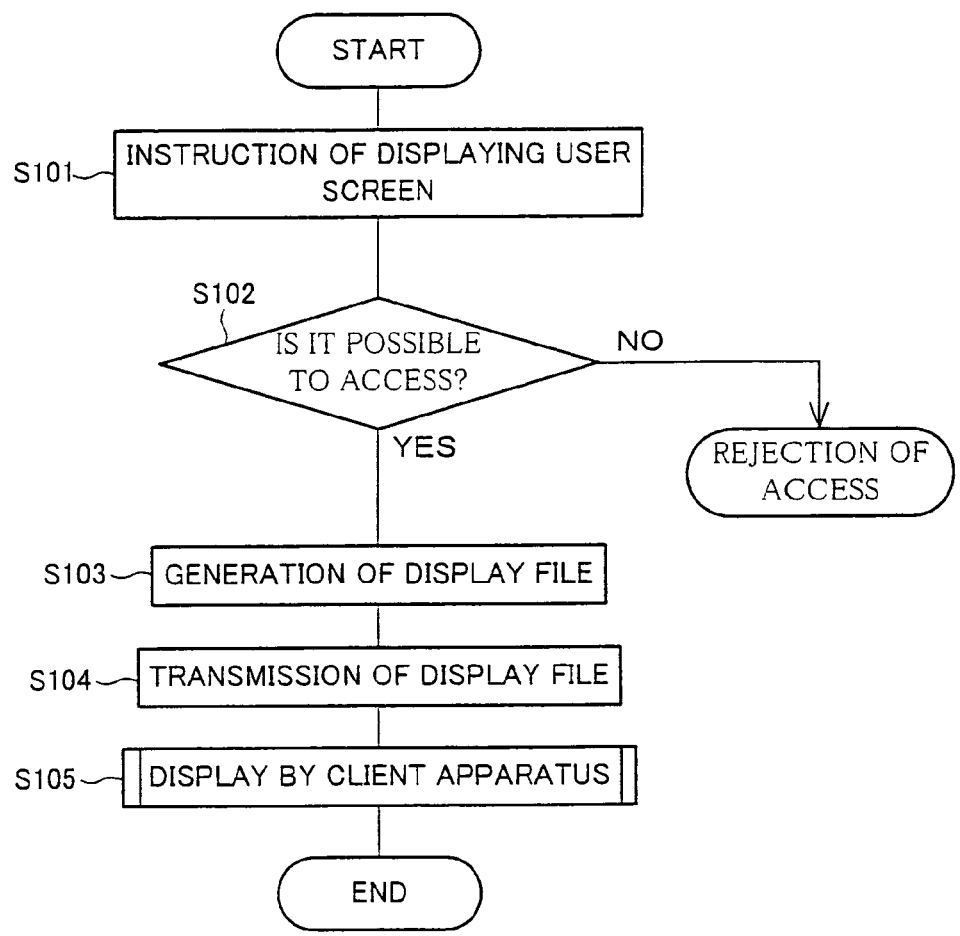
FIG. 36 is a flow chart illustrating a process procedure for causing a client apparatus of the control system of FIG. 35 to display a screen that is to be displayed on a programmable display apparatus.

Next, explained with reference to a flow chart of FIG. 36 is a process to display on the client apparatus 9 screen data of the display apparatus 5, in the communication.

To begin with, a user instructs, via the Internet 32, to cause the client apparatus 9 to access via the public server section 16 of the control computer 1 so as to display a screen of a certain display apparatus 5 (S101). Then, the public server 16 checks whether or not the display/control on the screen is authorized to the user or the client apparatus 9, for example, by checking whether or not an ID number, a password, or the like received from the client apparatus 9 is the one registered in advance (S102). An access from an unauthorized client apparatus 9 is rejected. Here, the communication processor 19 checks whether or not the client apparatus 9 is authorized to access the communication processor 19, as described previously (as at S93 of FIG. 34).

If the access is authorized, a file converting section 14 generates a public file such as an HTML file and an XML file, based on a screen data file stored in a screen data file recording section 13, when receiving a request for generating the public file from the client apparatus 9 by accessing the communication processor 19 via the CGI 20. Then, the file converting section 14 stores the public file in an area for the user in an HTML file recording section 15a and an XML file recording section 15b (S103). Only for a regularly authorized client apparatus 9, the public server section 16 reads, from the HTML file recording section 15a, the HTML file for displaying a screen requested by the client apparatus 9 so as to transmit the file, from the communication processor 19 to the client apparatus 9, via the CGI 20, the public server section 16, and the Internet 32 (S104). Further, the client apparatus 9 uses the file to display the screen (S105).

Again in the present system, distributed is the applet for causing the client apparatuses 9 to inquire, to instruct the changing, and to display, similarly to the control system of FIG. 33 described previously. Thus, it is possible to significantly reduce an amount of data to be transmitted, thereby improving response speed of the client apparatus 9 significantly. Moreover, the response speed can be further improved because user interface, such as moving a cursor, can be performed on the client apparatus end.

As in the first embodiment, the present control system is not limited to the HTML file and XML file in terms of the file format.

Figure 37:
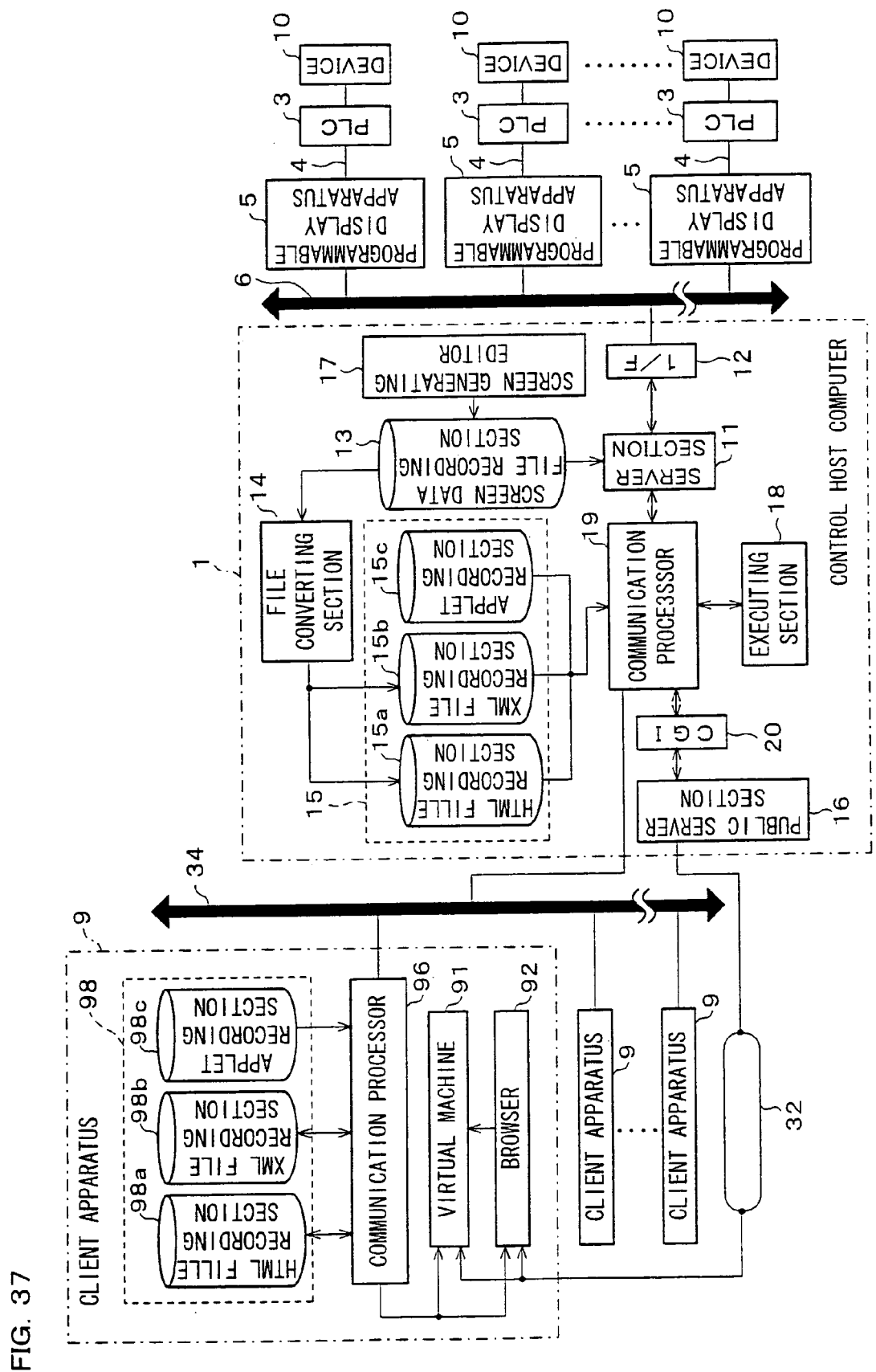
FIG. 37 is a block diagram showing an arrangement of another modification of the control system of FIG. 33.

Moreover, the present control system may be arranged as shown in FIG. 37.

The control system is so arranged that one client apparatus 9 can access a control computer 1 via a public-end common network 34 and the Internet 32. Thus, in order to display on the client apparatus 9 a screen in accordance with a file of the control computer 1, a browser 92 recognizes it as described above, and causes a communication processor 19 to perform communication via the Internet 32. On the other hand, in order to display a screen according to a file of the client apparatus 9, the browser 92 recognizes it and causes the communication processor 19 to perform communication via the public-end common network 34.

Therefore, in such control system, a process according to the communication selected by a user is carried out simply by the user's selecting either of the communications. Thus, the user can display the screen and operate on the screen thus displayed, without paying attention to the difference between the ways of communication. As a result, the user can utilizes, without a special operation, the communication via the CGI 20 and the Internet 32, which is a general Internet, and the communication via the public-end common network 34, the later communication being faster than the former one.

Third Embodiment

Described below is yet another embodiment of the present invention with reference to FIGS. 38 to 43. Note that, in the present embodiment, constituent elements having the equivalent function as the constituent elements of the aforementioned first and second embodiments are labeled in the same manner and their explanations are omitted here.

Figure 38:
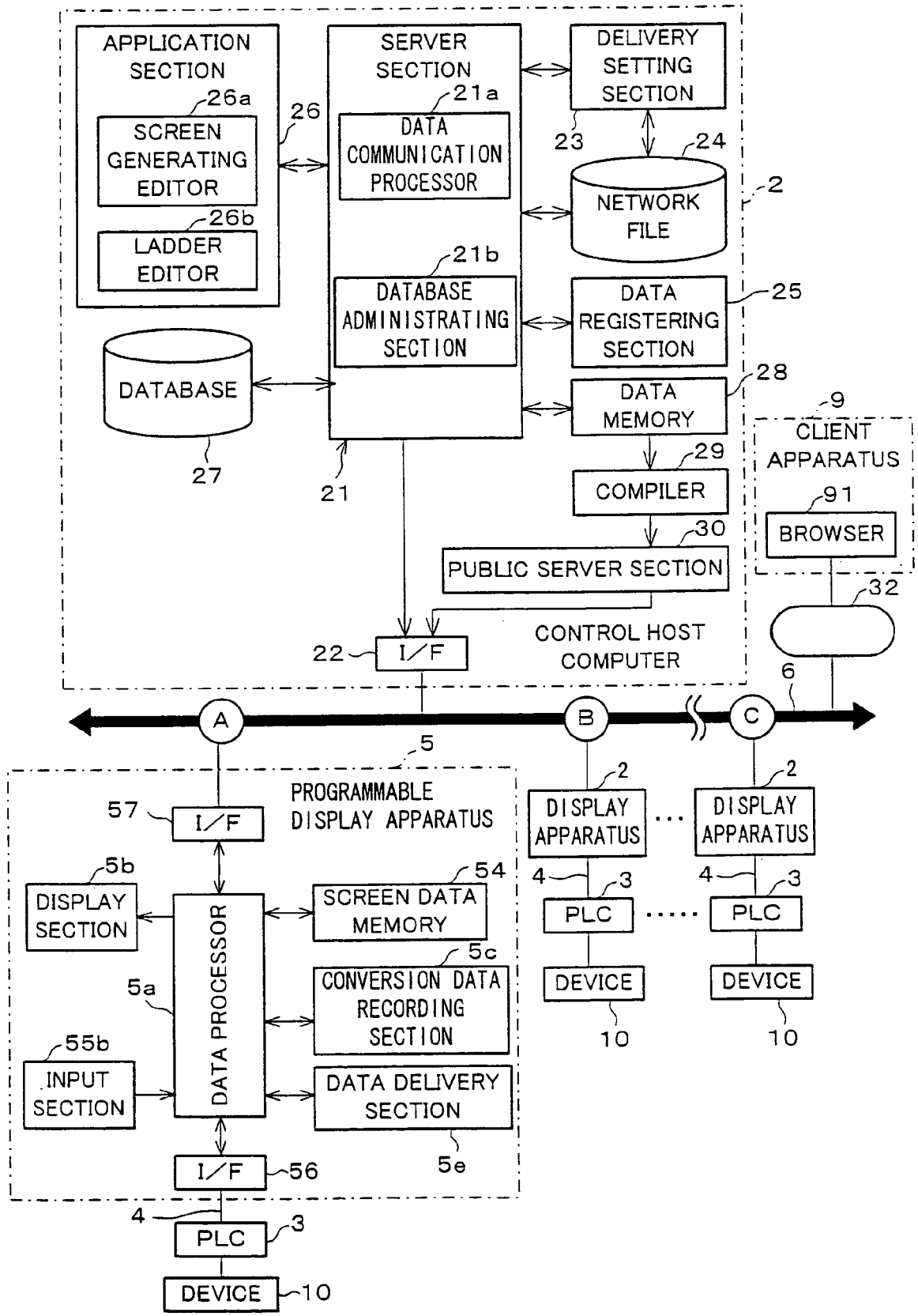
FIG. 38 is a block diagram illustrating an arrangement of a control system according to a third embodiment of the present invention.

A control system of the present embodiment is, as shown in FIG. 38, provided with a control host computer (hereinafter, denoted as a control computer) 2, a plurality of display apparatuses 5, a plurality of PLCs 3, and a client apparatus 9.

The control computer 2 and the display apparatuses 5 are connected with each other via a network 6 (common network), with which communication in a common protocol is possible. On the other hand, the display apparatuses 5 and PLCs 3 are respectively connected with each other via a serial cable 4 (designated network), with which communication in a specific communication protocol is possible.

Note that broadly-sensed communication protocols include (a) communication protocols in which data cannot be normally transmitted when a sender and a receiver do not have the same code for representing start characters and end characters, the same timing for sending and receiving the characters, and the same methods for specifying senders and receivers, and (b) communication protocols in which normal control is not possible when the sender and receiver do not have the same command system for command system that each PLC 3 can understand, because an action one of the sender and receiver desires is not identical to an action the other performs. Therefore, in the following explanation, the combination of the two kinds is denoted as communication protocol. Where it is necessary to distinct the two kinds, the former is denoted as a transmission protocol, and the latter is called as a command system.

Here, in the communication protocols specified by manufacturers of the PLCs 3, the data string 41 shown in FIG. 9 is generally transmitted for instructing to read out data.

Thus, in the present embodiment, in case the display apparatus 5 performs data communication via the network 6, a communication protocol (common protocol) common to communication protocols that can be transmitted through the network 6, so that communication will be performed in a unified communication protocol regardless of the communication protocol transmitted through the serial cable 4.

Figure 39:
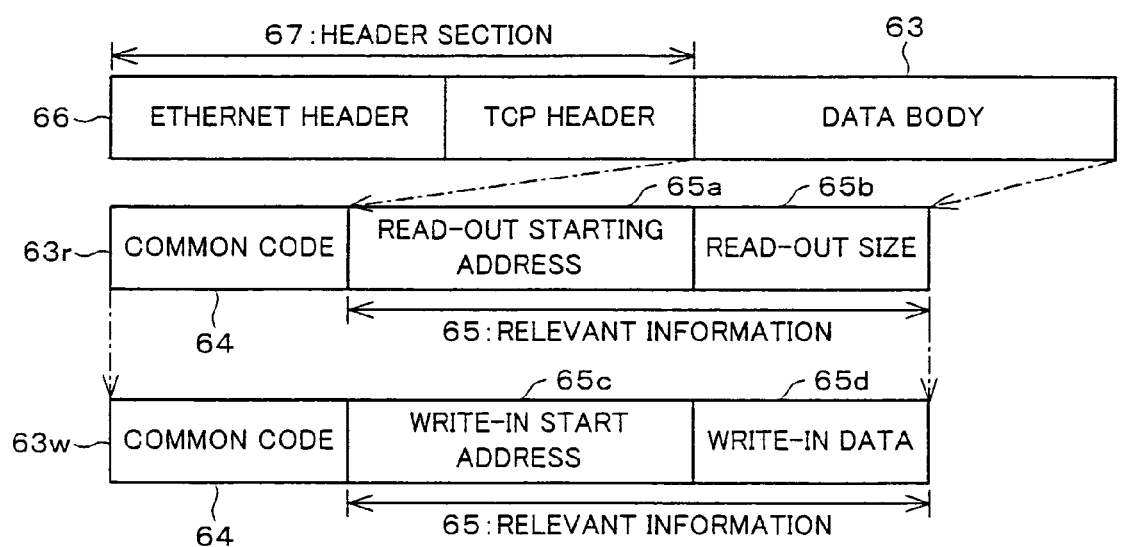
FIG. 39 is an explanatory view showing a communication protocol of a common network.

For this reason, when communicating via the network 6, as shown in FIG. 39, received is a data string 66 in a format specified in TCP/IP. The data string 66 is provided with a header section 67 including IP addresses of the sender and the receiver, and a data main body 63 (see FIG. 10) described previously, which indicates contents of the communication.

Here, the display apparatuses 5 are provided with a data delivery section 5e. The data delivery section 5e delivers output data of the PLC 3 to a specified receiver of delivery, when predetermine delivery conditions are satisfied. Thus, the data delivery section 5e stores therein node information as to a node of the receiver of delivery, setting information as to the delivery, the information being downloaded from the control computer 2 in advance.

The control computer 2 is provided with a sever section 21, a common protocol IF section (in figures, I/F) 22, a delivery setting section 23, a network file 24, a data registering section 25, an application section 26, a database 27, a data memory 28, a compiler 29, and a public server section 30.

The interface section 22 is connected to the network 6 for communication with the display apparatuses 5. The common protocol IF section 22 has a function substantially equivalent to the common protocol IF section 72 (see FIG. 1) of the control system of the first embodiment.

The server section 21 has a data communication processor 21a and a database administrator 21b. The server section 21 is a functional block realized by executing a program provided by a recording medium, similarly to the data processor 5a (see FIG. 31) described previously.

The data communication processor 21a is a section for carrying out the data communication process with the display apparatuses 5 via the network 6 and for exchanging data with the application section 26. The data communication processor 21a, for example, transmits a screen generated by a later-described screen generating editor 26a, a ladder program generated as a user program generated by a ladder editor 26b, and collets a screen delivered from the display apparatus 5, a ladder program delivered from the PLC 3 by the display apparatus 5, and input data (control instruction data) and output data of PLC 3. The input data indicates which part of contents (bit, numeral values) of a later-described device address of an input apparatus is to be changed. The output data is a content to be outputted by an output apparatus.

The database administrating section 21b (storing means and searching means) registers in the database 27 the screen and ladder program delivered from the display apparatus 5, and the input data and the output data of the PLC 3, and search through the data registered in the database 27.

More specifically, the database administrating section 21b sets folders named for each display apparatus 5 in the data base 27, and prepare records by combining the screen displayed on the display apparatus 5 or the ladder program executed by the PLC 3 with a symbol as a changing element for the screen or a ladder symbol (components and tag) as a changing element for the ladder program, the device address, the input data, and the output data. The database administrating section 21b registers the records in the folders in order of their generation. As folder names, for example, station names of the display apparatuses 5 such as "NODE A" indicated by A as shown in FIG. 38, or product type name of the display apparatuses 5, are appropriately used. Moreover, the database administrating section 21b searches for a record relating to a time specified by the folder specified by the user, and passes down the searched-out record to the screen generating editor 26a or the ladder editor 26b so that the screen generating editor 26a or the ladder editor 26b can display the record.

Because the database 27 is established generally in a hard disc apparatus, it takes comparatively long time to read out data from the hard disc apparatus. Thus, the database administrating section 21b reads out the records per blocks in which the records in plurality are included. In this way, the number of times the hard disc apparatus is accessed is reduced, thereby speeding up the searching. Moreover, by collectively reading out the blocks in plurality, the searching is further sped up.

Figure 40:
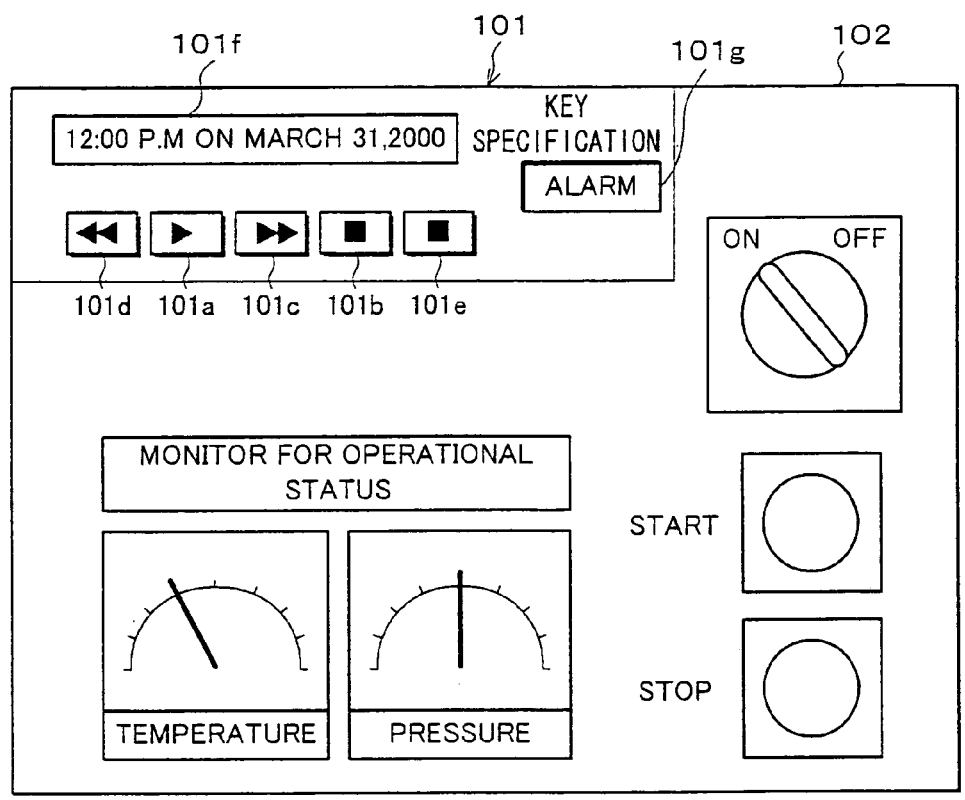
FIG. 40 is an explanatory view illustrating a screen (reproduction screen), which is reproduced by searching and an operation screen for searching a database included in a personal computer in the control system.

For searching, the database administrating section 21b provides the user with a search screen 101, as shown in FIG. 40 for example. The search screen 101 has a reproduction key 101a, a stop key 101b, a fast-forward key 101c, a fast-backward key 101d, a pause key 101e, day/time setting section 101f for setting day and time, and a key specifying section 101g for specifying keys later-described.

The database administrating section 21b continuously searches data so as to cause the screen generating editor 26a or the ladder editor 26b to dynamically display in accordance with operation of the reproduction key 101a. When the fast-forward key 101c or the fast-backward key 101d is operated during the searching, the searching is sped up so as to display the search screen in a forward or a backward direction at a high speed. On the other hand, when the pause key 101e is operated during the searching, the searching is temporally stopped so as to display the screen in pause. Moreover, when only the fast-forward key 101c or the fast-backward key 101d is operated, searching location is changed at a high speed, but the screen is not displayed (reproduced). Meanwhile, the day/time setting section 101a displays thereon day and time that are recognized when the searching location is moved. Further, the operation of the stop key 101c stops the searching.

The search screen 101 is searched out and displayed on a reproduction screen 52 displayed by the screen generating editor 26a or the ladder editor 26b. It is possible to move the search screen 101 to a desired location by dragging and dropping by using a mouse or the like. With such search screen 101, the user is provided with an environment in which the user can perform the searching in the same fashion as the user uses an audio apparatus.

Moreover, the database administrating section 21b carries out security check for access to the database 27 via a network. For example, in the network 6, the access is authorized (identified for authorization), when a user ID and a password is checked and found out to be the registered ones. In this way, it is possible to reject a non-intentional access by an unauthorized person via the Internet 32 connected to the network 6.

The delivery setting section 23 sets the node information and delivery information. The node information contains the nodes in the network 6, and types of the display apparatuses 5 connected to the nodes. The delivery information contains names of devices 10 connected to the PLCs 3 (the input apparatuses and the output apparatuses), timings of data delivery for each display apparatus 5, store addresses of data to be delivered, and store addresses of data received. The node information and the delivery information are stored in the network file 24, and downloaded to the data delivery section 5e of the display apparatuses 5 as required. The delivery setting section 23 is also a functional block realized by executing a program provided by a recording medium, similarly to the data processor 5a.

The data registering section 25 registers therein in advance the aforementioned protocol converting data to be recorded in the converting data recording section 5c. The converting data is downloaded via the data communication processor 5a to the display apparatus 5 that requires the converting data, for setting an initial setting, and for maintenance, such as changing the PLC 3 to be connected to the control system.

The application section 26 includes the screen generating editor 26a and the ladder editor 26b.

The screen generating editor 26a has a function substantially equivalent to the screen generating processor 74 (See FIG. 1) in the control system of the first embodiment. A screen generated by the screen generating editor 26a is transferred to the display apparatus 5 via the interface section 12 if necessary, and is downloaded to the screen data memory 54.

The ladder editor 26b is programming software for generating a ladder program for setting control procedure of the PLC 3 so as to cause the device 10 to operate in accordance with a desired sequence. The ladder editor 26b is so constituted that the ladder editor 26b can generate a ladder diagram on a display device (not shown) of the control computer 2 by arranging a ladder symbol corresponding to an action of the device 10. The ladder editor 26b uses, for example, the aforementioned programming languages in conformity of the international standard IEC.

Moreover, the ladder editor 26b associates, by using variable numbers, input numbers and output numbers that are respectively given to input terminals and output terminals of the PLC 3, with names (device names) of input apparatuses 6 and output apparatuses 7 connected to the input and output terminals, as assignment of the input and output numbers (I/O assign). A result of the assignment is stored in a recording apparatus (not shown) in the control computer 2.

Upon assignment, device names corresponding to addresses, which are derived from input numbers and output numbers, are stored in a predetermined memory inside the control computer 2. Conventionally, such an assignment differs depending on manufacturers of PLCs and is carried out using set absolute addresses, so that it is necessary to prepare memory tables corresponding to the manufactures. Incidentally, the present ladder editor 26b based on IEC allows a user to determine the input and output by using the above variable numbers (free variables), so that the above memory tables are unnecessary. Further, the assignment that has been determined once can be changed later.

The ladder program generated by the ladder editor 26b is transferred to the PLC 3 via the display apparatus 5 (or directly) and downloaded in the memory inside the PLC 3.

The database 27 manages data sequentially written by the database administrating section 21b for each folder. For example, in the screen displayed on the display apparatus 5 of NODE A, provided as fields are items such as "date", "screen", "preset temperature", "level", "preset pressure", "level", and "alarm", as shown in FIG. 41(*a*). "Date" is indicated on the minute time scale in FIG. 41(*a*); however, it may be stored on the second or millisecond time scale if necessary. The "screen" indicates a file name of the screen. The "preset temperature" and "preset pressure" indicate a temperature and a pressure preset as operating instructions, respectively. The "level" indicates actual temperature and pressure with respect to the preset temperature and pressure. When the preset temperature and pressure are in the predetermined range, alarm sets the value "0" which indicates as being normal. When not in the predetermined range, alarm sets the value "1" which indicates as being abnormal.

Further, a device address and a symbol on the screen are also written in data in each field except for the "screen" so as to be a pair, although not shown. For example, in case of the "preset temperature", the device address of a temperature adjustment apparatus and a numerical input tag can be written. In case of the "alarm", device address of a lamp, and a symbol can be written. One record is composed of the fields, and each record is written in the order of date. It is designed that in case where screens are changed, file names corresponding to the screens are written.

As to the ladder program, as shown in FIG. 41(*b*), records are written in a format similar to that of the screen in FIG. 41(*a*). In such a case, provided as fields are items such as "date", "ladder", "ON", "number of products", "ON/OFF", "count value", and "light-up/light-out". The "Ladder" indicates a file name of the ladder program. "ON" indicates that a start button in a production line is turned ON (upon ON, "1" is written). The "number of products" indicates the preset value of the number of products that pass through the predetermined position in the line. "ON/OFF" indicates output of an optical sensor for detecting the products passing through the foregoing predetermined position. Detection, that is, ON is "1", and non-detection, that is, OFF is "0". The "count value" indicates a count value by a counter of ON output of the optical sensor. The "light-up/light-out" indicates whether the number of products preset are carried by the line or not. Carriage, that is, light-up is "1", and non-carriage, that is, light-out is "0".

Further, as shown in FIG. 42, records of the screen and the ladder program may be managed together. "Program" in FIG. 42 corresponds to the "screen" shown in FIG. 41(*a*) and the "ladder" shown in FIG. 41(*b*), and the file names of the screen and the ladder program are stored.

Further, similarly, as to user programs generated by other application programs, records may be stored in a format similar to that shown in FIG. 41(*a*), or records may be stored together with the screen and the ladder program in a format as shown in FIG. 42. As an example of such a user program given is a CAD drawing for designing electric wirings of devices in a target system.

The database 27 has a file structure of sequential organization in which records are stored in the order of inputs. This enables sequential access for searching records in the order of times. Further, in the database 27, in order to enable a direct access to records in accordance with specified search item, desired records are stored in the state of being given a key by the database administrating section 21b. The setting of the key is previously carried out by a user on the screen for the key setting, not shown, provided by the database administrating section 21b.

The key is given to, for example, data (search items) such as time and alarm. Final access to records are carried out in accordance with physical address, so that association between a key and physical address is necessary. As an example of an association method given are one-to-one association between a key and physical address with a reference table, and writing of a record as physical address obtained by using a predetermined function in accordance with a key value. Further, instead of association between the key and the physical address, the following method may be adopted: a record number is calculated from a key, record writing is carried out in accordance with the record number, and a file system in the OS is made to calculate the physical address from the record number.

Thus, by giving keys to records, it is possible to uniquely specify desired records using keys.

The data memory 28 is a memory for temporarily storing a screen and its symbol (including texts) searched by the database administrating section 21b or a ladder program and its ladder symbol, and input and output data (device address data) of the PLC 3 so as to be provided for a processing by the compiler 29.

The compiler 29 (converting means) converts the foregoing screen or ladder program into an applet in the Java (Registered Trademark) language, which allows a virtual machine included in the browser 91 of the client apparatus 9 to execute. The applet, which is in the Java language, does not depend on a platform of the client apparatus 9. Each instance in the applet is set so as to refer to a device address, which is the same as a symbol corresponding to a screen or a ladder symbol corresponding to a ladder program. Further, each instance is generated so as to reflect an input and output data of the device address on a symbol or a ladder symbol.

The control computer 2 previously stores classes, including methods executed by the virtual machine, in accordance with types of the symbol used by the screen generating editor 26a or types of the ladder symbol used by the ladder editor 26b. The compiler 29 generates a code for calling out a method corresponding to each symbol in the screen or each ladder symbol in the ladder program. Further, the compiler 29 also converts the search screen 101 shown in FIG. 40 into an applet, similarly to the screen or the ladder program. Also, classes including methods, which are executed by the virtual machine, are prepared for each of the foregoing search operations by the search screen 101.

The compiler 29 and the public server section 30, similarly to the server section 11 (see FIG. 31), is a functional block realized by executing a program provided by a recording medium.

Here, the following will describe delivery information set in the foregoing delivery setting section 13. The delivery information is set on the setting screens as shown in FIGS. 43(a) and 43(b), and "delivery conditions" and "delivering station/receiving station" are provided on the respective setting screens.

In the "delivery conditions" shown in FIG. 43(a), as conditions for determining timings of delivery provided are switch-on, time specification, cycle specification, rewriting trigger, ON period, OFF period, rising trigger, and falling trigger.

The "switch-on" is a condition for delivering upon the switch-on of the display apparatus 5, and "time specification" is a condition for delivering at a specified time. The "cycle specification" is a condition for delivering for each desired cycle, and "rewriting trigger" is a condition for delivering when output data is rewritten, that is, when output data changes. The "ON period" and "OFF period" are conditions for continuing a delivery in the ON period and the OFF period of a device, respectively. The "rising trigger" and "falling trigger" are conditions for delivering upon detecting the increase and decrease of the output data (specified device output), respectively.

Further, in the area below the delivery conditions on the setting screen, provided is a section for inputting a device name to be specified on conditions in accordance with output of a device among the above conditions. Still further in the area below the section, a cycle for checking delivery conditions (by minutes), a section for setting a period of delivery, a section for setting a processing of returning the device output to OFF or ON after delivery. Incidentally, a check cycle is effective only for the delivery conditions, the "switch-on", "time specification", and "cycle specification." The period limitation is effective only for the delivery condition, "cycle specification." A setting for returning the device output to OFF after delivery is effective only for the delivery condition, "rising trigger." If not checking the section, the device output remains ON after delivery. On the contrary, a setting for returning the device output to ON after delivery is effective only for the delivery condition, "falling trigger." If not checking the section, the device output remains OFF after delivery.

On the other hand, in "delivering station/receiving station shown in FIG. 43(b) provided are information filing sections about the receiving station and the receiving station. The information of the delivering station includes a name of a device which is an output source of output data delivered from the display apparatus 5 and numbers of data delivered in a specified period. Further, the information of the receiving station includes a name of a device connected to the PLC 3 corresponding to the display apparatus 5 that is a receiving station. Incidentally, it is defined that in case where the control computer 2 is a receiving station, a folder name managed in the database 27 is a device name.

In the control system arranged as described above, in case where receiving the data string 66 of the common protocol via the network 6, the data processor 5a extracts from the data main body 63 the common code 64 for representing the command to be transmitted to the PLC 3, and the relevant information 65. Further, the data processor 5a refers to the command conversion table TBL and selects a command code corresponding to the common code 64, which is transmittable to the serial cable 4. Moreover, if necessary, an expressing method of the relevant information 65 is converted into an expressing method transmitted by the serial cable 4. As a result of these, when a command to be transmitted to the PLC 3, data content itself, data size and address, etc. are determined, the data processor 5a refers to the data transmission format FMT to generate a data string to be transmitted to the PLC 3.

On the other hand, when receiving the data string 41 from the PLC 3, the data processor 5a applies it to the foregoing data transmission format FMT, extracts a command that the data string shows, data content itself, data size, address, etc., and converts them into the data string 66 of the common protocol in the inverse procedure of that described above.

Before the display apparatuses 5 and PLCs 3 transmit the data regarding the control, combination (protocol information) between the data transmission format FMT and the command conversion table TBL is set in accordance with the communication protocol of the PLCs 3, so that the protocol information is changed over when a PLC 3 using a different communication protocol is connected. For example, if a PLC 3 of type A is replaced with a PLC 3 of type B, a command conversion table TBLa is changed over to a command conversion table TBLb, which are shown in FIG. 11.

Note that, a method of selecting the communication protocol is carried out similarly to the foregoing method carried out in the control system of the First Embodiment (see FIG. 1).

Thus, unlike the conventional control system, in the present control system, the display apparatuses 5 are provided in a central position in the communication, and the display apparatuses 5 are connected to both the network 6 and the serial cable 4. Moreover, in case of the difference of the communication protocol between the serial cable 4 and the network 6, the display apparatuses 5 inter-converts the respective communication protocols and relays the communication between (a) the PLC 3 to which that display apparatus 5 is connected, and (b) the control computer 2 or another display apparatus 5. In this manner, the control computer 2 and each display apparatus 5 can communicate with each other in the common communication protocol even if different dedicated protocols are used between the PLCs 3 that are respectively connected to the display apparatuses 5.

More specifically, the target system is provided with input apparatuses such as a flow sensor, a temperature sensor, or a sensor, which detects a state of respective components in the target system, output apparatuses such as a valve or a motor, which operates in accordance with instructions, and the devices 10 which are controlled by the PLCs 3. Further, because the PLCs 3 have been developed from the sequencer, most PLCs 3 are provided with their own communication protocols, for example, by manufacturers of the PLCs 3, product classes, and types of the PLCs 3. Therefore, the PLC 3, which is connected with the display apparatus 5 via the serial cable 4, communicates with the display apparatus 5 in the communication protocol in which the PLC 3 can communicate.

This makes it possible that the PLC 3 transmits the data, which is obtained by the input apparatuses, as output data of the PLC 3 to the display apparatus 5 or to other display apparatus 5 or the control computer 2 via the display apparatus 5, while the PLC 3 receives control instruction transmitted from the display apparatus 5 or from other station via the display apparatus 5 to control the output apparatuses.

As described above, in the control system in which transaction for determination of a common communication protocol is carried out in the network 6, it is possible to easily deliver data of screen and device address between each display apparatus 5 and the control computer 2. Next, the delivery will be described in detail.

Here, the following will describe an arrangement in which the nodes A to C in the network 6 are connected to the respective display apparatuses 5, each of which is independently connected to the PLC 3, each of which includes 100 input and output terminals. In such an arrangement, with respect to the output terminals of each PLC 3, control data inputted by the operator with the display apparatus 5 is stored in a store region corresponding to the memory in the PLC 3, and the output apparatus 7 is controlled in response to the stored content. With respect to the input terminals of each PLC 3, input data supplied from the input apparatus 6 is written in the store region corresponding to the foregoing memory.

For example, in each store region corresponding to one hundred input output terminals in each PLC 3 corresponding to the nodes A to C, store addresses are allocated, numbered 100 to 199, 200 to 299, and 300 to 399. The data delivery section 5e in the display apparatus 5 of the node A delivers data in the store region numbered 100 to 199, that is, all input and output data at cycles (for example, 10 seconds) preset by the foregoing delivery setting section 13. The data are stored in the control computer 2.

Moreover, when the delivery condition "rising trigger" is set, and a bit representing various information such as error (alarm) information of a device and information on operating instructions corresponding to device output is provided in the store region corresponding to each device in the memory of the PLC 3, node information (station name) of the PLC 3 to which the device is connected as well as the delivery condition is transmitted from the display apparatus 5 of the node when the bit is ON.

Further, the control computer 2 stores all data that are transmitted from each display apparatus 5. Each display apparatus 5 includes data delivery section 5e, which is provided with a store region necessary for storage of delivery data therein.

Data loading in the control computer 2 may be carried out in such a manner that a receiver's address is stored in delivery data from the delivery source, for example, in the IP address. Further, in case of many receivers including display apparatuses 5, etc., not just the control computer 2, the data loading may be carried out in such a manner that the IP address is LAN broadcasted, and the receivers determines whether data is loaded or not in response to the IP address of the delivery source of the delivery data. Also, needless to say, all display apparatuses 5, similarly to the control computer 2, may have storing region corresponding to all delivery data so as to store therein all delivery data.

As described above, when the delivery condition is established, not only data delivery is possible between each display apparatuses 5 and the control computer 2, but also delivery data is sequentially stored in database 27 of the control computer 2, regarding the establishment of the deliver condition as a trigger, so that it is possible to search desired records from the database 27. Next, the operation will be described in detail.

For example, input data (the content of the device address of the input apparatus 6) and output data (the content of the device address of the output apparatus 7) of the PLC 3 collected in the display apparatus 5 of the node A are delivered to the control computer 2 together with the device address via the network 6. Then, they are loaded from the common protocol IF section 22 to the server section 21 and transferred to the database administrating section 21b. The database administrating section 21b sequentially writes records inputted continuously into the database 27, regarding data inputted at the same time in the folder of the node A as one record. Such writing is automatically performed, so that the user can store data without considering the database 27.

In case where searching is carried out in the database 27, an operation mode of the server section 21 is changed over to a search mode to activate the searching screen 101 as shown in FIG. 40. Here, in case where records are searched in the order of date of storage, searching is started in a folder specified by operation of the reproduction key 101b. During searching, records are sequentially read out from the database 27 by the database administrating section 21b and are outputted to the screen generating editor 26a. The screen generating editor 26a reproduces the screen in accordance with the screen in the received record and data of the device address and the symbol, and shows the screen on the display of the control computer as a reproduction screen 102 shown in FIG. 40. Such a series of operations are continuously performed, so that it is possible to dynamically reproduce change of the screen on the display, similarly to the screen displayed on the display apparatus 5 when the PLC 3 have operated actually.

Moreover, in case where only the record corresponding to the specified key is read out in accordance with the preset key, the operation of the reproduction key 101b by specification of alarm as a key enables the readout of the record upon the occurrence of the alarm, and the record is reproduced by the screen generating editor 26a. Thus, not only the specification of the alarm as a key enables the display of the screen upon the occurrence of the alarm, but also further reproduction of screens before and after the occurrence of the alarm makes it possible to check what operations are performed before the occurrence of the alarm, or what operations are performed for recovery after the occurrence of the alarm.

Further, records are stored in a table format in the database 27 as shown in FIGS. 41(*a*), 41(*b*) and 42. This makes it possible to utilize the record stored in the database 27 for a daily report or a monthly report.

The above searching and reproducing operations can be performed in not only the screen, but also ladder program or other user programs (for example, the foregoing CAD drawing).

In case of the ladder program, the ladder program executed in the PLC 3 is delivered to the control computer 2 via the display apparatus 5 and is written in the database 27 by the database administrating section 21b. In searching, a searched ladder program (not shown) is reproduced instead of the reproduction screen 102 shown in FIG. 40. In case of reproduction of a ladder program monitor, the ladder program is reproduced in the range of an area of the selected ladder program monitor. Contact points and operations of coils, etc. searched in the ladder program are expressed, for example, by changing colors of these parts.

The searching and reproducing operations as described above can be performed by the client apparatus 9 via the Internet 32. Next, the following will describe operations in such a case.

Upon receipt of request for searching from the client apparatus 9, the public server section 30 activates CGI and gives instruction for searching to the database administrating section 21b of the server section 21. Upon the receipt of the instruction, the database administrating section 21b searches with respect to the database 27 as described above. Records transmitted from the database administrating section 21b are temporarily stored in the data memory 28, and then, they are outputted to the compiler 29.

Further, the public server section 30 instructs the compiler 29 to generate an applet via CGI or BGI, or the like. Upon receipt of the instruction of generating the applet from the public server section 30, the compiler 29 extracts symbol or ladder symbol in the screen or the ladder program, respectively, from a record, which is read out from the data memory 28, corresponding to the applet to be generated. Then, the compiler 29 outputs (a) a character string (code) to generate an instance of the class corresponding to the type of the symbol or the ladder symbol and (b) a character string (code) to set a parameter of the symbol or the ladder symbol in a field of the instance. Moreover, both character strings may be specified as initial values at the time of generation of instance to be outputted together.

Further, after the output of the character string is ended as to all the symbols or the ladder symbols in the screen or the ladder program, respectively, the compiler 29 attaches, in front and behind the code generated in accordance with each symbol or each ladder symbol, a character string (character strings such as "<HTML>", "<TITLE>") that are necessary as HTML documents, and a character string (such as <APPLET>) that are for operating the generated code as applets.

Thus, the screen that has been actually displayed on the display apparatus 5 or the ladder program that has been actually executed in the PLC 3, which are stored in the database 27, is outputted as the applet to the public server 30. The public server section 30 transmits the applet from the interface section 12 to the client apparatus 9 via the network 6 and the Internet 32.

In the client apparatus 9, the browser 91 activates the virtual machine to execute a drawing method using the device address and the input and output data, which are supplied from the control computer 2, so that the screen is displayed similarly to the display state in the display apparatus 5, or the screen is displayed in the state that the ladder program reflects the operation state of the PLC 3. In this manner, even in the client apparatus 9 at the position away from the control computer 2, searching is performed as in the case of the control computer 2.

As described above, in the control system of the present embodiment, the display apparatus 5 absorbs the difference of the communication protocol between the types of the PLCs 3, which makes easy data communication between each display apparatus 5 and the control computer 2. Therefore, it is possible to easily collect the output data from different types of PLCs 3 in the control computer 2. Further, using the data delivery function by the data delivery section 5e, every time the set delivery conditions are satisfied, data is delivered from the display apparatus 5 to the control computer 2, and the data is stored sequentially in the database 27 by the database administrating section 21b, so that it is possible to collect and store data efficiently, unlike the conventional data collection software, which requests for transmission of data from a personal computer while communicating with the PLC. Therefore, the user can establish the database 27 without consideration.

Still further, data are stored in the database 27 in the order of data collection in time sequence, so that data structure in the database 27 is simplified, and details and locations of data are recognizable. This provides an easy database management.

Moreover, operations in the display apparatus 5 can be reproduced by reflecting the input and output data obtained by searching to the screen or the ladder program. Therefore, unlike a VTR recording motion pictures, it is not necessary to store a large amount of data, as well as searching makes it possible to check the screen and the ladder program when operating errors occur. Especially, it is possible to easily specify the moments when the operating errors occur by searching which regards alarm as a key. Also, when continuous searching is performed by using the search screen 101 as shown in FIG. 40, change of the symbol of the screen and the ladder symbol of the ladder program by input data and output data is dynamically displayed, so that it is possible to reproduce the screen and the ladder program similarly to the reproduction in video reproduction apparatuses such as a VTR.

Thus, reproduction of the executed screen and ladder program is utilized not only for verification of operating errors, etc., but also for education of operators. For example, an operating content of the display apparatus 5 can be reproduced repeatedly without operating a target system, so that the operating content by a veteran operator can be sufficiently utilized as a textbook.

Further, in case where the same works as yesterday's work is performed, it is possible to check on the reproduced screen whether the use of yesterday's data stored in the database 27 would cause troubles or not, so that it is possible to re-use data effectively.

Note that, in the present embodiment, as the network 6, TCP/IP on the Ethernet is adopted; however, the network 6 is not limited to this. For example, IEEE1394, or other networks may be adopted. A similar effect can be obtained, provided that the network has communication capacity so sufficiently that the control computer 2 can communicate with each PLC 3 via the display apparatus 5.

Further, in the present embodiment, an example using a ladder program is shown. However, needless to say, the control procedure program of the present invention can be adopted for a control procedure program by other languages including five languages defined in the foregoing IEC 6 1131-3, besides the ladder program. Meanwhile, a user program may be the foregoing CAD drawing, etc. besides a display content program (screen) and control procedure program and a control procedure program, provided that the user program is a program that shows the control state by the PLC 3.

Still further, in the present embodiment has been described an example that the screen or the ladder program as a user program is converted into the applet in the control computer 2; however the present invention is not limited to this.

Yet further, even in the present embodiment, a substantially similar effect can be obtained even when a program for making the client apparatus 9 to execute an operation similar to the applet by compiling other program languages, instead of the applet.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

INDUSTRIAL APPLICABILITY (1) A control server apparatus of the present invention and a control system of the present invention including the same is so arranged that data indicating a screen of a programmable display apparatus is converted into such a format that the screen can be displayed on a terminal apparatus in that format, and then is transmitted. As a result, a screen having the same content as the screen displayed, via the Internet or the like, on the programmable display apparatus can be displayed on the terminal apparatus in a remote area, without putting a burden on a control apparatus.

(2) A control terminal apparatus of the present invention is so arranged that the control terminal apparatus can transfer an instruction of updating a control program, to a local control system including a control unit to receive the instruction, even in case a conventional control program generating means, which is capable of outputting the control program only to a serial port, is utilized. As a result, it is possible to update the control program of the control unit from a remote area, by utilizing the conventional control program generating means, without newly generating, for each type of control units, a control program generating means, which is capable of outputting the control program via a wide area network. Moreover, the control program can be updated in a short time even if a staff of generating a control program is not positioned in a vicinity of the local control system. Thereby, it is possible to reduce labor of maintenance.

(3) With a control system of the present invention, it is possible to display on a terminal apparatus located in a remote area from a control display apparatus, a display-use screen to be displayed on the control display apparatus. Further, because the screen data is acquired from the control display apparatus, it is not necessary to store the screen data in a server apparatus having a generating means and a communication means. Thus, it is possible to display the display-use screen to be displayed on a control display apparatus more easily.

(4) With a control system of the present invention, display on a terminal apparatus located in a remote area from a control display apparatus, a display-use screen identical to a display-use screen to be displayed on the control display apparatus. Moreover, because communication between a server apparatus and a terminal apparatus is carried out by communicating between a server-end communication means and a terminal-end communication means via a local network, it is possible to effectively perform the communication at a relatively at a high communication speed, without using a communication system, which is performed via software for Web server, and which has a relatively low efficiency, for example a general Internet communication.

(5) With a control system of the present invention, it is possible to for a display-type control apparatus to communicate with a host computer always in the same communication protocol via a common network, regardless of which communication protocol the control apparatus uses. As a result, a host computer can easily accumulate an output data from the control apparatuses having different communication protocol.

Moreover, when a predetermined delivery condition is satisfied, a database is automatically established, while a user does not notice about the establishment. Further, accumulated data structure is simplified, and a user program, change elements and both data are accumulated so as to correspond each other. Thus, it is possible to reproduce how the change elements are changed in the user program in accordance with both the data. This makes it easier to administrate the database, and to check a foregoing control state of the control apparatus.

Further, because a searched out user program is continuously displayed, a status of the user program at a time the control apparatus was in action can be reproduced. Further, in the terminal apparatus, when the execution program is executed, the change elements in the user program are changed in accordance with both the data. As a result, for example, states of changing the symbols of the change elements are displayed on the screen. Thus, the transmission of the user program in a format of the execution program enables the terminal apparatus in a network such as the Internet to search and check data accumulated in the host.

What is claimed is:

1. A control system comprising:
a terminal apparatus including:
a terminal-end recording means for storing screen data in a format suitable for display processing, the screen data being for a display-use screen and including, one or more process instruction words each including one or more reference information referred to for each carry-out event which is generated in advance in order to display in accordance with device data of a predetermined device;
the screen data is obtained by combining process instruction words including:
a process instruction word for displaying, on a predetermined area of one of the display-use screens, a display element corresponding to predetermined device data; a process instruction word for specifying an input operation;
a control display apparatus, which reads out device data indicating a state of a device from a predetermined recording area and displays the device data on one of display-use screens that have been generated in advance, and which gives a control instruction to the device via said one of display-use screens, the control display apparatus including a recording means for storing therein screen data, which is data of the display-use screens, and a transmitting means for transmitting the screen data stored in the recording means in accordance with a request from the terminal apparatus; and
a host computer including;
a communication means for acquiring, from the control display apparatus, the device data indicating a state of the device, the communication means being capable of communicating with the terminal apparatus via a network,
an execution program recording means for storing therein an applet for causing the terminal apparatus to perform an action of inquiring the communication means about the device data corresponding to the screen data transmitted, and an action of displaying the one of display-use screen screens on the terminal apparatus in accordance with the device data corresponding to the process instruction word and a response to the inquiring, and
a generating means for generating terminal-use data for displaying one of the display-use screens on a display surface of the terminal apparatus, in accordance with the thus acquired device data and the transmitted screen data,
the communication means transmitting the applet and the terminal-use data to the terminal apparatus, and acquiring device data that is inquired about by the terminal apparatus, so as to transmit the device data to the terminal apparatus, and
the terminal apparatus executing the applet so as to inquire the communication means about the device data, to cause one of the display-use screens to be displayed based on the terminal-use data, and to cause the state of the device to be displayed on said one of the display-use screens based on the device data acquired from the communication means.

2. The control system as set forth in claim 1, wherein the terminal-use data are XML files generated so as to respectively correspond to the display use screens, and each of the terminal-use data includes one or more XML elements indicating one or more process instruction words relating to each of the display-use screens.

3. The control system as set forth in claim 2 wherein
the generating means extracts one or more process instruction words relating to each of the display-use screens from the screen data, generates one or more XML elements corresponding to the extracted one or more process instruction words, and sets contents of said one or more XML elements in accordance with the extracted one or more process instruction words, so as to generate a XML file for each of the display-use screens, and the applet is executed by the terminal apparatus using the terminal-use data so that the terminal apparatus performs an action of inquiring the communication means about the device data, and an action of updating, in accordance with the device data, a display of a display area indicated by the one or more XML elements in the display-use screen displayed by the terminal apparatus.

4. A non-transitory recording medium storing thereon a communication control program for causing a computer to execute in a control system including on a) a terminal apparatus including;

a terminal-end recording, means for storing screen data in a format suitable for display processing, the screen data being for a display-use screen and including, one or more process instruction words each including one or more reference information referred to for each carry-out event which is generated in advance in order to display in accordance with device data of a predetermined device;

the screen data is obtained by combining process instruction words including:

a process instruction word for displaying, on a predetermined area of one of the display-use screens, a display element corresponding to predetermined device data; a process instruction word for specifying an input operation;

(b) a control display apparatus, which reads out device data indicating a state of the device from a predetermined recording area and displays the device data on one of display-use screens that have been generated in advance, and which gives a control instruction to the device via said one of display-use screens, the control display apparatus including a recording means for storing therein screen data for the display-use screen, and a transmitting means for transmitting the screen data stored in the recording means in accordance with a request from a terminal apparatus, on (c) a host computer for executing:

a communication process for acquiring, from the control display apparatus, the device data indicating a state of the device, and which can communicate with the terminal apparatus via a network;

an execution program recording process for storing therein an applet for causing the terminal apparatus to perfoi in an action of inquiring the communication process about the device data corresponding to the screen data transmitted, and an action of displaying the one of display-use screens on the terminal apparatus in accordance with the device data corresponding to the process instruction word and a response to the inquiring; and a generating process for generating terminal-use data for displaying one of the display-use screens on a display surface of the terminal apparatus, in accordance with the thus acquired device data and the transmitted screen data, the communication process transmitting the applet and the terminal-use data to the terminal apparatus, and acquiring device data that is inquired about by the terminal apparatus, so as to transmit the device data to the terminal apparatus, and the terminal apparatus executing the applet so as to inquire the communication process about the device data, to cause one of the display-use screens to be displayed based on the terminal-use data, and to cause the state of the device to be displayed on said one of the display use screens based on the device data acquired from the communication process.

5. The non-transitory recording medium as set forth in claim 4, wherein the terminal-use data are XML files generated so as to respectively correspond to the display use screens, and each of the terminal-use data includes one or more XML elements indicating one or more process instruction words relating to each of the display-use screens.

6. The non-transitory recording medium as set forth in claim 5, wherein the generating means extracts one or more process instruction words relating to each of the display-use screens from the screen data, generates one or more XML elements corresponding to the extracted one or more process instruction words, and sets contents of said one or more XML elements in accordance with the extracted one or more process instruction words, so as to generate a XML file for each of the display-use screens, and the applet is executed by the terminal apparatus using the terminal-use data so that the terminal apparatus performs an action of inquiring the communication means about the device data, and an action of updating, in accordance with the device data, a display of a display area indicated by the one or more XML elements in the display-use screen displayed by the terminal apparatus.

7. A control system, comprising:

a control display apparatus, which reads out device data indicating a state of a device from a predetermined recording area and for displaying the state of a device on one of display-use screens that have been generated in advance, and for giving a control instruction to the device via said one of display-use screens; the control display apparatus including a recording means for storing therein screen data, and a transmitting means for transmitting the screen data stored in the recording means in accordance with a request from a terminal apparatus;

a server apparatus including:

a server-end communication means for acquiring device data from the control display apparatus, and for transmitting the device data, the device data indicating the state of the device; and an execution program recording means for storing therein an applet for causing a terminal apparatus to perform an action of inquiring the server-end communication means about the device data corresponding to the screen data transmitted, and an action of displaying the one of the display-use screens on the terminal apparatus in accordance with the device data corresponding to a process instruction word and a response to the inquiring:

a plurality of terminal apparatuses each including:

a terminal-end recording means for storing screen data in a format suitable for display processing, the screen data being for the display-use screen and including one or more process instruction words each including one or more reference information referred to for each carry-out event which is generated in advance in order to display in accordance with device data of a predetermined device;

the screen data is obtained by combining process instruction words including:

a process inst ction word for displaying, on a predetermined area of one of the display-use screens, a display element corresponding to predetermined device data; and a process instruction word for specifying an input operation;

a display processing means for inquiring the server-end communication means about whether or not the server-end communication means has acquired the device data corresponding to the process instruction word of the screen data stored in the teiiiiinal-end recording means, and for displaying the display-use screen in accordance with the device data corresponding to the process instruction word which is transmitted from the server-end communication means, and a terminal-end communication means for communicating with the server-end communication means via a local network so as to receive the inquiry from the display processing means and the device data as a reply for the inquiry.

8. The control system as set forth in claim 7, wherein:

the server apparatus includes a server-end storing means for storing the screen data in a format suitable for display processing, and a communication relay means for relaying communication between the server-end communication means and a public network, the server-end communication means acquiring the screen data stored in the server-end storing means and giving the screen data to the communication relay means, and the display processing means (a) inquires the server-end communication means, by relay communication via the relay means via the public network, about whether or not the server-end communication means has acquired the screen data stored in the server-end storing means and the device data corresponding thereto, and (b) displays the screen-use screen in accordance with (i) the screen data transmitted from the server-end communication means by the relay communication and (ii) the device data corresponding thereto, (c) causes the server-end communication means to perform the communication via the local network for acquiring the screen data stored in the terminal-end storing means, and (d) causes the server-end communication means to perform the communication via the public network for acquiring the screen data stored in the server-end storing means.

9. The control system as set forth in claim 7, wherein the server apparatus further includes a file converting means for extracting said one or more process instruction words from the screen data and setting a content of one or more XML elements in accordance with said one or more process instruction words so as to convert the screen data into a format suitable for display processing, thereby generating a XML file for a screen.

10. A non-transitory recording medium storing therein a communication control program for causing a computer to execute:

in a control system including (a) a control display apparatus, which reads out device data indicating a state of a device from a predetermined recording area and for displaying the state of a device on one of display-use screens generated in advance, and for giving, via said one of display-use screens, a control instruction to the device, the control display apparatus including a recording means for storing therein screen data, and a transmitting means for transmitting the screen data stored in the recording means in accordance with a request from a terminal apparatus;

(b) a server apparatus having a server-end communication means for acquiring, from the control display apparatus, display data indicating the state of the device, and for transmitting the device data, an execution program recording means for storing therein an applet for causing a terminal apparatus to perfot in an action of inquiring the server-end communication means about the device data corresponding to the screen data transmitted, and an action of displaying the one of the display-use screens on the terminal apparatus in accordance with the device data corresponding to a process instruction word and a response to the inquiring: and (c) a plurality of terminal apparatuses for communicating with the server apparatus, a storing process for storing the screen data in a terminal-end storing means for storing screen data in a format suitable for display processing, the screen data being that data of the display-use screen which the terminal apparatuses have and including one or more process instruction words each including one or more reference information referred to for each carry-out event which is generated in advance in order to display in accordance with device data of a predetermined device;

the screen data is obtained by combining process instruction words including:

a process instruction word for displaying, on a predetermined area of one of the display-use screens, a display element corresponding to predetermined device data; and a process instruction word for specifying an input operation;

a display processing means for inquiring the server-end communication means about whether or not the server-end communication means has acquired the device data corresponding to the process instruction word of the screen data stored in the terminal-end storing means, which the terminal apparatuses have, and for displaying the display-use screen in accordance with the device data corresponding to the process instruction word which is transmitted from the server-end communication means; and a terminal-end communication means for communicating, via a local network, with the server-end communication means so as to receive the inquiry from the display processing means and the device data as a reply thereto.

11. The non-transitory recording medium as set forth in claim 10, further comprising:

a server-end storing means for storing therein the screen data in a format suitable for display processing; and a communication relay means for relaying communication between the server-end communication means and a public network, the server-end communication means acquiring the screen data stored in the server-end storing means, and the communication control program causing the computer to perform the storing processing for storing the screen data in the server-end storing means in the server apparatus for giving the screen data to the communication relay means, and in the server-end storing means, the display processing means (a) inquiring the server-end communication means, by relay communication via the relay means via the public network, about whether or not the server-end communication means has acquired the device data corresponding thereto, and (b) displaying the screen-use screen in accordance with the screen data transmitted from the server-end communication means and the device data corresponding thereto by the relay communication, (c) causing the server-end communication means to perform the communication via the local network for acquiring the screen data stored in the terminal-end storing means, and (d) causing the server-end network to perform the communication via the public network for acquiring the screen data stored in the server-end storing means.

12. The non-transitory recording medium as set forth in claim 10, wherein the server apparatus further includes a file converting means for extracting said one or more process instruction words from the screen data and setting a content of one or more XML elements in accordance with said one or more process instruction words so as to convert the screen data into a format suitable for display processing, thereby generating a XML file for a screen.

* * * * *